(12) United States Patent
Chen et al.

(10) Patent No.: US 10,459,201 B2
(45) Date of Patent: Oct. 29, 2019

(54) OPTICAL IMAGING LENS

(71) Applicant: Genius Electronic Optical (Xiamen) Co., Ltd., Xiamen, Fujian (CN)

(72) Inventors: Feng Chen, Fujian (CN); Ruyou Tang, Fujian (CN); Yongfeng Lai, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 49 days.

(21) Appl. No.: 15/847,922

(22) Filed: Dec. 20, 2017

(65) Prior Publication Data

US 2019/0146185 A1 May 16, 2019

(30) Foreign Application Priority Data

Nov. 16, 2017 (CN) .......................... 2017 1 1138025

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 9/64; G02B 13/0045; G02B 13/04; G02B 27/0025; G02B 13/18; G02B 13/06; G02B 13/22; G02B 9/62; G02B 23/243; G02B 15/14; G02B 3/04; G02B 13/006; G02B 13/02; G02B 13/16; G02B 15/161; G02B 15/163; G02B 3/00; G02B 9/12; G02B 13/00; G02B 13/0015

See application file for complete search history.

(56) References Cited

U.S. PATENT DOCUMENTS

| 2017/0068072 A1* | 3/2017 | Hashimoto ........ G02B 13/0045 |
| 2018/0188482 A1* | 7/2018 | Jhang ................. G02B 13/0045 |
| 2018/0188486 A1* | 7/2018 | Gong ..................... G02B 13/18 |
| 2019/0025549 A1* | 1/2019 | Hsueh ................ G02B 13/0045 |

FOREIGN PATENT DOCUMENTS

| CN | 105116519 B | 11/2017 |
| JP | 2015-179228 | 10/2015 |
| TW | I534463 B | 5/2016 |
| TW | I631382 B | 8/2018 |

* cited by examiner

*Primary Examiner* — Evan P Dzierzynski
*Assistant Examiner* — Sharrief I Broome
(74) *Attorney, Agent, or Firm* — Winston Hsu

(57) ABSTRACT

An optical imaging lens includes: first, second, third, fourth, fifth, sixth and seventh lens element, the first lens element has positive refracting power and an image-side surface with a concave portion in a vicinity of its periphery, the second lens element, the sixth lens element and the seventh lens element are made of plastic, the third lens element has an object-side surface with a concave portion in a vicinity of its periphery and an image-side surface with a concave portion in a vicinity of the optical axis, the fourth lens element has an object-side surface with a convex portion in a vicinity of the optical axis, the fifth lens element has an object-side surface with a concave portion in a vicinity of the optical axis. In addition, υ3 and υ5 are the Abbe numbers of the third and the fifth lens element respectively, and satisfying the relationship: υ3+υ5≥100.000.

20 Claims, 48 Drawing Sheets

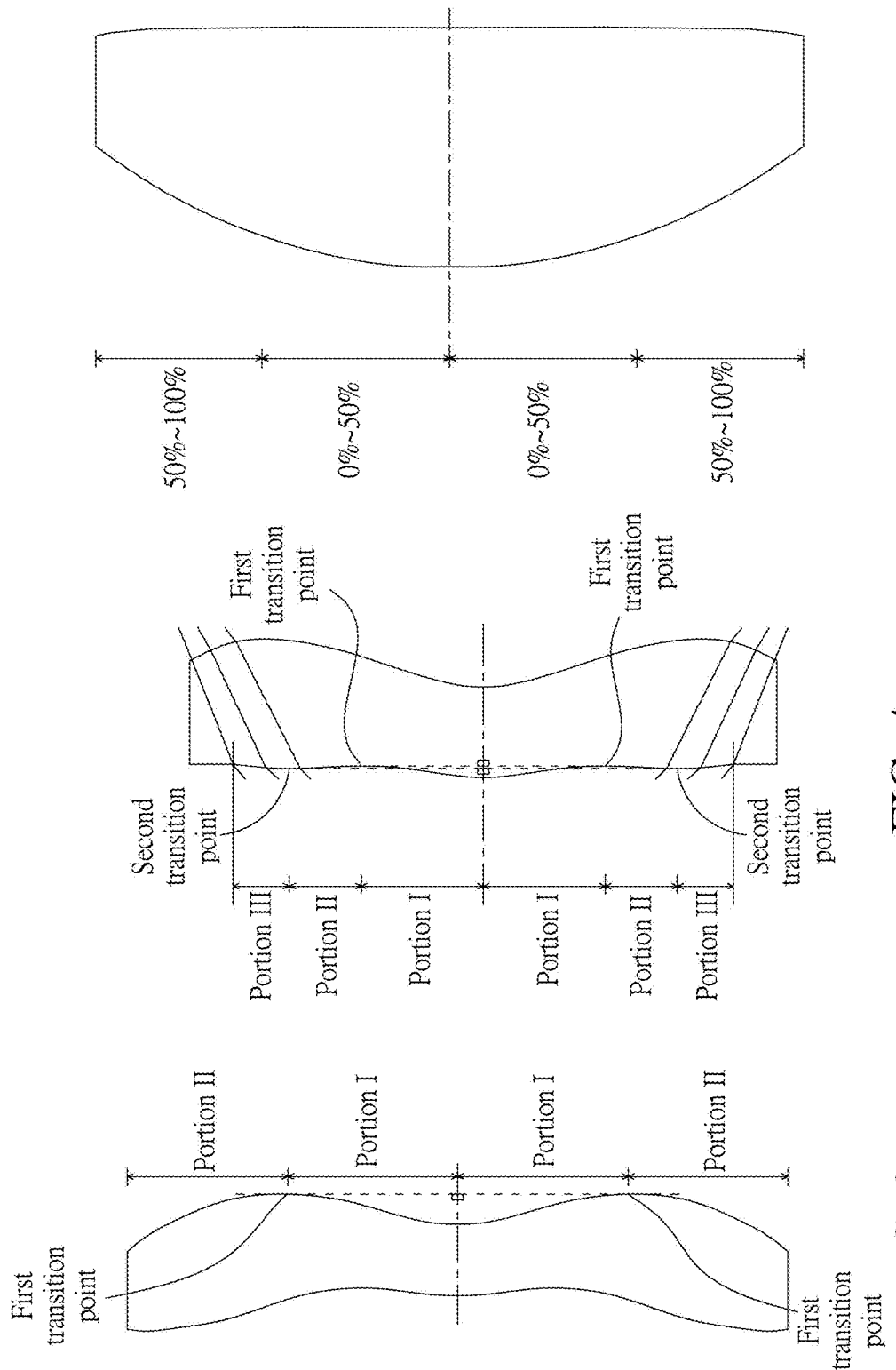

| First Example | | | | | | | |
|---|---|---|---|---|---|---|---|
| TTL=5.289mm; EFL=4.294mm; HFOV= 40.616deg.; Image height=3.794mm; Fno=1.65 | | | | | | | |
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.564 | | | | | |
| 11 | First Lens | 1.828 | 0.727 | T1 | 1.545 | 55.987 | 4.219 | Plastic |
| 12 | | 7.605 | 0.074 | G12 | | | | |
| 21 | Second Lens | 5.637 | 0.227 | T2 | 1.642 | 22.409 | -8.841 | Plastic |
| 22 | | 2.795 | 0.254 | G23 | | | | |
| 31 | Third Lens | 5.579 | 0.426 | T3 | 1.540 | 50.000 | 13.744 | Plastic |
| 32 | | 21.113 | 0.183 | G34 | | | | |
| 41 | Fourth Lens | 6.984 | 0.272 | T4 | 1.642 | 22.409 | 43.241 | Plastic |
| 42 | | 9.163 | 0.395 | G45 | | | | |
| 51 | Fifth Lens | -2.506 | 0.520 | T5 | 1.540 | 50.000 | 4.643 | Plastic |
| 52 | | -1.353 | 0.035 | G56 | | | | |
| 61 | Sixth Lens | 19.290 | 0.523 | T6 | 1.642 | 22.409 | -62.275 | Plastic |
| 62 | | 12.908 | 0.387 | G67 | | | | |
| 71 | Seventh Lens | -3.986 | 0.267 | T7 | 1.531 | 55.745 | -3.263 | Plastic |
| 72 | | 3.155 | 0.500 | G7F | | | | |
| 90 | Filter | Infinity | 0.210 | | 1.517 | 64.167 | | |
| | | Infinity | 0.290 | | | | | |
| 91 | Image Plane | Infinity | | | | | | |

FIG. 34

| No. | K | $a_2$ | $a_4$ | $a_6$ | $a_8$ |
|---|---|---|---|---|---|
| 11 | 0.000000E+00 | 0.000000E+00 | 5.093910E-04 | 3.318172E-03 | 2.549079E-03 |
| 12 | 0.000000E+00 | 0.000000E+00 | -4.301145E-02 | 2.705444E-02 | 5.639883E-03 |
| 21 | 0.000000E+00 | 0.000000E+00 | -1.265081E-01 | 8.580255E-02 | -2.791289E-02 |
| 22 | 0.000000E+00 | 0.000000E+00 | -9.357978E-02 | 5.333378E-02 | -3.741529E-02 |
| 31 | 0.000000E+00 | 0.000000E+00 | -2.915179E-02 | -8.675364E-03 | -2.522179E-02 |
| 32 | 0.000000E+00 | 0.000000E+00 | -8.251273E-02 | 4.263338E-02 | -8.145423E-02 |
| 41 | 0.000000E+00 | 0.000000E+00 | -1.473189E-01 | -4.512784E-02 | 2.818418E-02 |
| 42 | 0.000000E+00 | 0.000000E+00 | -8.779769E-02 | -1.966162E-02 | -2.513078E-02 |
| 51 | 0.000000E+00 | 0.000000E+00 | 3.529280E-02 | 1.101607E-02 | -2.139612E-02 |
| 52 | -9.810011E-01 | 0.000000E+00 | 5.560910E-02 | -2.555827E-02 | 1.772316E-02 |
| 61 | 0.000000E+00 | 0.000000E+00 | -3.357593E-02 | -2.309628E-02 | 7.930959E-03 |
| 62 | 1.107264E+01 | 0.000000E+00 | -2.461089E-02 | -1.412534E-02 | 3.985613E-03 |
| 71 | 0.000000E+00 | 0.000000E+00 | -5.560939E-02 | 1.455354E-02 | -4.681280E-04 |
| 72 | -2.228677E+01 | 0.000000E+00 | -6.169707E-02 | 1.721917E-02 | -2.733400E-03 |
| No. | $a_{10}$ | $a_{12}$ | $a_{14}$ | $a_{16}$ | |
| 11 | -7.759632E-03 | 8.070712E-03 | -2.763997E-03 | 1.937690E-04 | |
| 12 | -1.981088E-02 | 1.449878E-02 | -7.224248E-03 | 1.959538E-03 | |
| 21 | 8.305000E-06 | -8.579910E-04 | 2.407710E-03 | -1.374730E-04 | |
| 22 | 1.759017E-02 | 3.686022E-03 | -1.117996E-02 | 6.270417E-03 | |
| 31 | -9.751104E-03 | 3.840343E-03 | 1.124114E-02 | -4.784619E-03 | |
| 32 | 1.928210E-02 | 1.968801E-02 | -9.453906E-03 | 2.023860E-04 | |
| 41 | -4.111077E-02 | 6.502281E-03 | 3.216248E-02 | -1.347793E-02 | |
| 42 | 2.920189E-02 | -6.460869E-03 | -1.749692E-03 | 1.634626E-03 | |
| 51 | 4.730645E-03 | 1.890953E-03 | -7.741250E-04 | 9.430900E-05 | |
| 52 | -1.830925E-03 | -5.067000E-06 | -3.221920E-04 | 5.662300E-05 | |
| 61 | -1.041668E-03 | 3.452000E-06 | 9.972000E-06 | 1.653000E-06 | |
| 62 | -2.215700E-05 | -7.809600E-05 | 7.170000E-07 | 9.270000E-07 | |
| 71 | -1.077910E-04 | 3.533000E-06 | 9.940000E-07 | -5.900000E-08 | |
| 72 | 1.702040E-04 | 6.110000E-07 | -5.340000E-07 | 3.400000E-08 | |

FIG. 35

| Second Example | | | | | | | |
|---|---|---|---|---|---|---|---|
| TTL=5.299mm; EFL=4.3184mm; HFOV= 40.616deg.; Image height=3.804mm; Fno=1.65 | | | | | | | |
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.559 | | | | | |
| 11 | First Lens | 1.848 | 0.705 | T1 | 1.545 | 55.987 | 4.293 | Plastic |
| 12 | | 7.534 | 0.086 | G12 | | | | |
| 21 | Second Lens | 6.110 | 0.218 | T2 | 1.642 | 22.409 | -8.980 | Plastic |
| 22 | | 2.937 | 0.196 | G23 | | | | |
| 31 | Third Lens | 4.802 | 0.410 | T3 | 1.545 | 55.987 | 13.343 | Plastic |
| 32 | | 13.653 | 0.233 | G34 | | | | |
| 41 | Fourth Lens | 7.432 | 0.282 | T4 | 1.642 | 22.409 | 54.787 | Plastic |
| 42 | | 9.263 | 0.286 | G45 | | | | |
| 51 | Fifth Lens | -2.516 | 0.589 | T5 | 1.545 | 55.987 | 4.696 | Plastic |
| 52 | | -1.375 | 0.099 | G56 | | | | |
| 61 | Sixth Lens | 18.463 | 0.478 | T6 | 1.642 | 22.409 | -49.955 | Plastic |
| 62 | | 11.633 | 0.448 | G67 | | | | |
| 71 | Seventh Lens | -3.960 | 0.265 | T7 | 1.531 | 55.745 | -3.402 | Plastic |
| 72 | | 3.421 | 0.500 | G7F | | | | |
| 90 | Filter | Infinity | 0.210 | | 1.517 | 64.167 | | |
| | | Infinity | 0.295 | | | | | |
| 91 | Image Plane | Infinity | | | | | | |

FIG. 36

| No. | K | $a_2$ | $a_4$ | $a_6$ | $a_8$ |
|---|---|---|---|---|---|
| 11 | 0.000000E+00 | 8.642100E-04 | 2.658040E-03 | 2.281862E-03 | 0.000000E+00 |
| 12 | 0.000000E+00 | -4.259285E-02 | 2.583449E-02 | 5.981756E-03 | 0.000000E+00 |
| 21 | 0.000000E+00 | -1.246858E-01 | 8.604814E-02 | -2.830385E-02 | 0.000000E+00 |
| 22 | 0.000000E+00 | -9.747228E-02 | 5.122204E-02 | -3.907865E-02 | 0.000000E+00 |
| 31 | 0.000000E+00 | -3.022529E-02 | -1.025483E-02 | -2.544500E-02 | 0.000000E+00 |
| 32 | 0.000000E+00 | -7.329779E-02 | 4.594850E-02 | -8.078142E-02 | 0.000000E+00 |
| 41 | 0.000000E+00 | -1.495328E-01 | -4.301695E-02 | 2.945396E-02 | 0.000000E+00 |
| 42 | 0.000000E+00 | -8.682497E-02 | -1.994118E-02 | -2.523985E-02 | 0.000000E+00 |
| 51 | 0.000000E+00 | 3.742588E-02 | 1.130628E-02 | -2.129654E-02 | 0.000000E+00 |
| 52 | 0.000000E+00 | 5.593491E-02 | -2.529436E-02 | 1.782189E-02 | 0.000000E+00 |
| 61 | 0.000000E+00 | -2.659040E-02 | -2.341395E-02 | 7.858230E-03 | 0.000000E+00 |
| 62 | 0.000000E+00 | -2.409064E-02 | -1.407415E-02 | 3.981406E-03 | 0.000000E+00 |
| 71 | 0.000000E+00 | -5.572095E-02 | 1.454915E-02 | -4.679210E-04 | 0.000000E+00 |
| 72 | 0.000000E+00 | -6.154980E-02 | 1.725230E-02 | -2.730672E-03 | 0.000000E+00 |
| No. | $a_{10}$ | $a_{12}$ | $a_{14}$ | $a_{16}$ | |
| 11 | -7.828397E-03 | 8.058264E-03 | -2.753485E-03 | 2.126610E-04 | |
| 12 | -1.947327E-02 | 1.458029E-02 | -7.282979E-03 | 1.865538E-03 | |
| 21 | -2.286670E-04 | -9.660710E-04 | 2.347316E-03 | -1.851690E-04 | |
| 22 | 1.666816E-02 | 3.320688E-03 | -1.122646E-02 | 6.369056E-03 | |
| 31 | -9.173558E-03 | 4.547266E-03 | 1.186092E-02 | -4.290933E-03 | |
| 32 | 1.937023E-02 | 1.967072E-02 | -9.499588E-03 | 1.401700E-04 | |
| 41 | -4.105188E-02 | 6.083348E-03 | 3.177836E-02 | -1.371666E-02 | |
| 42 | 2.926114E-02 | -6.351771E-03 | -1.656367E-03 | 1.691692E-03 | |
| 51 | 4.811457E-03 | 1.939874E-03 | -7.548320E-04 | 9.438500E-05 | |
| 52 | -1.809494E-03 | -2.721000E-06 | -3.231040E-04 | 5.568900E-05 | |
| 61 | -1.043039E-03 | 5.328000E-06 | 1.048800E-05 | 1.707000E-06 | |
| 62 | -2.412500E-05 | -7.848300E-05 | 6.570000E-07 | 9.190000E-07 | |
| 71 | -1.077130E-04 | 3.545000E-06 | 9.950000E-07 | -5.900000E-08 | |
| 72 | 1.703120E-04 | 6.040000E-07 | -5.370000E-07 | 3.400000E-08 | |

FIG. 37

| Third Example |||||||
|---|---|---|---|---|---|---|
| TTL=5.313mm; EFL=4.304mm; HFOV= 40.616deg.; Image height=3.789mm; Fno=1.65 |||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.572 | | | | | |
| 11 | First Lens | 1.849 | 0.702 | T1 | 1.545 | 55.987 | 4.220 | Plastic |
| 12 | | 8.093 | 0.092 | G12 | | | | |
| 21 | Second Lens | 5.475 | 0.219 | T2 | 1.642 | 22.409 | -9.344 | Plastic |
| 22 | | 2.829 | 0.307 | G23 | | | | |
| 31 | Third Lens | 7.245 | 0.381 | T3 | 1.545 | 55.987 | 15.913 | Plastic |
| 32 | | 42.697 | 0.069 | G34 | | | | |
| 41 | Fourth Lens | 6.826 | 0.266 | T4 | 1.642 | 22.409 | 40.010 | Plastic |
| 42 | | 9.127 | 0.330 | G45 | | | | |
| 51 | Fifth Lens | -2.552 | 0.626 | T5 | 1.545 | 55.987 | 4.734 | Plastic |
| 52 | | -1.396 | 0.092 | G56 | | | | |
| 61 | Sixth Lens | 22.754 | 0.449 | T6 | 1.642 | 22.409 | -50.276 | Plastic |
| 62 | | 13.287 | 0.505 | G67 | | | | |
| 71 | Seventh Lens | -4.022 | 0.268 | T7 | 1.531 | 55.745 | -3.445 | Plastic |
| 72 | | 3.455 | 0.500 | G7F | | | | |
| 90 | Filter | Infinity | 0.210 | | 1.517 | 64.167 | | |
| | | Infinity | 0.298 | | | | | |
| 91 | Image Plane | Infinity | | | | | | |

FIG. 38

| No. | K | $a_2$ | $a_4$ | $a_6$ | $a_8$ |
|---|---|---|---|---|---|
| 11 | 0.000000E+00 | 0.000000E+00 | 3.410342E-03 | 3.319896E-03 | 2.620781E-03 |
| 12 | 0.000000E+00 | 0.000000E+00 | -3.414086E-02 | 2.794818E-02 | 5.678977E-03 |
| 21 | 0.000000E+00 | 0.000000E+00 | -1.221066E-01 | 8.730030E-02 | -2.773822E-02 |
| 22 | 0.000000E+00 | 0.000000E+00 | -9.884590E-02 | 5.726040E-02 | -3.573607E-02 |
| 31 | 0.000000E+00 | 0.000000E+00 | -2.396254E-02 | -9.140449E-03 | -2.492997E-02 |
| 32 | 0.000000E+00 | 0.000000E+00 | -7.693184E-02 | 3.696766E-02 | -8.581189E-02 |
| 41 | 0.000000E+00 | 0.000000E+00 | -1.482693E-01 | -3.923927E-02 | 3.232726E-02 |
| 42 | 0.000000E+00 | 0.000000E+00 | -8.061956E-02 | -1.768313E-02 | -2.419864E-02 |
| 51 | 0.000000E+00 | 0.000000E+00 | 3.235214E-02 | 8.584766E-03 | -2.201730E-02 |
| 52 | -9.845988E-01 | 0.000000E+00 | 5.610549E-02 | -2.551124E-02 | 1.748492E-02 |
| 61 | 0.000000E+00 | 0.000000E+00 | -2.250236E-02 | -2.258178E-02 | 7.788718E-03 |
| 62 | 1.146323E+01 | 0.000000E+00 | -2.459149E-02 | -1.412075E-02 | 3.990734E-03 |
| 71 | 0.000000E+00 | 0.000000E+00 | -5.565402E-02 | 1.460901E-02 | -4.584270E-04 |
| 72 | -3.002222E+01 | 0.000000E+00 | -5.978803E-02 | 1.745728E-02 | -2.711357E-03 |
| No. | $a_{10}$ | $a_{12}$ | $a_{14}$ | $a_{16}$ | |
| 11 | -7.681181E-03 | 8.127741E-03 | -2.729706E-03 | 2.065290E-04 | |
| 12 | -1.973405E-02 | 1.450936E-02 | -7.285487E-03 | 1.877563E-03 | |
| 21 | -1.174200E-04 | -9.328170E-04 | 2.395216E-03 | -1.430720E-04 | |
| 22 | 1.797330E-02 | 3.675549E-03 | -1.125158E-02 | 6.155174E-03 | |
| 31 | -9.499988E-03 | 3.344300E-03 | 1.046810E-02 | -5.388898E-03 | |
| 32 | 1.840817E-02 | 2.044977E-02 | -8.687489E-03 | 5.491690E-04 | |
| 41 | -3.966375E-02 | 6.778084E-03 | 3.212189E-02 | -1.318265E-02 | |
| 42 | 2.994269E-02 | -5.993966E-03 | -1.597071E-03 | 1.597315E-03 | |
| 51 | 4.997203E-03 | 2.224165E-03 | -6.133790E-04 | 9.926200E-05 | |
| 52 | -2.015783E-03 | -6.922700E-05 | -3.262660E-04 | 6.795400E-05 | |
| 61 | -1.096712E-03 | -1.153600E-05 | 6.224000E-06 | 5.130000E-07 | |
| 62 | -2.288200E-05 | -7.872600E-05 | 5.020000E-07 | 8.690000E-07 | |
| 71 | -1.065570E-04 | 3.637000E-06 | 9.910000E-07 | -6.200000E-08 | |
| 72 | 1.716520E-04 | 6.320000E-07 | -5.480000E-07 | 3.100000E-08 | |

FIG. 39

| Fourth Example | | | | | | | |
|---|---|---|---|---|---|---|---|
| TTL=5.299mm; EFL=4.311mm; HFOV= 40.616deg.; Image height=3.796mm; Fno=1.65 | | | | | | | |
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.559 | | | | | |
| 11 | First Lens | 1.858 | 0.699 | T1 | 1.545 | 55.987 | 4.342 | Plastic |
| 12 | | 7.433 | 0.079 | G12 | | | | |
| 21 | Second Lens | 5.668 | 0.309 | T2 | 1.642 | 22.409 | -9.223 | Plastic |
| 22 | | 2.845 | 0.232 | G23 | | | | |
| 31 | Third Lens | 4.976 | 0.412 | T3 | 1.545 | 55.987 | 13.941 | Plastic |
| 32 | | 13.934 | 0.164 | G34 | | | | |
| 41 | Fourth Lens | 6.850 | 0.267 | T4 | 1.642 | 22.409 | 44.334 | Plastic |
| 42 | | 8.860 | 0.382 | G45 | | | | |
| 51 | Fifth Lens | -2.456 | 0.482 | T5 | 1.545 | 55.987 | 4.714 | Plastic |
| 52 | | -1.344 | 0.040 | G56 | | | | |
| 61 | Sixth Lens | 18.412 | 0.474 | T6 | 1.642 | 22.409 | -126.414 | Plastic |
| 62 | | 14.878 | 0.353 | G67 | | | | |
| 71 | Seventh Lens | -4.105 | 0.398 | T7 | 1.531 | 55.745 | -3.288 | Plastic |
| 72 | | 3.159 | 0.500 | G7F | | | | |
| 90 | Filter | Infinity | 0.210 | | 1.517 | 64.167 | | |
| | | Infinity | 0.299 | | | | | |
| 91 | Image Plane | Infinity | | | | | | |

FIG. 40

| No. | K | $a_2$ | $a_4$ | $a_6$ | $a_8$ |
|---|---|---|---|---|---|
| 11 | 0.000000E+00 | 0.000000E+00 | 2.831996E-03 | 2.698204E-03 | 2.349799E-03 |
| 12 | 0.000000E+00 | 0.000000E+00 | -4.446058E-02 | 2.897376E-02 | 6.015710E-03 |
| 21 | 0.000000E+00 | 0.000000E+00 | -1.199075E-01 | 8.496602E-02 | -2.804354E-02 |
| 22 | 0.000000E+00 | 0.000000E+00 | -9.792247E-02 | 5.506313E-02 | -3.861269E-02 |
| 31 | 0.000000E+00 | 0.000000E+00 | -3.830561E-02 | -6.806460E-03 | -2.253953E-02 |
| 32 | 0.000000E+00 | 0.000000E+00 | -7.578950E-02 | 4.299474E-02 | -8.288171E-02 |
| 41 | 0.000000E+00 | 0.000000E+00 | -1.470057E-01 | -4.299802E-02 | 2.900266E-02 |
| 42 | 0.000000E+00 | 0.000000E+00 | -8.808782E-02 | -1.956949E-02 | -2.461746E-02 |
| 51 | 0.000000E+00 | 0.000000E+00 | 3.437215E-02 | 1.072018E-02 | -2.167539E-02 |
| 52 | -9.888218E-01 | 0.000000E+00 | 5.602128E-02 | -2.563158E-02 | 1.770023E-02 |
| 61 | 0.000000E+00 | 0.000000E+00 | -3.093393E-02 | -2.348982E-02 | 7.770384E-03 |
| 62 | 7.506889E+00 | 0.000000E+00 | -2.518753E-02 | -1.410274E-02 | 3.986521E-03 |
| 71 | 0.000000E+00 | 0.000000E+00 | -5.547199E-02 | 1.456386E-02 | -4.677890E-04 |
| 72 | -1.855215E+01 | 0.000000E+00 | -6.184426E-02 | 1.721428E-02 | -2.733715E-03 |
| No. | $a_{10}$ | $a_{12}$ | $a_{14}$ | $a_{16}$ | |
| 11 | -7.896518E-03 | 8.003493E-03 | -2.756366E-03 | 2.395700E-04 | |
| 12 | -1.966385E-02 | 1.451959E-02 | -7.295929E-03 | 1.852471E-03 | |
| 21 | -1.036080E-04 | -1.004498E-03 | 2.274056E-03 | -2.383400E-04 | |
| 22 | 1.652967E-02 | 3.258140E-03 | -1.125802E-02 | 6.327475E-03 | |
| 31 | -9.479402E-03 | 3.553201E-03 | 1.132566E-02 | -4.342856E-03 | |
| 32 | 1.872184E-02 | 1.952618E-02 | -9.475048E-03 | 2.855940E-04 | |
| 41 | -4.166649E-02 | 5.875296E-03 | 3.192721E-02 | -1.348580E-02 | |
| 42 | 2.969126E-02 | -6.191731E-03 | -1.669804E-03 | 1.645219E-03 | |
| 51 | 4.645437E-03 | 1.897170E-03 | -7.536880E-04 | 1.058560E-04 | |
| 52 | -1.853848E-03 | -1.931100E-05 | -3.279260E-04 | 5.565800E-05 | |
| 61 | -1.067913E-03 | 2.787000E-06 | 1.141400E-05 | 2.436000E-06 | |
| 62 | -2.343500E-05 | -7.851700E-05 | 6.270000E-07 | 9.120000E-07 | |
| 71 | -1.079600E-04 | 3.468000E-06 | 9.790000E-07 | -6.000000E-08 | |
| 72 | 1.701130E-04 | 5.950000E-07 | -5.360000E-07 | 3.400000E-08 | |

FIG. 41

| Fifth Example ||||||||
|---|---|---|---|---|---|---|---|
| TTL=5.250mm; EFL=4.252mm; HFOV= 40.616deg.; Image height=3.756mm; Fno=1.65 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.505 | | | | | |
| 11 | First Lens | 2.010 | 0.505 | T1 | 1.545 | 55.987 | 4.836 | Plastic |
| 12 | | 7.660 | 0.069 | G12 | | | | |
| 21 | Second Lens | 4.128 | 0.456 | T2 | 1.642 | 22.409 | -10.998 | Plastic |
| 22 | | 2.500 | 0.206 | G23 | | | | |
| 31 | Third Lens | 4.043 | 0.480 | T3 | 1.545 | 55.987 | 10.238 | Plastic |
| 32 | | 13.982 | 0.174 | G34 | | | | |
| 41 | Fourth Lens | 6.908 | 0.250 | T4 | 1.642 | 22.409 | 38.076 | Plastic |
| 42 | | 9.462 | 0.351 | G45 | | | | |
| 51 | Fifth Lens | -2.371 | 0.391 | T5 | 1.545 | 55.987 | 6.311 | Plastic |
| 52 | | -1.487 | 0.032 | G56 | | | | |
| 61 | Sixth Lens | 30.421 | 0.762 | T6 | 1.642 | 22.409 | -264.117 | Plastic |
| 62 | | 25.571 | 0.316 | G67 | | | | |
| 71 | Seventh Lens | -4.087 | 0.261 | T7 | 1.531 | 55.745 | -3.490 | Plastic |
| 72 | | 3.489 | 0.500 | G7F | | | | |
| 90 | Filter | Infinity | 0.210 | | 1.517 | 64.167 | | |
| | | Infinity | 0.287 | | | | | |
| 91 | Image Plane | Infinity | | | | | | |

FIG. 42

| No. | K | $a_2$ | $a_4$ | $a_6$ | $a_8$ |
|---|---|---|---|---|---|
| 11 | 0.000000E+00 | 0.000000E+00 | -2.524527E-03 | 4.584988E-03 | 1.802094E-03 |
| 12 | 0.000000E+00 | 0.000000E+00 | -3.466872E-02 | 4.357175E-02 | 1.022308E-02 |
| 21 | 0.000000E+00 | 0.000000E+00 | -8.897493E-02 | 8.951403E-02 | -2.715021E-02 |
| 22 | 0.000000E+00 | 0.000000E+00 | -9.480327E-02 | 4.425593E-02 | -4.389766E-02 |
| 31 | 0.000000E+00 | 0.000000E+00 | -5.515304E-02 | -7.255293E-03 | -2.140016E-02 |
| 32 | 0.000000E+00 | 0.000000E+00 | -8.509480E-02 | 4.015906E-02 | -8.113111E-02 |
| 41 | 0.000000E+00 | 0.000000E+00 | -1.353849E-01 | -4.155388E-02 | 2.985612E-02 |
| 42 | 0.000000E+00 | 0.000000E+00 | -9.025932E-02 | -1.776738E-02 | -2.358718E-02 |
| 51 | 0.000000E+00 | 0.000000E+00 | 3.672415E-02 | 1.034943E-02 | -2.168443E-02 |
| 52 | -1.017880E+00 | 0.000000E+00 | 5.734883E-02 | -2.499772E-02 | 1.777590E-02 |
| 61 | 0.000000E+00 | 0.000000E+00 | -4.744695E-02 | -2.506575E-02 | 7.517974E-03 |
| 62 | 2.652262E+01 | 0.000000E+00 | -2.414902E-02 | -1.407626E-02 | 3.990481E-03 |
| 71 | 0.000000E+00 | 0.000000E+00 | -5.555674E-02 | 1.456507E-02 | -4.646290E-04 |
| 72 | -2.685466E+01 | 0.000000E+00 | -6.072361E-02 | 1.726597E-02 | -2.730499E-03 |
| No. | $a_{10}$ | $a_{12}$ | $a_{14}$ | $a_{16}$ | |
| 11 | -7.543096E-03 | 8.447338E-03 | -2.487858E-03 | 3.004180E-04 | |
| 12 | -1.894523E-02 | 1.472461E-02 | -7.018169E-03 | 2.092546E-03 | |
| 21 | -4.237780E-04 | -1.421631E-03 | 2.090650E-03 | -2.224480E-04 | |
| 22 | 1.632779E-02 | 4.434123E-03 | -1.075471E-02 | 5.664479E-03 | |
| 31 | -7.932109E-03 | 4.629713E-03 | 1.182914E-02 | -4.102381E-03 | |
| 32 | 2.141453E-02 | 2.120643E-02 | -9.051717E-03 | -5.512800E-05 | |
| 41 | -4.003204E-02 | 6.988855E-03 | 3.223324E-02 | -1.367167E-02 | |
| 42 | 3.004994E-02 | -6.011809E-03 | -1.375360E-03 | 2.027799E-03 | |
| 51 | 4.729315E-03 | 1.982444E-03 | -6.815320E-04 | 1.661710E-04 | |
| 52 | -1.882136E-03 | -5.491900E-05 | -3.541730E-04 | 3.868600E-05 | |
| 61 | -1.138723E-03 | -2.097600E-05 | 4.504000E-06 | 9.190000E-07 | |
| 62 | -2.184400E-05 | -7.816400E-05 | 6.820000E-07 | 9.150000E-07 | |
| 71 | -1.072820E-04 | 3.631000E-06 | 9.980000E-07 | -6.100000E-08 | |
| 72 | 1.704910E-04 | 6.540000E-07 | -5.270000E-07 | 3.600000E-08 | |

FIG. 43

| Sixth Example | | | | | | | |
|---|---|---|---|---|---|---|---|
| TTL=5.304mm; EFL=4.317mm; HFOV= 40.616deg.; Image height=3.802mm; Fno=1.65 | | | | | | | |
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.564 | | | | | |
| 11 | First Lens | 1.849 | 0.707 | T1 | 1.545 | 55.987 | 4.260 | Plastic |
| 12 | | 7.778 | 0.067 | G12 | | | | |
| 21 | Second Lens | 5.074 | 0.220 | T2 | 1.642 | 22.409 | -9.154 | Plastic |
| 22 | | 2.687 | 0.258 | G23 | | | | |
| 31 | Third Lens | 5.787 | 0.501 | T3 | 1.545 | 55.987 | 13.925 | Plastic |
| 32 | | 23.455 | 0.180 | G34 | | | | |
| 41 | Fourth Lens | 7.119 | 0.269 | T4 | 1.642 | 22.409 | 48.251 | Plastic |
| 42 | | 9.083 | 0.383 | G45 | | | | |
| 51 | Fifth Lens | -2.514 | 0.508 | T5 | 1.545 | 55.987 | 4.654 | Plastic |
| 52 | | -1.354 | 0.039 | G56 | | | | |
| 61 | Sixth Lens | 17.649 | 0.497 | T6 | 1.642 | 22.409 | -70.204 | Plastic |
| 62 | | 12.572 | 0.395 | G67 | | | | |
| 71 | Seventh Lens | -3.996 | 0.269 | T7 | 1.531 | 55.745 | -3.253 | Plastic |
| 72 | | 3.133 | 0.500 | G7F | | | | |
| 90 | Filter | Infinity | 0.210 | | 1.517 | 64.167 | | |
| | | Infinity | 0.299 | | | | | |
| 91 | Image Plane | Infinity | | | | | | |

FIG. 44

| No. | K | $a_2$ | $a_4$ | $a_6$ | $a_8$ |
|---|---|---|---|---|---|
| 11 | 0.000000E+00 | 0.000000E+00 | 1.900193E-03 | 2.446906E-03 | 2.589941E-03 |
| 12 | 0.000000E+00 | 0.000000E+00 | -3.964169E-02 | 2.645652E-02 | 5.571015E-03 |
| 21 | 0.000000E+00 | 0.000000E+00 | -1.266466E-01 | 8.495413E-02 | -2.810661E-02 |
| 22 | 0.000000E+00 | 0.000000E+00 | -9.864474E-02 | 5.406091E-02 | -3.788320E-02 |
| 31 | 0.000000E+00 | 0.000000E+00 | -2.884203E-02 | -6.337024E-03 | -2.160823E-02 |
| 32 | 0.000000E+00 | 0.000000E+00 | -7.988059E-02 | 4.423371E-02 | -8.069005E-02 |
| 41 | 0.000000E+00 | 0.000000E+00 | -1.461574E-01 | -4.524686E-02 | 2.749561E-02 |
| 42 | 0.000000E+00 | 0.000000E+00 | -8.796908E-02 | -1.971258E-02 | -2.530592E-02 |
| 51 | 0.000000E+00 | 0.000000E+00 | 3.437891E-02 | 1.068552E-02 | -2.148549E-02 |
| 52 | -9.774554E-01 | 0.000000E+00 | 5.540650E-02 | -2.560427E-02 | 1.770749E-02 |
| 61 | 0.000000E+00 | 0.000000E+00 | -3.288234E-02 | -2.306469E-02 | 7.927764E-03 |
| 62 | 1.144136E+01 | 0.000000E+00 | -2.447467E-02 | -1.412505E-02 | 3.984755E-03 |
| 71 | 0.000000E+00 | 0.000000E+00 | -5.559129E-02 | 1.455705E-02 | -4.674950E-04 |
| 72 | -2.194204E+01 | 0.000000E+00 | -6.164830E-02 | 1.722474E-02 | -2.731833E-03 |
| No. | $a_{10}$ | $a_{12}$ | $a_{14}$ | $a_{16}$ | |
| 11 | -7.780116E-03 | 8.063950E-03 | -2.763257E-03 | 2.144530E-04 | |
| 12 | -1.965608E-02 | 1.453422E-02 | -7.272926E-03 | 1.907261E-03 | |
| 21 | 2.519100E-05 | -8.086930E-04 | 2.386171E-03 | -2.253820E-04 | |
| 22 | 1.756585E-02 | 3.737339E-03 | -1.120912E-02 | 6.201834E-03 | |
| 31 | -8.686034E-03 | 3.752048E-03 | 1.109722E-02 | -4.680116E-03 | |
| 32 | 1.918690E-02 | 1.943771E-02 | -9.521041E-03 | 2.852310E-04 | |
| 41 | -4.207249E-02 | 5.802971E-03 | 3.204000E-02 | -1.315944E-02 | |
| 42 | 2.918360E-02 | -6.417012E-03 | -1.722745E-03 | 1.585304E-03 | |
| 51 | 4.694141E-03 | 1.881696E-03 | -7.721210E-04 | 1.004370E-04 | |
| 52 | -1.833989E-03 | -7.565000E-06 | -3.223030E-04 | 5.651700E-05 | |
| 61 | -1.041869E-03 | 4.012000E-06 | 1.037000E-05 | 1.783000E-06 | |
| 62 | -2.260900E-05 | -7.823500E-05 | 6.930000E-07 | 9.230000E-07 | |
| 71 | -1.077220E-04 | 3.535000E-06 | 9.920000E-07 | -6.000000E-08 | |
| 72 | 1.704300E-04 | 6.330000E-07 | -5.320000E-07 | 3.500000E-08 | |

FIG. 45

| Seventh Example ||||||||
|---|---|---|---|---|---|---|---|
| TTL=5.297mm; EFL=4.291mm; HFOV= 40.616deg.; Image height=3.801mm; Fno=1.65 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.562 | | | | | |
| 11 | First Lens | 1.835 | 0.659 | T1 | 1.545 | 55.987 | 4.226 | Plastic |
| 12 | | 7.821 | 0.070 | G12 | | | | |
| 21 | Second Lens | 5.032 | 0.165 | T2 | 1.642 | 22.409 | -9.031 | Plastic |
| 22 | | 2.669 | 0.284 | G23 | | | | |
| 31 | Third Lens | 5.503 | 0.400 | T3 | 1.545 | 55.987 | 13.237 | Plastic |
| 32 | | 22.433 | 0.276 | G34 | | | | |
| 41 | Fourth Lens | 6.829 | 0.275 | T4 | 1.642 | 22.409 | 52.197 | Plastic |
| 42 | | 8.424 | 0.394 | G45 | | | | |
| 51 | Fifth Lens | -2.474 | 0.540 | T5 | 1.545 | 55.987 | 4.574 | Plastic |
| 52 | | -1.339 | 0.047 | G56 | | | | |
| 61 | Sixth Lens | 18.893 | 0.526 | T6 | 1.642 | 22.409 | -52.446 | Plastic |
| 62 | | 12.005 | 0.393 | G67 | | | | |
| 71 | Seventh Lens | -3.963 | 0.278 | T7 | 1.531 | 55.745 | -3.228 | Plastic |
| 72 | | 3.113 | 0.500 | G7F | | | | |
| 90 | Filter | Infinity | 0.210 | | 1.517 | 64.167 | | |
| | | Infinity | 0.279 | | | | | |
| 91 | Image Plane | Infinity | | | | | | |

FIG. 46

| No. | K | $a_2$ | $a_4$ | $a_6$ | $a_8$ |
|---|---|---|---|---|---|
| 11 | 0.000000E+00 | 0.000000E+00 | -7.986300E-04 | 2.712409E-03 | 2.525166E-03 |
| 12 | 0.000000E+00 | 0.000000E+00 | -4.200212E-02 | 2.629000E-02 | 5.608290E-03 |
| 21 | 0.000000E+00 | 0.000000E+00 | -1.279327E-01 | 8.554931E-02 | -2.840372E-02 |
| 22 | 0.000000E+00 | 0.000000E+00 | -9.207037E-02 | 5.264452E-02 | -3.743026E-02 |
| 31 | 0.000000E+00 | 0.000000E+00 | -3.095297E-02 | -8.220597E-03 | -2.550133E-02 |
| 32 | 0.000000E+00 | 0.000000E+00 | -8.347148E-02 | 4.260040E-02 | -8.083114E-02 |
| 41 | 0.000000E+00 | 0.000000E+00 | -1.451191E-01 | -4.294579E-02 | 2.910469E-02 |
| 42 | 0.000000E+00 | 0.000000E+00 | -8.922114E-02 | -2.048196E-02 | -2.543914E-02 |
| 51 | 0.000000E+00 | 0.000000E+00 | 3.588833E-02 | 1.124052E-02 | -2.142096E-02 |
| 52 | -9.742969E-01 | 0.000000E+00 | 5.522460E-02 | -2.550179E-02 | 1.777000E-02 |
| 61 | 0.000000E+00 | 0.000000E+00 | -3.306585E-02 | -2.285860E-02 | 7.982110E-03 |
| 62 | 1.133116E+01 | 0.000000E+00 | -2.446556E-02 | -1.413371E-02 | 3.983075E-03 |
| 71 | 0.000000E+00 | 0.000000E+00 | -5.563957E-02 | 1.454322E-02 | -4.682940E-04 |
| 72 | -2.128553E+01 | 0.000000E+00 | -6.170843E-02 | 1.721230E-02 | -2.734383E-03 |
| No. | $a_{10}$ | $a_{12}$ | $a_{14}$ | $a_{16}$ | |
| 11 | -7.705506E-03 | 8.105767E-03 | -2.744220E-03 | 2.089720E-04 | |
| 12 | -1.966125E-02 | 1.458390E-02 | -7.228626E-03 | 1.934017E-03 | |
| 21 | -2.353540E-04 | -9.281110E-04 | 2.438515E-03 | -8.641100E-05 | |
| 22 | 1.764670E-02 | 3.613872E-03 | -1.138502E-02 | 5.988846E-03 | |
| 31 | -1.025436E-02 | 3.440775E-03 | 1.105282E-02 | -4.831917E-03 | |
| 32 | 1.981177E-02 | 1.994686E-02 | -9.423065E-03 | 1.193090E-04 | |
| 41 | -4.092069E-02 | 6.459870E-03 | 3.223144E-02 | -1.325642E-02 | |
| 42 | 2.912244E-02 | -6.457553E-03 | -1.733256E-03 | 1.640441E-03 | |
| 51 | 4.713100E-03 | 1.879975E-03 | -7.790020E-04 | 9.184600E-05 | |
| 52 | -1.811633E-03 | 1.113000E-06 | -3.205540E-04 | 5.678800E-05 | |
| 61 | -1.031326E-03 | 5.749000E-06 | 1.055400E-05 | 1.793000E-06 | |
| 62 | -2.264600E-05 | -7.817500E-05 | 7.050000E-07 | 9.250000E-07 | |
| 71 | -1.078250E-04 | 3.532000E-06 | 9.940000E-07 | -5.900000E-08 | |
| 72 | 1.700840E-04 | 5.990000E-07 | -5.350000E-07 | 3.400000E-08 | |

FIG. 47

| Eighth Example ||||||||
|---|---|---|---|---|---|---|---|
| TTL=4.952mm; EFL=3.932mm; HFOV= 40.260deg.; Image height=3.437mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.570 | | | | | |
| 11 | First Lens | 1.745 | 0.717 | T1 | 1.545 | 55.987 | 3.804 | Plastic |
| 12 | | 9.307 | 0.034 | G12 | | | | |
| 21 | Second Lens | 4.451 | 0.230 | T2 | 1.661 | 20.412 | -8.724 | Plastic |
| 22 | | 2.470 | 0.293 | G23 | | | | |
| 31 | Third Lens | 5.499 | 0.330 | T3 | 1.540 | 50.000 | 17.425 | Plastic |
| 32 | | 12.739 | 0.212 | G34 | | | | |
| 41 | Fourth Lens | 6.784 | 0.269 | T4 | 1.661 | 20.412 | -313.503 | Plastic |
| 42 | | 6.466 | 0.295 | G45 | | | | |
| 51 | Fifth Lens | -3.356 | 0.689 | T5 | 1.540 | 50.000 | 3.241 | Plastic |
| 52 | | -1.243 | 0.041 | G56 | | | | |
| 61 | Sixth Lens | 4.329 | 0.316 | T6 | 1.531 | 55.745 | 157.135 | Plastic |
| 62 | | 4.449 | 0.247 | G67 | | | | |
| 71 | Seventh Lens | -2.980 | 0.268 | T7 | 1.531 | 55.745 | -2.585 | Plastic |
| 72 | | 2.642 | 0.300 | G7F | | | | |
| 90 | Filter | Infinity | 0.210 | | 1.517 | 64.167 | | |
| | | Infinity | 0.502 | | | | | |
| 91 | Image Plane | Infinity | | | | | | |

FIG. 48

| No. | K | $a_2$ | $a_4$ | $a_6$ | $a_8$ | $a_{10}$ |
|---|---|---|---|---|---|---|
| 11 | 0.000000E+00 | 0.000000E+00 | 8.606990E-04 | 1.374003E-03 | 7.915780E-03 | -1.282680E-02 |
| 12 | 0.000000E+00 | 0.000000E+00 | -4.507732E-02 | 2.929987E-02 | 1.686978E-02 | -2.905029E-02 |
| 21 | 0.000000E+00 | 0.000000E+00 | -1.229957E-01 | 8.085575E-02 | -2.932006E-02 | 4.955481E-03 |
| 22 | 0.000000E+00 | 0.000000E+00 | -8.915862E-02 | 2.895903E-02 | -1.997793E-02 | 7.462797E-03 |
| 31 | 0.000000E+00 | 0.000000E+00 | -3.363286E-02 | -3.573734E-02 | -3.288908E-02 | 8.135000E-04 |
| 32 | 0.000000E+00 | 0.000000E+00 | -8.127786E-02 | 8.707396E-03 | -8.923651E-02 | 2.252000E-02 |
| 41 | 0.000000E+00 | 0.000000E+00 | -1.813077E-01 | -1.346489E-02 | -4.847091E-02 | -1.372107E-03 |
| 42 | 0.000000E+00 | 0.000000E+00 | -1.068493E-01 | -3.662761E-02 | -8.425796E-03 | 2.773415E-02 |
| 51 | 0.000000E+00 | 0.000000E+00 | 2.538314E-02 | -4.148919E-02 | 2.195841E-03 | 2.508746E-03 |
| 52 | -7.279187E-01 | 0.000000E+00 | 6.465725E-02 | -2.997628E-02 | 1.736327E-02 | -1.308016E-03 |
| 61 | 0.000000E+00 | 0.000000E+00 | -1.090275E-01 | -1.169193E-02 | 3.497797E-03 | 8.598982E-05 |
| 62 | 0.000000E+00 | 0.000000E+00 | -5.274124E-02 | -1.996423E-02 | 7.263513E-03 | -6.068251E-05 |
| 71 | 0.000000E+00 | 0.000000E+00 | 9.592353E-03 | 7.003818E-03 | -6.970984E-04 | -1.240043E-04 |
| 72 | -1.792289E+01 | 0.000000E+00 | -5.529477E-02 | 1.675290E-02 | -2.752691E-03 | 9.072990E-05 |

| No. | $a_{12}$ | $a_{14}$ | $a_{16}$ | $a_{18}$ | $a_{20}$ |
|---|---|---|---|---|---|
| 11 | 7.581380E-03 | -3.837400E-05 | -7.690190E-04 | 0.000000E+00 | 0.000000E+00 |
| 12 | 1.071035E-02 | -1.164138E-03 | 2.881830E-04 | 0.000000E+00 | 0.000000E+00 |
| 21 | -2.032247E-03 | -1.383690E-04 | 1.139830E-03 | 0.000000E+00 | 0.000000E+00 |
| 22 | 8.049481E-03 | -1.073861E-02 | 4.339561E-03 | 0.000000E+00 | 0.000000E+00 |
| 31 | 4.008588E-03 | 3.021224E-03 | -4.934842E-03 | 0.000000E+00 | 0.000000E+00 |
| 32 | 3.116852E-02 | -1.891117E-02 | 1.731923E-03 | 0.000000E+00 | 0.000000E+00 |
| 41 | 2.127904E-02 | 4.424596E-02 | -2.709439E-02 | 0.000000E+00 | 0.000000E+00 |
| 42 | -3.557002E-03 | -2.507712E-03 | 2.258550E-03 | 0.000000E+00 | 0.000000E+00 |
| 51 | 7.603650E-04 | -2.333190E-04 | -1.432890E-04 | 0.000000E+00 | 0.000000E+00 |
| 52 | 5.159190E-04 | -4.295970E-04 | -7.090000E-07 | 0.000000E+00 | 0.000000E+00 |
| 61 | 3.924141E-04 | 1.749623E-05 | -1.630605E-05 | -1.882457E-06 | 2.170670E-07 |
| 62 | -8.470465E-05 | -7.580011E-06 | -2.842564E-06 | -2.057265E-07 | 2.231858E-07 |
| 71 | 5.684879E-06 | 2.646213E-06 | 7.207092E-08 | -1.610381E-08 | -2.274720E-09 |
| 72 | 9.828434E-06 | 1.132139E-06 | -3.076784E-08 | -1.999274E-08 | 2.859707E-11 |

FIG. 49

| Ninth Example | | | | | | | |
|---|---|---|---|---|---|---|---|
| TTL=4.932mm; EFL=3.935mm; HFOV= 40.260deg.; Image height=3.436mm; Fno=1.55 | | | | | | | |
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.557 | | | | | |
| 11 | First Lens | 1.760 | 0.701 | T1 | 1.545 | 55.987 | 3.856 | Plastic |
| 12 | | 9.210 | 0.045 | G12 | | | | |
| 21 | Second Lens | 4.553 | 0.208 | T2 | 1.661 | 20.412 | -8.876 | Plastic |
| 22 | | 2.527 | 0.244 | G23 | | | | |
| 31 | Third Lens | 5.024 | 0.354 | T3 | 1.545 | 55.987 | 16.087 | Plastic |
| 32 | | 11.438 | 0.242 | G34 | | | | |
| 41 | Fourth Lens | 8.331 | 0.253 | T4 | 1.661 | 20.412 | -89.763 | Plastic |
| 42 | | 7.225 | 0.187 | G45 | | | | |
| 51 | Fifth Lens | -3.302 | 0.729 | T5 | 1.545 | 55.987 | 3.484 | Plastic |
| 52 | | -1.302 | 0.192 | G56 | | | | |
| 61 | Sixth Lens | 4.329 | 0.298 | T6 | 1.531 | 55.745 | 308.144 | Plastic |
| 62 | | 4.340 | 0.291 | G67 | | | | |
| 71 | Seventh Lens | -2.963 | 0.260 | T7 | 1.531 | 55.745 | -2.555 | Plastic |
| 72 | | 2.595 | 0.300 | G7F | | | | |
| 90 | Filter | Infinity | 0.210 | | 1.517 | 64.167 | | |
| | | Infinity | 0.418 | | | | | |
| 91 | Image Plane | Infinity | | | | | | |

FIG. 50

| No. | K | $a_2$ | $a_4$ | $a_6$ | $a_8$ | $a_{10}$ |
|---|---|---|---|---|---|---|
| 11 | 0.000000E+00 | 0.000000E+00 | 7.757630E-04 | 1.315462E-03 | 7.869608E-03 | -1.285926E-02 |
| 12 | 0.000000E+00 | 0.000000E+00 | -4.496557E-02 | 2.917066E-02 | 1.691802E-02 | -2.896452E-02 |
| 21 | 0.000000E+00 | 0.000000E+00 | -1.220089E-01 | 8.143400E-02 | -2.915355E-02 | 4.909088E-03 |
| 22 | 0.000000E+00 | 0.000000E+00 | -9.071132E-02 | 2.695966E-02 | -2.099991E-02 | 7.042864E-03 |
| 31 | 0.000000E+00 | 0.000000E+00 | -3.717483E-02 | -3.705443E-02 | -3.217656E-02 | 2.110499E-03 |
| 32 | 0.000000E+00 | 0.000000E+00 | -7.596084E-02 | 1.100488E-02 | -8.830798E-02 | 2.283757E-02 |
| 41 | 0.000000E+00 | 0.000000E+00 | -1.866087E-01 | -1.494929E-02 | -4.882365E-02 | -1.727669E-03 |
| 42 | 0.000000E+00 | 0.000000E+00 | -1.082522E-01 | -3.735202E-02 | -8.264338E-03 | 2.810506E-02 |
| 51 | 0.000000E+00 | 0.000000E+00 | 3.282077E-02 | -3.811398E-02 | 2.771539E-03 | 2.518681E-03 |
| 52 | -7.008410E-01 | 0.000000E+00 | 6.021628E-02 | -3.019665E-02 | 1.757747E-02 | -1.216321E-03 |
| 61 | 0.000000E+00 | 0.000000E+00 | -1.087276E-01 | -1.169591E-02 | 3.492681E-03 | 8.525194E-05 |
| 62 | 0.000000E+00 | 0.000000E+00 | -5.248447E-02 | -1.988221E-02 | 7.276981E-03 | -5.959492E-05 |
| 71 | 0.000000E+00 | 0.000000E+00 | 9.102855E-03 | 6.971510E-03 | -6.970187E-04 | -1.236839E-04 |
| 72 | -1.695069E+01 | 0.000000E+00 | -5.490258E-02 | 1.688350E-02 | -2.742150E-03 | 9.123888E-05 |
| No. | $a_{12}$ | $a_{14}$ | $a_{16}$ | $a_{18}$ | $a_{20}$ | |
| 11 | 7.557099E-03 | -6.094900E-05 | -7.754360E-04 | 0.000000E+00 | 0.000000E+00 | |
| 12 | 1.074496E-02 | -1.181933E-03 | 2.410730E-04 | 0.000000E+00 | 0.000000E+00 | |
| 21 | -2.110815E-03 | -1.845030E-04 | 1.123915E-03 | 0.000000E+00 | 0.000000E+00 | |
| 22 | 7.872253E-03 | -1.084708E-02 | 4.232966E-03 | 0.000000E+00 | 0.000000E+00 | |
| 31 | 5.392810E-03 | 4.175486E-03 | -4.026490E-03 | 0.000000E+00 | 0.000000E+00 | |
| 32 | 3.142851E-02 | -1.863791E-02 | 1.983169E-03 | 0.000000E+00 | 0.000000E+00 | |
| 41 | 2.109279E-02 | 4.419196E-02 | -2.699580E-02 | 0.000000E+00 | 0.000000E+00 | |
| 42 | -3.277308E-03 | -2.419746E-03 | 2.155298E-03 | 0.000000E+00 | 0.000000E+00 | |
| 51 | 7.201790E-04 | -1.845280E-04 | -1.810300E-05 | 0.000000E+00 | 0.000000E+00 | |
| 52 | 5.475950E-04 | -4.166730E-04 | 6.111000E-06 | 0.000000E+00 | 0.000000E+00 | |
| 61 | 3.924222E-04 | 1.754287E-05 | -1.628218E-05 | -1.872511E-06 | 2.210557E-07 | |
| 62 | -8.462549E-05 | -7.574640E-06 | -2.840363E-06 | -2.044904E-07 | 2.236829E-07 | |
| 71 | 5.736684E-06 | 2.651496E-06 | 7.236916E-08 | -1.612567E-08 | -2.285490E-09 | |
| 72 | 9.864261E-06 | 1.130313E-06 | -3.266458E-08 | -2.031860E-08 | 2.878331E-11 | |

FIG. 51

| Tenth Example ||||||||
|---|---|---|---|---|---|---|---|
| TTL=4.839mm; EFL=3.947mm; HFOV= 40.260deg.; Image height=3.435mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.635 | | | | | |
| 11 | First Lens | 1.729 | 0.751 | T1 | 1.545 | 55.987 | 3.875 | Plastic |
| 12 | | 7.994 | 0.040 | G12 | | | | |
| 21 | Second Lens | 4.643 | 0.221 | T2 | 1.661 | 20.412 | -8.695 | Plastic |
| 22 | | 2.530 | 0.264 | G23 | | | | |
| 31 | Third Lens | 5.620 | 0.377 | T3 | 1.545 | 55.987 | 14.439 | Plastic |
| 32 | | 19.092 | 0.191 | G34 | | | | |
| 41 | Fourth Lens | 7.718 | 0.269 | T4 | 1.661 | 20.412 | 797.062 | Plastic |
| 42 | | 7.722 | 0.377 | G45 | | | | |
| 51 | Fifth Lens | -3.080 | 0.501 | T5 | 1.545 | 55.987 | 3.702 | Plastic |
| 52 | | -1.291 | 0.063 | G56 | | | | |
| 61 | Sixth Lens | 4.279 | 0.299 | T6 | 1.531 | 55.745 | 161.575 | Plastic |
| 62 | | 4.394 | 0.297 | G67 | | | | |
| 71 | Seventh Lens | -2.941 | 0.270 | T7 | 1.531 | 55.745 | -2.573 | Plastic |
| 72 | | 2.650 | 0.300 | G7F | | | | |
| 90 | Filter | Infinity | 0.210 | | 1.517 | 64.167 | | |
| | | Infinity | 0.408 | | | | | |
| 91 | Image Plane | Infinity | | | | | | |

FIG. 52

| No. | K | $a_2$ | $a_4$ | $a_6$ | $a_8$ | $a_{10}$ |
|---|---|---|---|---|---|---|
| 11 | 0.000000E+00 | 0.000000E+00 | 1.377709E-03 | 1.598680E-04 | 7.334465E-03 | -1.275671E-02 |
| 12 | 0.000000E+00 | 0.000000E+00 | -4.417595E-02 | 2.537246E-02 | 1.600806E-02 | -2.821527E-02 |
| 21 | 0.000000E+00 | 0.000000E+00 | -1.225939E-01 | 8.150862E-02 | -2.832342E-02 | 5.901558E-03 |
| 22 | 0.000000E+00 | 0.000000E+00 | -8.735087E-02 | 3.327711E-02 | -1.896646E-02 | 7.698894E-03 |
| 31 | 0.000000E+00 | 0.000000E+00 | -2.016727E-02 | -4.056906E-02 | -2.776926E-02 | 5.288144E-03 |
| 32 | 0.000000E+00 | 0.000000E+00 | -7.149892E-02 | 1.301745E-02 | -8.919258E-02 | 2.357537E-02 |
| 41 | 0.000000E+00 | 0.000000E+00 | -1.767880E-01 | -1.114326E-02 | -4.734775E-02 | -4.980237E-03 |
| 42 | 0.000000E+00 | 0.000000E+00 | -1.068321E-01 | -3.648557E-02 | -8.475880E-03 | 2.715248E-02 |
| 51 | 0.000000E+00 | 0.000000E+00 | 2.824170E-02 | -4.278079E-02 | 1.237259E-03 | 2.088268E-03 |
| 52 | -7.182775E-01 | 0.000000E+00 | 6.361416E-02 | -3.010346E-02 | 1.738349E-02 | -1.310958E-03 |
| 61 | 0.000000E+00 | 0.000000E+00 | -1.083692E-01 | -1.158079E-02 | 3.517208E-03 | 9.021592E-05 |
| 62 | 0.000000E+00 | 0.000000E+00 | -5.262463E-02 | -1.992479E-02 | 7.267657E-03 | -6.172214E-05 |
| 71 | 0.000000E+00 | 0.000000E+00 | 9.053976E-03 | 6.933113E-03 | -7.038049E-04 | -1.245747E-04 |
| 72 | -1.936970E+01 | 0.000000E+00 | -5.395940E-02 | 1.675043E-02 | -2.762724E-03 | 8.784996E-05 |
| No. | $a_{12}$ | $a_{14}$ | $a_{16}$ | $a_{18}$ | $a_{20}$ | |
| 11 | 7.578631E-03 | -1.489890E-04 | -8.843780E-04 | 0.000000E+00 | 0.000000E+00 | |
| 12 | 1.124096E-02 | -1.136505E-03 | 1.341110E-04 | 0.000000E+00 | 0.000000E+00 | |
| 21 | -1.507014E-03 | 1.984000E-06 | 9.271820E-04 | 0.000000E+00 | 0.000000E+00 | |
| 22 | 8.225753E-03 | -1.055288E-02 | 4.436247E-03 | 0.000000E+00 | 0.000000E+00 | |
| 31 | 7.095778E-03 | 3.958215E-03 | -5.795993E-03 | 0.000000E+00 | 0.000000E+00 | |
| 32 | 3.271856E-02 | -1.840403E-02 | 5.745170E-04 | 0.000000E+00 | 0.000000E+00 | |
| 41 | 1.659239E-02 | 4.276187E-02 | -2.511575E-02 | 0.000000E+00 | 0.000000E+00 | |
| 42 | -4.477079E-03 | -3.191348E-03 | 2.751113E-03 | 0.000000E+00 | 0.000000E+00 | |
| 51 | 7.249910E-04 | -1.233100E-04 | -1.605600E-05 | 0.000000E+00 | 0.000000E+00 | |
| 52 | 5.142290E-04 | -4.191310E-04 | 1.250900E-05 | 0.000000E+00 | 0.000000E+00 | |
| 61 | 3.933456E-04 | 1.758644E-05 | -1.632241E-05 | -1.924025E-06 | 1.992389E-07 | |
| 62 | -8.513367E-05 | -7.696087E-06 | -2.869116E-06 | -2.112515E-07 | 2.221305E-07 | |
| 71 | 5.630181E-06 | 2.639867E-06 | 7.093544E-08 | -1.636259E-08 | -2.334193E-09 | |
| 72 | 9.294243E-06 | 1.083186E-06 | -2.879629E-08 | -1.899772E-08 | 1.955253E-10 | |

FIG. 53

| Eleventh Example ||||||||
|---|---|---|---|---|---|---|---|
| TTL=4.992mm; EFL=3.925mm; HFOV= 40.260deg.; Image height=3.436mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.546 | | | | | |
| 11 | First Lens | 1.767 | 0.680 | T1 | 1.545 | 55.987 | 3.907 | Plastic |
| 12 | | 8.889 | 0.074 | G12 | | | | |
| 21 | Second Lens | 4.522 | 0.217 | T2 | 1.661 | 20.412 | -8.819 | Plastic |
| 22 | | 2.508 | 0.251 | G23 | | | | |
| 31 | Third Lens | 5.657 | 0.370 | T3 | 1.545 | 55.987 | 17.355 | Plastic |
| 32 | | 13.705 | 0.205 | G34 | | | | |
| 41 | Fourth Lens | 7.387 | 0.328 | T4 | 1.661 | 20.412 | -129.058 | Plastic |
| 42 | | 6.682 | 0.310 | G45 | | | | |
| 51 | Fifth Lens | -3.442 | 0.653 | T5 | 1.545 | 55.987 | 3.206 | Plastic |
| 52 | | -1.239 | 0.051 | G56 | | | | |
| 61 | Sixth Lens | 4.312 | 0.318 | T6 | 1.531 | 55.745 | 160.478 | Plastic |
| 62 | | 4.424 | 0.277 | G67 | | | | |
| 71 | Seventh Lens | -2.978 | 0.267 | T7 | 1.531 | 55.745 | -2.597 | Plastic |
| 72 | | 2.666 | 0.300 | G7F | | | | |
| 90 | Filter | Infinity | 0.210 | | 1.517 | 64.167 | | |
| | | Infinity | 0.482 | | | | | |
| 91 | Image Plane | Infinity | | | | | | |

FIG. 54

| No. | K | $a_2$ | $a_4$ | $a_6$ | $a_8$ | $a_{10}$ |
|---|---|---|---|---|---|---|
| 11 | 0.000000E+00 | 0.000000E+00 | 7.973030E-04 | 1.064422E-03 | 7.622675E-03 | -1.296957E-02 |
| 12 | 0.000000E+00 | 0.000000E+00 | -4.097505E-02 | 2.845675E-02 | 1.638088E-02 | -2.880188E-02 |
| 21 | 0.000000E+00 | 0.000000E+00 | -1.213421E-01 | 8.224658E-02 | -2.943526E-02 | 4.729721E-03 |
| 22 | 0.000000E+00 | 0.000000E+00 | -9.100424E-02 | 2.569631E-02 | -2.099567E-02 | 7.082236E-03 |
| 31 | 0.000000E+00 | 0.000000E+00 | -2.547031E-02 | -3.338759E-02 | -3.221527E-02 | 1.212499E-03 |
| 32 | 0.000000E+00 | 0.000000E+00 | -7.746196E-02 | 1.148798E-02 | -8.689498E-02 | 2.375891E-02 |
| 41 | 0.000000E+00 | 0.000000E+00 | -1.823751E-01 | -1.387343E-02 | -4.872823E-02 | -1.428455E-03 |
| 42 | 0.000000E+00 | 0.000000E+00 | -1.043769E-01 | -3.550354E-02 | -8.423425E-03 | 2.716304E-02 |
| 51 | 0.000000E+00 | 0.000000E+00 | 2.441118E-02 | -4.171260E-02 | 2.217132E-03 | 2.735289E-03 |
| 52 | -7.239256E-01 | 0.000000E+00 | 6.417185E-02 | -3.003480E-02 | 1.734988E-02 | -1.348724E-03 |
| 61 | 0.000000E+00 | 0.000000E+00 | -1.088650E-01 | -1.169769E-02 | 3.488973E-03 | 8.449480E-05 |
| 62 | 0.000000E+00 | 0.000000E+00 | -5.263307E-02 | -1.993275E-02 | 7.267996E-03 | -6.082088E-05 |
| 71 | 0.000000E+00 | 0.000000E+00 | 9.424908E-03 | 6.994081E-03 | -6.964578E-04 | -1.238267E-04 |
| 72 | -1.720970E+01 | 0.000000E+00 | -5.494890E-02 | 1.680126E-02 | -2.750061E-03 | 9.112460E-05 |

| No. | $a_{12}$ | $a_{14}$ | $a_{16}$ | $a_{18}$ | $a_{20}$ |
|---|---|---|---|---|---|
| 11 | 7.533703E-03 | -6.002300E-05 | -7.770020E-04 | 0.000000E+00 | 0.000000E+00 |
| 12 | 1.089732E-02 | -1.154271E-03 | 1.886530E-04 | 0.000000E+00 | 0.000000E+00 |
| 21 | -2.121781E-03 | -1.171950E-04 | 1.210281E-03 | 0.000000E+00 | 0.000000E+00 |
| 22 | 7.862878E-03 | -1.084123E-02 | 4.115652E-03 | 0.000000E+00 | 0.000000E+00 |
| 31 | 4.523733E-03 | 3.627728E-03 | -4.240397E-03 | 0.000000E+00 | 0.000000E+00 |
| 32 | 3.167464E-02 | -1.891883E-02 | 1.647271E-03 | 0.000000E+00 | 0.000000E+00 |
| 41 | 2.135413E-02 | 4.417916E-02 | -2.730710E-02 | 0.000000E+00 | 0.000000E+00 |
| 42 | -3.761563E-03 | -2.674274E-03 | 2.151373E-03 | 0.000000E+00 | 0.000000E+00 |
| 51 | 8.517950E-04 | -1.808560E-04 | -1.286990E-04 | 0.000000E+00 | 0.000000E+00 |
| 52 | 5.005670E-04 | -4.350160E-04 | -1.056000E-06 | 0.000000E+00 | 0.000000E+00 |
| 61 | 3.922548E-04 | 1.749957E-05 | -1.631283E-05 | -1.881918E-06 | 2.179358E-07 |
| 62 | -8.480321E-05 | -7.609784E-06 | -2.849894E-06 | -2.072953E-07 | 2.229063E-07 |
| 71 | 5.712058E-06 | 2.649179E-06 | 7.155803E-08 | -1.668083E-08 | -2.428160E-09 |
| 72 | 9.894532E-06 | 1.140708E-06 | -3.030024E-08 | -2.003398E-08 | 1.537342E-11 |

FIG. 55

| Twelfth Example ||||||||
|---|---|---|---|---|---|---|---|
| TTL=4.991mm; EFL=3.946mm; HFOV= 40.260deg.; Image height=3.444mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.564 | | | | | |
| 11 | First Lens | 1.784 | 0.707 | T1 | 1.545 | 55.987 | 3.879 | Plastic |
| 12 | | 9.722 | 0.033 | G12 | | | | |
| 21 | Second Lens | 4.586 | 0.217 | T2 | 1.661 | 20.412 | -8.537 | Plastic |
| 22 | | 2.492 | 0.267 | G23 | | | | |
| 31 | Third Lens | 5.506 | 0.328 | T3 | 1.545 | 55.987 | 19.757 | Plastic |
| 32 | | 11.004 | 0.201 | G34 | | | | |
| 41 | Fourth Lens | 10.442 | 0.265 | T4 | 1.661 | 20.412 | -91.298 | Plastic |
| 42 | | 8.824 | 0.269 | G45 | | | | |
| 51 | Fifth Lens | -3.442 | 0.632 | T5 | 1.545 | 55.987 | 3.166 | Plastic |
| 52 | | -1.226 | 0.033 | G56 | | | | |
| 61 | Sixth Lens | 4.061 | 0.299 | T6 | 1.531 | 55.745 | 37.826 | Plastic |
| 62 | | 4.955 | 0.245 | G67 | | | | |
| 71 | Seventh Lens | -3.089 | 0.264 | T7 | 1.531 | 55.745 | -2.748 | Plastic |
| 72 | | 2.867 | 0.300 | G7F | | | | |
| 90 | Filter | Infinity | 0.210 | | 1.517 | 64.167 | | |
| | | Infinity | 0.722 | | | | | |
| 91 | Image Plane | Infinity | | | | | | |

FIG. 56

| No. | K | $a_2$ | $a_4$ | $a_6$ | $a_8$ | $a_{10}$ |
|---|---|---|---|---|---|---|
| 11 | 0.000000E+00 | 0.000000E+00 | 2.002590E-03 | 1.080043E-03 | 7.562614E-03 | -1.304011E-02 |
| 12 | 0.000000E+00 | 0.000000E+00 | -4.464870E-02 | 2.876993E-02 | 1.683754E-02 | -2.883610E-02 |
| 21 | 0.000000E+00 | 0.000000E+00 | -1.213887E-01 | 8.195661E-02 | -2.893037E-02 | 5.003188E-03 |
| 22 | 0.000000E+00 | 0.000000E+00 | -9.045985E-02 | 2.865195E-02 | -2.047997E-02 | 6.895702E-03 |
| 31 | 0.000000E+00 | 0.000000E+00 | -3.426688E-02 | -3.560971E-02 | -3.029831E-02 | 2.490902E-03 |
| 32 | 0.000000E+00 | 0.000000E+00 | -7.561887E-02 | 1.023667E-02 | -8.870295E-02 | 2.293131E-02 |
| 41 | 0.000000E+00 | 0.000000E+00 | -1.819344E-01 | -1.010347E-02 | -4.617617E-02 | -1.312798E-03 |
| 42 | 0.000000E+00 | 0.000000E+00 | -1.056943E-01 | -3.653887E-02 | -8.540790E-03 | 2.766861E-02 |
| 51 | 0.000000E+00 | 0.000000E+00 | 2.583029E-02 | -4.177622E-02 | 1.818831E-03 | 2.256247E-03 |
| 52 | -7.316287E-01 | 0.000000E+00 | 6.538827E-02 | -2.984584E-02 | 1.751486E-02 | -1.216083E-03 |
| 61 | 0.000000E+00 | 0.000000E+00 | -1.084083E-01 | -1.167579E-02 | 3.457908E-03 | 7.015916E-05 |
| 62 | 0.000000E+00 | 0.000000E+00 | -5.266614E-02 | -1.983186E-02 | 7.324408E-03 | -4.855455E-05 |
| 71 | 0.000000E+00 | 0.000000E+00 | 9.477452E-03 | 6.970400E-03 | -6.969243E-04 | -1.226286E-04 |
| 72 | -2.084503E+01 | 0.000000E+00 | -5.474294E-02 | 1.684388E-02 | -2.741574E-03 | 9.160978E-05 |
| No. | $a_{12}$ | $a_{14}$ | $a_{16}$ | $a_{18}$ | $a_{20}$ | |
| 11 | 7.501264E-03 | -6.061900E-05 | -7.665680E-04 | 0.000000E+00 | 0.000000E+00 | |
| 12 | 1.081380E-02 | -1.207320E-03 | 1.925540E-04 | 0.000000E+00 | 0.000000E+00 | |
| 21 | -2.100023E-03 | -2.608660E-04 | 9.734130E-04 | 0.000000E+00 | 0.000000E+00 | |
| 22 | 7.539400E-03 | -1.123169E-02 | 3.867470E-03 | 0.000000E+00 | 0.000000E+00 | |
| 31 | 5.162443E-03 | 3.287795E-03 | -5.081564E-03 | 0.000000E+00 | 0.000000E+00 | |
| 32 | 3.149398E-02 | -1.881783E-02 | 1.537919E-03 | 0.000000E+00 | 0.000000E+00 | |
| 41 | 2.055908E-02 | 4.392597E-02 | -2.684275E-02 | 0.000000E+00 | 0.000000E+00 | |
| 42 | -3.602657E-03 | -2.429084E-03 | 2.539281E-03 | 0.000000E+00 | 0.000000E+00 | |
| 51 | 6.306360E-04 | -2.140130E-04 | -4.750700E-05 | 0.000000E+00 | 0.000000E+00 | |
| 52 | 5.380880E-04 | -4.393900E-04 | -1.947600E-05 | 0.000000E+00 | 0.000000E+00 | |
| 61 | 3.896866E-04 | 1.770741E-05 | -1.605189E-05 | -1.715471E-06 | 2.800031E-07 | |
| 62 | -8.296472E-05 | -7.375155E-06 | -2.819599E-06 | -2.032811E-07 | 2.246421E-07 | |
| 71 | 5.999845E-06 | 2.696787E-06 | 7.282566E-08 | -1.886564E-08 | -3.539256E-09 | |
| 72 | 9.821387E-06 | 1.117547E-06 | -3.319103E-08 | -2.045284E-08 | -3.169583E-11 | |

FIG. 57

| Thirteenth Example ||||||||
|---|---|---|---|---|---|---|---|
| TTL=4.919mm; EFL=3.875mm; HFOV= 39.500deg.; Image height=3.337mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.447 | | | | | |
| 11 | First Lens | 1.935 | 0.511 | T1 | 1.545 | 55.987 | 4.212 | Plastic |
| 12 | | 11.026 | 0.091 | G12 | | | | |
| 21 | Second Lens | 4.370 | 0.444 | T2 | 1.661 | 20.412 | 9.631 | Plastic |
| 22 | | 2.487 | 0.205 | G23 | | | | |
| 31 | Third Lens | 5.154 | 0.480 | T3 | 1.545 | 55.987 | 12.326 | Plastic |
| 32 | | 21.242 | 0.190 | G34 | | | | |
| 41 | Fourth Lens | 8.149 | 0.256 | T4 | 1.661 | 20.412 | -34.088 | Plastic |
| 42 | | 5.924 | 0.296 | G45 | | | | |
| 51 | Fifth Lens | -2.903 | 0.388 | T5 | 1.545 | 55.987 | 4.061 | Plastic |
| 52 | | -1.317 | 0.019 | G56 | | | | |
| 61 | Sixth Lens | 4.311 | 0.687 | T6 | 1.531 | 55.745 | 68.641 | Plastic |
| 62 | | 4.617 | 0.234 | G67 | | | | |
| 71 | Seventh Lens | -2.962 | 0.259 | T7 | 1.531 | 55.745 | -2.587 | Plastic |
| 72 | | 2.657 | 0.300 | G7F | | | | |
| 90 | Filter | Infinity | 0.210 | | 1.517 | 64.167 | | |
| | | Infinity | 0.350 | | | | | |
| 91 | Image Plane | Infinity | | | | | | |

FIG. 58

| No. | K | $a_2$ | $a_4$ | $a_6$ | $a_8$ | $a_{10}$ |
|---|---|---|---|---|---|---|
| 11 | 0.000000E+00 | 0.000000E+00 | -1.226730E-03 | -9.313090E-04 | 7.448642E-03 | -1.306440E-02 |
| 12 | 0.000000E+00 | 0.000000E+00 | -4.453324E-02 | 3.157285E-02 | 1.916441E-02 | -2.744724E-02 |
| 21 | 0.000000E+00 | 0.000000E+00 | -1.005205E-01 | 8.839244E-02 | -2.832857E-02 | 4.540373E-03 |
| 22 | 0.000000E+00 | 0.000000E+00 | -9.232185E-02 | 2.722098E-02 | -2.216508E-02 | 5.538853E-03 |
| 31 | 0.000000E+00 | 0.000000E+00 | -5.566299E-02 | -3.595273E-02 | -2.840896E-02 | 3.685414E-03 |
| 32 | 0.000000E+00 | 0.000000E+00 | -8.177247E-02 | 9.016883E-03 | -8.627859E-02 | 2.691090E-02 |
| 41 | 0.000000E+00 | 0.000000E+00 | -1.677877E-01 | -8.381639E-03 | -4.742764E-02 | -4.217282E-03 |
| 42 | 0.000000E+00 | 0.000000E+00 | -1.125422E-01 | -3.751064E-02 | -9.398863E-03 | 2.806381E-02 |
| 51 | 0.000000E+00 | 0.000000E+00 | 2.672689E-02 | -4.230902E-02 | 1.017835E-03 | 1.710908E-03 |
| 52 | -7.246366E-01 | 0.000000E+00 | 6.484426E-02 | -2.991792E-02 | 1.741501E-02 | -1.217459E-03 |
| 61 | 0.000000E+00 | 0.000000E+00 | -1.068477E-01 | -1.107980E-02 | 3.679774E-03 | 1.431505E-04 |
| 62 | 0.000000E+00 | 0.000000E+00 | -5.394246E-02 | -2.004128E-02 | 7.252218E-03 | -6.375525E-05 |
| 71 | 0.000000E+00 | 0.000000E+00 | 9.216274E-03 | 6.954108E-03 | -7.035682E-04 | -1.247327E-04 |
| 72 | -2.587031E+01 | 0.000000E+00 | -5.314276E-02 | 1.696735E-02 | -2.756974E-03 | 8.952308E-05 |

| No. | $a_{12}$ | $a_{14}$ | $a_{16}$ | $a_{18}$ | $a_{20}$ |
|---|---|---|---|---|---|
| 11 | 7.489179E-03 | -2.323400E-05 | -6.385310E-04 | 0.000000E+00 | 0.000000E+00 |
| 12 | 1.122790E-02 | -1.336041E-03 | -1.611880E-04 | 0.000000E+00 | 0.000000E+00 |
| 21 | -2.587762E-03 | -6.463900E-04 | 6.565630E-04 | 0.000000E+00 | 0.000000E+00 |
| 22 | 6.582623E-03 | -1.169289E-02 | 3.617746E-03 | 0.000000E+00 | 0.000000E+00 |
| 31 | 6.730899E-03 | 5.200384E-03 | -2.767484E-03 | 0.000000E+00 | 0.000000E+00 |
| 32 | 3.437703E-02 | -1.787171E-02 | 1.845302E-03 | 0.000000E+00 | 0.000000E+00 |
| 41 | 1.651106E-02 | 4.275188E-02 | -2.518198E-02 | 0.000000E+00 | 0.000000E+00 |
| 42 | -4.140001E-03 | -3.173801E-03 | 1.502794E-03 | 0.000000E+00 | 0.000000E+00 |
| 51 | 3.099420E-04 | -4.246100E-04 | -2.115690E-04 | 0.000000E+00 | 0.000000E+00 |
| 52 | 5.977450E-04 | -3.535820E-04 | 1.113800E-05 | 0.000000E+00 | 0.000000E+00 |
| 61 | 4.100921E-04 | 2.267169E-05 | -1.500889E-05 | -1.727967E-06 | 9.031540E-08 |
| 62 | -8.540546E-05 | -7.744039E-06 | -2.881372E-06 | -2.148947E-07 | 2.210679E-07 |
| 71 | 5.272686E-06 | 2.610229E-06 | 7.087807E-08 | -1.526443E-08 | -1.850776E-09 |
| 72 | 9.639074E-06 | 1.115424E-06 | -3.103888E-08 | -1.967516E-08 | 1.018757E-10 |

FIG. 59

| Fourteenth Example ||||||||
|---|---|---|---|---|---|---|---|
| TTL=4.979mm; EFL=3.898mm; HFOV= 40.260deg.; Image height=3.428mm; Fno=1.55 ||||||||
| No. | | Curvature Radius | Ape. Stop Lens Thickness Air Gap | | Refractive Index | Abbe No. | Focal Length | Material |
| | Object | Infinity | Infinity | | | | | |
| 80 | Ape. Stop | Infinity | -0.552 | | | | | |
| 11 | First Lens | 1.746 | 0.686 | T1 | 1.545 | 55.987 | 3.814 | Plastic |
| 12 | | 9.278 | 0.030 | G12 | | | | |
| 21 | Second Lens | 4.296 | 0.189 | T2 | 1.661 | 20.412 | -9.163 | Plastic |
| 22 | | 2.479 | 0.373 | G23 | | | | |
| 31 | Third Lens | 5.814 | 0.321 | T3 | 1.545 | 55.987 | 16.983 | Plastic |
| 32 | | 15.273 | 0.234 | G34 | | | | |
| 41 | Fourth Lens | 6.630 | 0.263 | T4 | 1.661 | 20.412 | -90.810 | Plastic |
| 42 | | 5.881 | 0.293 | G45 | | | | |
| 51 | Fifth Lens | -3.357 | 0.709 | T5 | 1.545 | 55.987 | 3.149 | Plastic |
| 52 | | -1.222 | 0.037 | G56 | | | | |
| 61 | Sixth Lens | 4.384 | 0.317 | T6 | 1.531 | 55.745 | 199.336 | Plastic |
| 62 | | 4.457 | 0.265 | G67 | | | | |
| 71 | Seventh Lens | -2.984 | 0.268 | T7 | 1.531 | 55.745 | -2.563 | Plastic |
| 72 | | 2.598 | 0.300 | G7F | | | | |
| 90 | Filter | Infinity | 0.210 | | 1.517 | 64.167 | | |
| | | Infinity | 0.483 | | | | | |
| 91 | Image Plane | Infinity | | | | | | |

FIG. 60

| No. | K | $a_2$ | $a_4$ | $a_6$ | $a_8$ | $a_{10}$ |
|---|---|---|---|---|---|---|
| 11 | 0.000000E+00 | 0.000000E+00 | 9.295300E-05 | 1.010019E-03 | 7.702062E-03 | -1.287653E-02 |
| 12 | 0.000000E+00 | 0.000000E+00 | -4.168343E-02 | 2.926499E-02 | 1.658894E-02 | -2.888441E-02 |
| 21 | 0.000000E+00 | 0.000000E+00 | -1.229810E-01 | 8.411902E-02 | -2.959399E-02 | 4.595110E-03 |
| 22 | 0.000000E+00 | 0.000000E+00 | -8.622773E-02 | 3.080164E-02 | -1.768788E-02 | 8.165512E-03 |
| 31 | 0.000000E+00 | 0.000000E+00 | -3.607584E-02 | -3.448651E-02 | -3.474002E-02 | -9.340860E-04 |
| 32 | 0.000000E+00 | 0.000000E+00 | -7.966446E-02 | 7.442457E-03 | -8.947387E-02 | 2.335724E-02 |
| 41 | 0.000000E+00 | 0.000000E+00 | -1.772221E-01 | -1.110885E-02 | -4.667804E-02 | -8.878870E-04 |
| 42 | 0.000000E+00 | 0.000000E+00 | -1.077941E-01 | -3.766368E-02 | -8.958876E-03 | 2.737754E-02 |
| 51 | 0.000000E+00 | 0.000000E+00 | 2.839974E-02 | -4.098350E-02 | 2.394418E-03 | 2.547973E-03 |
| 52 | -7.264119E-01 | 0.000000E+00 | 6.423310E-02 | -2.992904E-02 | 1.733590E-02 | -1.309415E-03 |
| 61 | 0.000000E+00 | 0.000000E+00 | -1.091198E-01 | -1.171557E-02 | 3.489664E-03 | 8.371470E-05 |
| 62 | 0.000000E+00 | 0.000000E+00 | -5.264563E-02 | -1.995310E-02 | 7.267212E-03 | -6.044537E-05 |
| 71 | 0.000000E+00 | 0.000000E+00 | 9.488682E-03 | 7.005595E-03 | -6.977001E-04 | -1.241254E-04 |
| 72 | -1.620025E+01 | 0.000000E+00 | -5.503128E-02 | 1.679821E-02 | -2.751399E-03 | 9.114924E-05 |
| No. | $a_{12}$ | $a_{14}$ | $a_{16}$ | $a_{18}$ | $a_{20}$ | |
| 11 | 7.659481E-03 | 1.616400E-05 | -7.135270E-04 | 0.000000E+00 | 0.000000E+00 | |
| 12 | 1.087184E-02 | -1.108148E-03 | 3.214390E-04 | 0.000000E+00 | 0.000000E+00 | |
| 21 | -2.178577E-03 | -1.863870E-04 | 1.166354E-03 | 0.000000E+00 | 0.000000E+00 | |
| 22 | 7.800450E-03 | -1.137005E-02 | 3.384548E-03 | 0.000000E+00 | 0.000000E+00 | |
| 31 | 2.805997E-03 | 2.487809E-03 | -4.791723E-03 | 0.000000E+00 | 0.000000E+00 | |
| 32 | 3.208363E-02 | -1.887953E-02 | 1.633558E-03 | 0.000000E+00 | 0.000000E+00 | |
| 41 | 2.072759E-02 | 4.379491E-02 | -2.670935E-02 | 0.000000E+00 | 0.000000E+00 | |
| 42 | -3.825566E-03 | -2.799472E-03 | 1.888999E-03 | 0.000000E+00 | 0.000000E+00 | |
| 51 | 7.235220E-04 | -2.846410E-04 | -1.905410E-04 | 0.000000E+00 | 0.000000E+00 | |
| 52 | 5.189240E-04 | -4.272340E-04 | 1.180000E-06 | 0.000000E+00 | 0.000000E+00 | |
| 61 | 3.917708E-04 | 1.735423E-05 | -1.632307E-05 | -1.875206E-06 | 2.251790E-07 | |
| 62 | -8.464210E-05 | -7.564836E-06 | -2.838950E-06 | -2.048589E-07 | 2.233955E-07 | |
| 71 | 5.664269E-06 | 2.642570E-06 | 7.138996E-08 | -1.623594E-08 | -2.301136E-09 | |
| 72 | 9.920340E-06 | 1.144636E-06 | -2.966876E-08 | -1.993907E-08 | 2.860358E-11 | |

FIG. 61

| Example | 1 | 2 | 3 | 4 | 5 | 6 | 7 |
|---|---|---|---|---|---|---|---|
| T1 | 0.727 | 0.705 | 0.702 | 0.699 | 0.505 | 0.707 | 0.659 |
| G12 | 0.074 | 0.086 | 0.092 | 0.079 | 0.069 | 0.067 | 0.070 |
| T2 | 0.227 | 0.218 | 0.219 | 0.309 | 0.456 | 0.220 | 0.165 |
| G23 | 0.254 | 0.196 | 0.307 | 0.232 | 0.206 | 0.258 | 0.284 |
| T3 | 0.426 | 0.410 | 0.381 | 0.412 | 0.480 | 0.501 | 0.400 |
| G34 | 0.183 | 0.233 | 0.069 | 0.164 | 0.174 | 0.180 | 0.276 |
| T4 | 0.272 | 0.282 | 0.266 | 0.267 | 0.250 | 0.269 | 0.275 |
| G45 | 0.395 | 0.286 | 0.330 | 0.382 | 0.351 | 0.383 | 0.394 |
| T5 | 0.520 | 0.589 | 0.626 | 0.482 | 0.391 | 0.508 | 0.540 |
| G56 | 0.035 | 0.099 | 0.092 | 0.040 | 0.032 | 0.039 | 0.047 |
| T6 | 0.523 | 0.478 | 0.449 | 0.474 | 0.762 | 0.497 | 0.526 |
| G67 | 0.387 | 0.448 | 0.505 | 0.353 | 0.316 | 0.395 | 0.393 |
| T7 | 0.267 | 0.265 | 0.268 | 0.398 | 0.261 | 0.269 | 0.278 |
| G7F | 0.500 | 0.500 | 0.500 | 0.500 | 0.500 | 0.500 | 0.500 |
| TF | 0.210 | 0.210 | 0.210 | 0.210 | 0.210 | 0.210 | 0.210 |
| GFP | 0.290 | 0.295 | 0.298 | 0.299 | 0.287 | 0.299 | 0.279 |
| BFL | 1.000 | 1.005 | 1.008 | 1.009 | 0.997 | 1.009 | 0.989 |
| EFL | 4.294 | 4.318 | 4.304 | 4.311 | 4.252 | 4.317 | 4.291 |
| TTL | 5.289 | 5.299 | 5.313 | 5.299 | 5.250 | 5.304 | 5.297 |
| TL | 4.289 | 4.294 | 4.306 | 4.290 | 4.253 | 4.294 | 4.308 |
| ALT | 2.961 | 2.946 | 2.911 | 3.041 | 3.105 | 2.971 | 2.843 |
| AAG | 1.327 | 1.348 | 1.395 | 1.250 | 1.148 | 1.323 | 1.465 |

FIG. 62

| Example | 8 | 9 | 10 | 11 | 12 | 13 | 14 |
|---|---|---|---|---|---|---|---|
| T1 | 0.717 | 0.701 | 0.751 | 0.680 | 0.707 | 0.511 | 0.686 |
| G12 | 0.034 | 0.045 | 0.040 | 0.074 | 0.033 | 0.091 | 0.030 |
| T2 | 0.230 | 0.208 | 0.221 | 0.217 | 0.217 | 0.444 | 0.189 |
| G23 | 0.293 | 0.244 | 0.264 | 0.251 | 0.267 | 0.205 | 0.373 |
| T3 | 0.330 | 0.354 | 0.377 | 0.370 | 0.328 | 0.480 | 0.321 |
| G34 | 0.212 | 0.242 | 0.191 | 0.205 | 0.201 | 0.190 | 0.234 |
| T4 | 0.269 | 0.253 | 0.269 | 0.328 | 0.265 | 0.256 | 0.263 |
| G45 | 0.295 | 0.187 | 0.377 | 0.310 | 0.269 | 0.296 | 0.293 |
| T5 | 0.689 | 0.729 | 0.501 | 0.653 | 0.632 | 0.388 | 0.709 |
| G56 | 0.041 | 0.192 | 0.063 | 0.051 | 0.033 | 0.019 | 0.037 |
| T6 | 0.316 | 0.298 | 0.299 | 0.318 | 0.299 | 0.687 | 0.317 |
| G67 | 0.247 | 0.291 | 0.297 | 0.277 | 0.245 | 0.234 | 0.265 |
| T7 | 0.268 | 0.260 | 0.270 | 0.267 | 0.264 | 0.259 | 0.268 |
| G7F | 0.300 | 0.300 | 0.300 | 0.300 | 0.300 | 0.300 | 0.300 |
| TF | 0.210 | 0.210 | 0.210 | 0.210 | 0.210 | 0.210 | 0.210 |
| GFP | 0.502 | 0.418 | 0.408 | 0.482 | 0.722 | 0.350 | 0.483 |
| BFL | 1.012 | 0.928 | 0.918 | 0.992 | 1.232 | 0.860 | 0.993 |
| EFL | 3.932 | 3.935 | 3.947 | 3.925 | 3.946 | 3.875 | 3.898 |
| TTL | 4.952 | 4.932 | 4.839 | 4.992 | 4.991 | 4.919 | 4.979 |
| TL | 3.939 | 4.004 | 3.921 | 4.001 | 3.759 | 4.059 | 3.986 |
| ALT | 2.818 | 2.803 | 2.688 | 2.833 | 2.711 | 3.025 | 2.753 |
| AAG | 1.121 | 1.201 | 1.232 | 1.167 | 1.048 | 1.034 | 1.233 |

FIG. 63

| Example | 1 | 2 | 3 | 4 | 5 | 6 | 7 |
|---|---|---|---|---|---|---|---|
| (υ3+υ5) | 100.000 | 111.974 | 111.974 | 111.974 | 111.974 | 111.974 | 111.974 |
| AAG/(G23+G45) | 2.045 | 2.798 | 2.191 | 2.036 | 2.060 | 2.063 | 2.158 |
| EFL/(G23+G34+G45) | 5.162 | 6.042 | 6.101 | 5.538 | 5.816 | 5.257 | 4.495 |
| ALT/(G56+T7) | 9.802 | 8.082 | 8.070 | 6.944 | 10.581 | 9.634 | 8.734 |
| (T5+T6)/T7 | 3.908 | 4.018 | 4.006 | 2.400 | 4.410 | 3.734 | 3.830 |
| (T1+T3)/T4 | 4.238 | 3.958 | 4.082 | 4.161 | 3.945 | 4.496 | 3.855 |
| TL/(T5+T6) | 4.111 | 4.027 | 4.006 | 4.488 | 3.689 | 4.274 | 4.043 |
| (T3+T7)/G23 | 2.728 | 3.454 | 2.118 | 3.495 | 3.601 | 2.984 | 2.386 |
| T1/T4 | 2.673 | 2.502 | 2.645 | 2.619 | 2.022 | 2.630 | 2.398 |
| T5/G23 | 2.048 | 3.010 | 2.040 | 2.079 | 1.899 | 1.967 | 1.898 |
| AAG/(G34+G45) | 2.297 | 2.596 | 3.498 | 2.286 | 2.186 | 2.350 | 2.185 |
| EFL/BFL | 4.292 | 4.295 | 4.272 | 4.274 | 4.266 | 4.277 | 4.341 |
| ALT/(T2+T7) | 5.993 | 6.090 | 5.980 | 4.301 | 4.327 | 6.075 | 6.409 |
| (T5+T6)/(G56+G67) | 2.472 | 1.950 | 1.800 | 2.435 | 3.316 | 2.311 | 2.420 |
| ALT/(T1+T5) | 2.376 | 2.278 | 2.191 | 2.575 | 3.466 | 2.445 | 2.372 |
| (G23+G45)/T4 | 2.388 | 1.711 | 2.397 | 2.300 | 2.232 | 2.386 | 2.470 |
| (T1+T6)/T3 | 2.937 | 2.884 | 3.018 | 2.851 | 2.639 | 2.401 | 2.961 |
| (T1+G12)/T4 | 2.944 | 2.808 | 2.992 | 2.914 | 2.300 | 2.881 | 2.653 |
| (T1+T2)/(G23+G34) | 2.185 | 2.154 | 2.451 | 2.544 | 2.531 | 2.116 | 1.472 |

FIG. 64

| Example | 8 | 9 | 10 | 11 | 12 | 13 | 14 |
|---|---|---|---|---|---|---|---|
| (υ3+υ5) | 100.000 | 111.974 | 111.974 | 111.974 | 111.974 | 111.974 | 111.974 |
| AAG/(G23+G45) | 1.908 | 2.783 | 1.922 | 2.081 | 1.956 | 2.066 | 1.850 |
| EFL/(G23+G34+G45) | 4.914 | 5.841 | 4.741 | 5.126 | 5.355 | 5.612 | 4.331 |
| ALT/(G56+T7) | 9.133 | 6.201 | 8.080 | 8.923 | 9.140 | 10.885 | 9.011 |
| (T5+T6)/T7 | 3.752 | 3.946 | 2.968 | 3.640 | 3.530 | 4.148 | 3.826 |
| (T1+T3)/T4 | 3.888 | 4.176 | 4.190 | 3.198 | 3.914 | 3.871 | 3.821 |
| TL/(T5+T6) | 3.920 | 3.898 | 4.899 | 4.119 | 4.039 | 3.776 | 3.886 |
| (T3+T7)/G23 | 2.039 | 2.511 | 2.453 | 2.534 | 2.217 | 3.603 | 1.579 |
| T1/T4 | 2.663 | 2.776 | 2.789 | 2.070 | 2.673 | 1.996 | 2.603 |
| T5/G23 | 2.352 | 2.981 | 1.900 | 2.598 | 2.366 | 1.894 | 1.899 |
| AAG/(G34+G45) | 2.211 | 2.798 | 2.167 | 2.270 | 2.231 | 2.131 | 2.339 |
| EFL/BFL | 3.883 | 4.242 | 4.301 | 3.958 | 3.204 | 4.508 | 3.924 |
| ALT/(T2+T7) | 5.666 | 5.981 | 5.484 | 5.858 | 5.645 | 4.300 | 6.022 |
| (T5+T6)/(G56+G67) | 3.494 | 2.129 | 2.223 | 2.961 | 3.343 | 4.252 | 3.390 |
| ALT/(T1+T5) | 2.004 | 1.960 | 2.147 | 2.126 | 2.025 | 3.364 | 1.975 |
| (G23+G45)/T4 | 2.183 | 1.709 | 2.381 | 1.709 | 2.025 | 1.956 | 2.528 |
| (T1+T6)/T3 | 3.132 | 2.827 | 2.783 | 2.695 | 3.066 | 2.495 | 3.123 |
| (T1+G12)/T4 | 2.788 | 2.953 | 2.937 | 2.294 | 2.797 | 2.351 | 2.717 |
| (T1+T2)/(G23+G34) | 1.872 | 1.869 | 2.135 | 1.966 | 1.974 | 2.419 | 1.441 |

FIG. 65

OPTICAL IMAGING LENS

BACKGROUND OF THE INVENTION

1. Field of the Invention

The present invention generally relates to an optical imaging lens. Specifically speaking, the present invention is directed to an optical imaging lens for use in portable electronic devices such as mobile phones, cameras, tablet personal computers, or personal digital assistants (PDA) for taking pictures and for recording videos.

2. Description of the Prior Art

In recent years, the optical imaging lens has been continuously developed. In addition to requiring thin and light lenses, the object for improving the lens aberration and the color imaging quality is also more and more important. However, with the number of optical imaging lenses is increased, the distance from the object-side surface of the first lens element to the image plane along the optical axis is also increased. As a result, it is disadvantageously for thinning the cell phones, the digital cameras or the car lenses. Therefore, how to design an optical imaging lens has good image quality, and also has light and short lens is always an important design development goal.

SUMMARY OF THE INVENTION

In light of the above, the present invention proposes an optical imaging lens of seven lens elements which is shorter in total length, technically possible, has ensured imaging quality and has enhanced image definition. The optical imaging lens of seven lens elements of the present invention from an object side to an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward the object side to allow imaging rays to pass through as well as an image-side surface which faces toward the image side to allow the imaging rays to pass through.

In one embodiment of the present invention, the first lens element has positive refracting power, and the image-side surface of the first lens element has a concave portion in a vicinity of a periphery of the first lens element, the second lens element is made of plastic, the object-side surface of the third lens element has a concave portion in a vicinity of a periphery of the third lens element, and the image-side surface of the third lens element has a concave portion in a vicinity of the optical axis, the object-side surface of the fourth lens element has a convex portion in a vicinity of the optical axis, the object-side surface of the fifth lens element has a concave portion in a vicinity of the optical axis, the sixth lens element and the seventh lens element are made of plastic, the lens elements having refracting power included by the optical imaging lens are only the seven lens elements described above, in addition, $\upsilon 3$ is the Abbe number of the third lens element, $\upsilon 5$ is the Abbe number of the fifth lens element, and the optical imaging lens satisfies the relationship: $\upsilon 3+\upsilon 5 \geq 100.000$.

In another aspect of the present invention, the present invention proposes an optical imaging lens of seven lens elements which is shorter in total length, technically possible, has ensured imaging quality and has enhanced image definition. The optical imaging lens of seven lens elements of the present invention from an object side to an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward the object side to allow imaging rays to pass through as well as an image-side surface which faces toward the image side to allow the imaging rays to pass through.

In this embodiment of the present invention, the image-side surface of the first lens element has a concave portion in a vicinity of the optical axis, the object-side surface of the second lens element has a convex portion in a vicinity of the optical axis, the object-side surface of the third lens element has a concave portion in a vicinity of a periphery of the third lens element, and the image-side surface of the third lens element has a concave portion in a vicinity of the optical axis, the object-side surface of the fourth lens element has a convex portion in a vicinity of the optical axis, the object-side surface of the fifth lens element has a concave portion in a vicinity of the optical axis, the sixth lens element and the seventh lens element are made of plastic, the lens elements having refracting power included by the optical imaging lens are only the seven lens elements described above, in addition, $\upsilon 3$ is the Abbe number of the third lens element, $\upsilon 5$ is the Abbe number of the fifth lens element, and the optical imaging lens satisfies the relationship: $\upsilon 3+\upsilon 5 \geq 100.000$.

In the optical imaging lens of the present invention, the examples further satisfy the following conditions:

$$AAG/(G23+G45) \leq 2.800;$$

$$EFL/(G23+G34+G45) \leq 6.200;$$

$$ALT/(G56+T7) \geq 6.200;$$

$$(T5+T6)/T7 \geq 2.400;$$

$$(T1+T3)/T4 \geq 3.100;$$

$$TL/(T5+T6) \leq 4.900;$$

$$(T3+T7)/G23 \leq 3.700;$$

$$T1/T4 \geq 1.900;$$

$$T5/G23 \geq 1.800;$$

$$AAG/(G34+G45) \leq 3.500;$$

$$EFL/BFL \geq 3.200;$$

$$ALT/(T2+T7) \geq 4.300;$$

$$(T5+T6)/(G56+G67) \geq 1.800;$$

$$ALT/(T1+T5) \leq 3.500;$$

$$(G23+G45)/T4 \geq 1.700;$$

$$(T1+T6)/T3 \geq 2.400;$$

$$(T1+G12)/T4 \geq 2.200; \text{ and}$$

$$(T1+T2)/(G23+G34) \geq 1.400.$$

T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis, ALT is a sum of thickness of all the seven lens elements, TL is a distance from the object-side surface of the first lens element to the image-side surface of the seventh lens element along the optical axis, AAG is a sum of six air gaps from the first lens element to the seventh lens element along the optical axis, EFL is an effective focal length of the optical imaging lens, and BFL is a distance from the image-side surface of the seventh lens element to an image plane along the optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its periphery of one lens element.

FIG. 34 shows the optical data of the first example of the optical imaging lens.

FIG. 35 shows the aspheric surface data of the first example.

FIG. 36 shows the optical data of the second example of the optical imaging lens.

FIG. 37 shows the aspheric surface data of the second example.

FIG. 38 shows the optical data of the third example of the optical imaging lens.

FIG. 39 shows the aspheric surface data of the third example.

FIG. 40 shows the optical data of the fourth example of the optical imaging lens.

FIG. 41 shows the aspheric surface data of the fourth example.

FIG. 42 shows the optical data of the fifth example of the optical imaging lens.

FIG. 43 shows the aspheric surface data of the fifth example.

FIG. 44 shows the optical data of the sixth example of the optical imaging lens.

FIG. 45 shows the aspheric surface data of the sixth example.

FIG. 46 shows the optical data of the seventh example of the optical imaging lens.

FIG. 47 shows the aspheric surface data of the seventh example.

FIG. 48 shows the optical data of the eighth example of the optical imaging lens.

FIG. 49 shows the aspheric surface data of the eighth example.

FIG. 50 shows the optical data of the ninth example of the optical imaging lens.

FIG. 51 shows the aspheric surface data of the ninth example.

FIG. 52 shows the optical data of the tenth example of the optical imaging lens.

FIG. 53 shows the aspheric surface data of the tenth example.

FIG. 54 shows the optical data of the eleventh example of the optical imaging lens.

FIG. 55 shows the aspheric surface data of the eleventh example.

FIG. 56 shows the optical data of the twelfth example of the optical imaging lens.

FIG. 57 shows the aspheric surface data of the twelfth example.

FIG. 58 shows the optical data of the thirteenth example of the optical imaging lens.

FIG. 59 shows the aspheric surface data of the thirteenth example.

FIG. 60 shows the optical data of the fourteenth example of the optical imaging lens.

FIG. 61 shows the aspheric surface data of the fourteenth example.

FIG. 62 shows some important ratios in the examples.
FIG. 63 shows some important ratios in the examples.
FIG. 64 shows some important ratios in the examples.
FIG. 65 shows some important ratios in the examples.

DETAILED DESCRIPTION

Before the detailed description of the present invention, the first thing to be noticed is that in the present invention, similar (not necessarily identical) elements are labeled as the same numeral references. In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figures 1, 2:
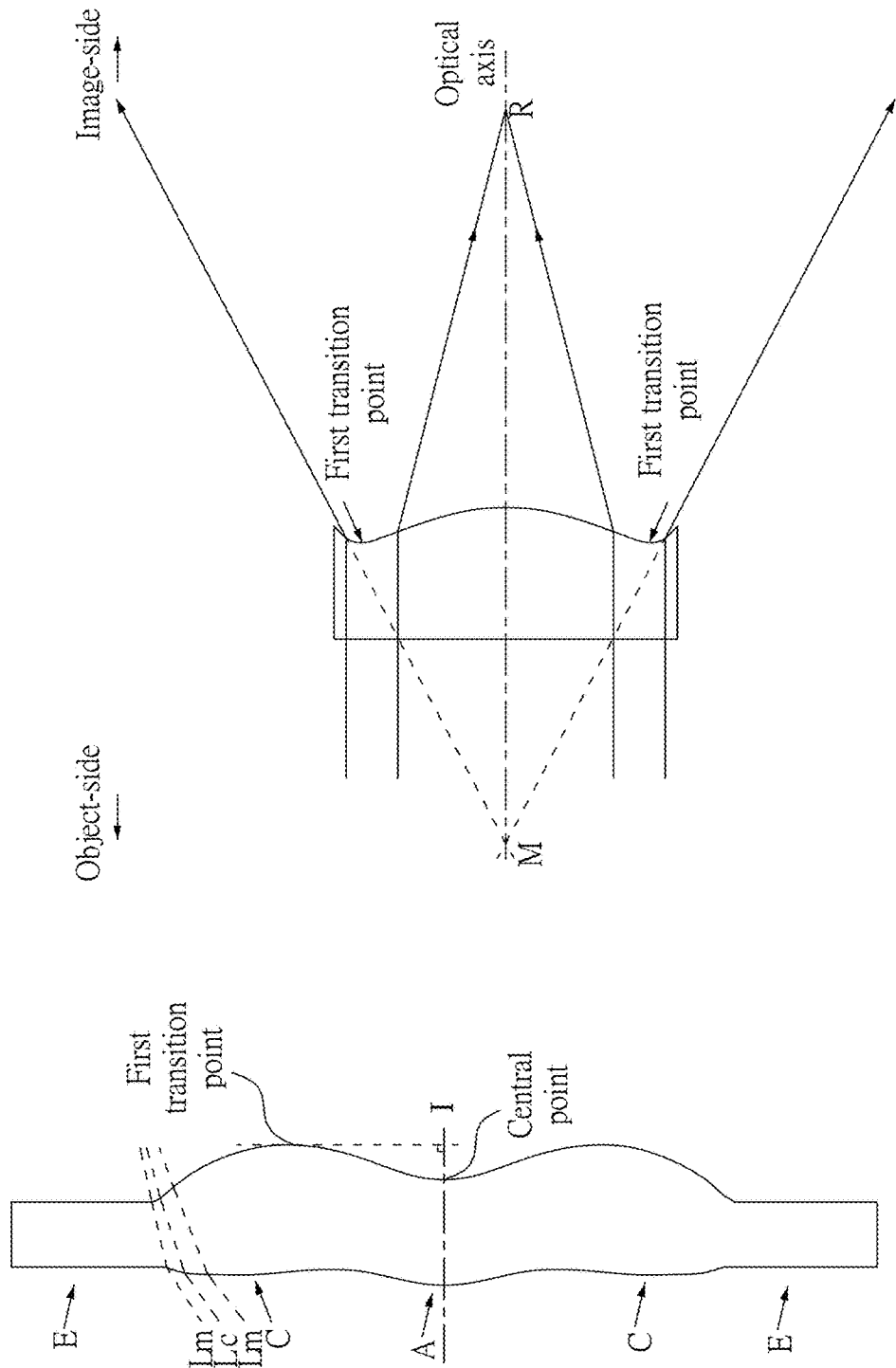

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
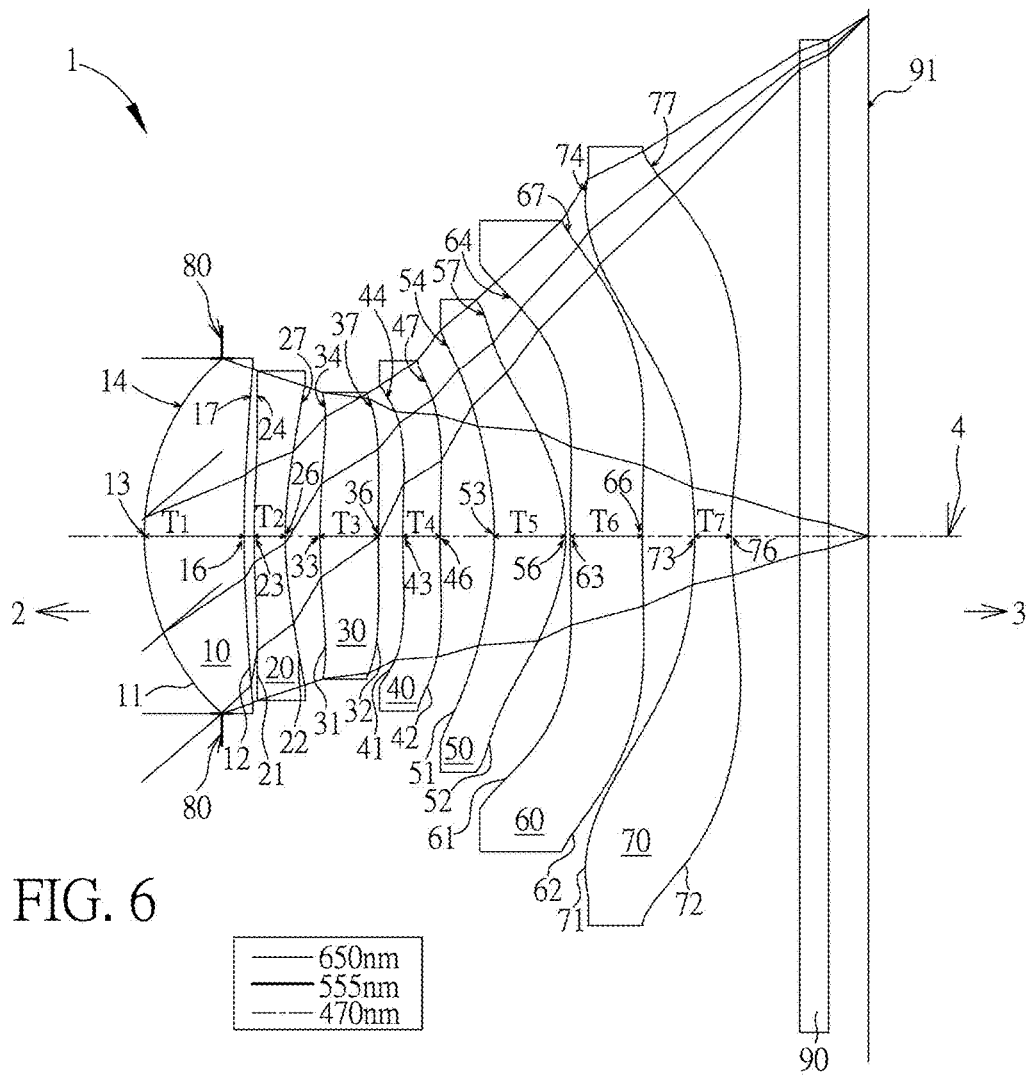
FIG. 6 illustrates a first example of the optical imaging lens of the present invention.

As shown in FIG. 6, the optical imaging lens 1 of seven lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a seventh lens element 70, a filter 90 and an image plane 91. Generally speaking, the first lens element 10, the second lens element 20, the third lens element 30, the fourth lens element 40, the fifth lens element 50, the sixth lens element 60 and the seventh lens element 70 may be made of a transparent plastic material but the present invention is not limited to this, and each has an appropriate refracting power. In the present invention, lens elements having refracting power included by the optical imaging lens 1 are only the seven lens elements described above. The optical axis 4 is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the first lens element 10 and object side 2. When light emitted or reflected by an object (not shown) which is located at the object side 2 enters the optical imaging lens 1 of the present invention, it forms a clear and sharp image on the image plane 91 at the image side 3 after passing through the aperture stop 80, the first lens element 10, the second lens element 20, the third lens element 30, the fourth lens element 40, the fifth lens element 50, the sixth lens element 60, the seventh lens element 70 and the filter 90. In one embodiment of the present invention, the optional filter 90 may be a filter of various suitable functions, for example, the filter 90 may be an infrared cut filter (IR cut filter), placed between the image-side surface 72 of the seventh lens element 70 and the image plane 91.

Each lens element in the optical imaging lens 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; and the seventh lens element 70 has an object-side surface 71 and an image-side surface 72. In addition, each object-side surface and image-side surface in the optical imaging lens 1 of the present invention has a portion in a vicinity of its periphery as well as a portion in a vicinity of the optical axis.

Each lens element in the optical imaging lens 1 of the present invention further has a thickness T along the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7. Therefore, the sum of thickness of all the seven lens elements in the optical imaging lens 1 along the optical axis 4 is ALT=T1+T2+T3+T4+T5+T6+T7.

In addition, between two adjacent lens elements in the optical imaging lens 1 of the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60 as well as an air gap G67 disposed between the sixth lens element 60 and the seventh lens element 70. Therefore, the sum of six air gaps from the first lens element 10 to the seventh lens element 70 along the optical axis 4 is AAG=G12+G23+G34+G45+G56+G67.

In addition, the distance from the object-side surface 11 of the first lens element 10 to the image plane 91, namely the total length of the optical imaging lens along the optical axis 4 is TTL; the effective focal length of the optical imaging lens is EFL; the distance from the object-side surface 11 of the first lens element 10 to the image-side surface 72 of the seventh lens element 70 along the optical axis 4 is TL; the distance from the image-side surface 72 of the seventh lens element 70 to the filter 90 along the optical axis 4 is G7F; the thickness of the filter 90 along the optical axis 4 is TF; the distance from the filter 90 to the image plane 91 along the optical axis 4 is GFP; and the distance from the image-side surface 72 of the seventh lens element 70 to the image plane 91 along the optical axis 4 is BFL. Therefore, BFL=G7F+TF+GFP.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the focal length of the seventh lens element 70 is f7; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the refractive index of the seventh lens element 70 is n7; the Abbe number of the first lens element 10 is υ1; the Abbe number of the second lens element 20 is υ2; the Abbe number of the third lens element 30 is υ3; and the Abbe number of the fourth lens element 40 is υ4; the Abbe number of the fifth lens element 50 is υ5; the Abbe number of the sixth lens element 60 is υ6; and the Abbe number of the seventh lens element 70 is υ7.

FIRST EXAMPLE

Figures 7A, 7B, 7C, 7D:
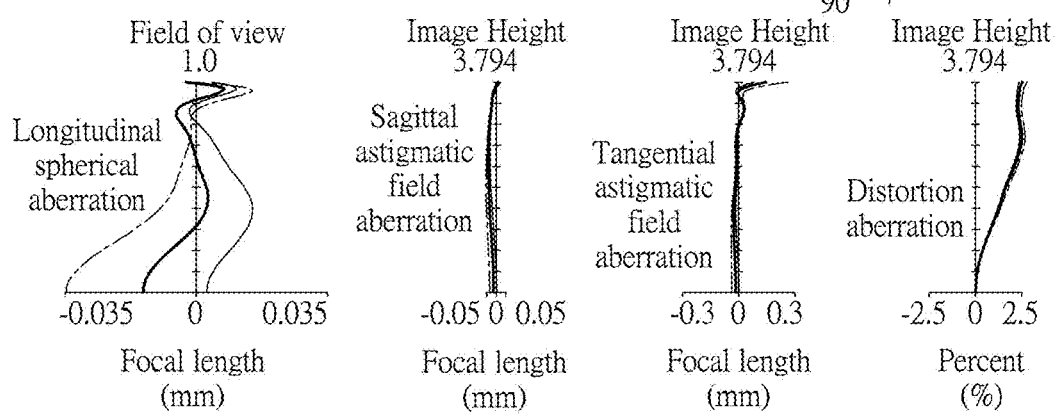
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens 1 of the present invention. Please refer to FIG. 7A for the longitudinal spherical aberration on the image plane 91 of the first example; please refer to FIG. 7B for the astigmatic field aberration on the sagittal direction; please refer to FIG. 7C for the astigmatic field aberration on the tangential direction; and please refer to FIG. 7D for the distortion aberration. The Y axis of the spherical aberration in each example is "field of view" for 1.0. The Y axis of the astigmatic field and the distortion in each example stands for "image height", which is 3.794 mm.

The optical imaging lens 1 of the first example exclusively has seven lens elements 10, 20, 30, 40, 50, 60 and 70 with refracting power. The optical imaging lens 1 also has a filter 90, an aperture stop 80, and an image plane 91. The aperture stop 80 is provided between the first lens element 10 and the object side 2. The filter 90 may be used for preventing specific wavelength light (such as the infrared light) reaching the image plane to adversely affect the imaging quality.

The first lens element 10 has positive refracting power. The object-side surface 11 facing toward the object side 2 has a convex portion 13 in the vicinity of the optical axis and a convex portion 14 in a vicinity of its periphery. The image-side surface 12 facing toward the image side 3 has a concave portion 16 in the vicinity of the optical axis and a concave portion 17 in a vicinity of its periphery. Besides, both the object-side surface 11 and the image-side 12 of the first lens element 10 are aspherical surfaces.

The second lens element 20 has negative refracting power. The object-side surface 21 facing toward the object side 2 has a convex portion 23 in the vicinity of the optical axis and a convex portion 24 in a vicinity of its periphery. The image-side surface 22 facing toward the image side 3 has a concave portion 26 in the vicinity of the optical axis and a concave portion 27 in a vicinity of its periphery. Besides, both the object-side surface 21 and the image-side 22 of the second lens element 20 are aspherical surfaces.

The third lens element 30 has positive refracting power. The object-side surface 31 facing toward the object side 2 has a convex portion 33 in the vicinity of the optical axis and a concave portion 34 in a vicinity of its periphery. The image-side surface 32 facing toward the image side 3 has a concave portion 36 in the vicinity of the optical axis and a convex portion 37 in a vicinity of its periphery. The object-side surface 31 and the image-side 32 of the third lens element 30 are aspherical surfaces.

The fourth lens element 40 has positive refracting power. The object-side surface 41 facing toward the object side 2 has a convex portion 43 in the vicinity of the optical axis and a concave portion 44 in a vicinity of its periphery. The image-side surface 42 facing toward the image side 3 has a concave portion 46 in the vicinity of the optical axis and a convex portion 47 in a vicinity of its periphery. The object-side surface 41 and the image-side 42 of the fourth lens element 40 are aspherical surfaces.

The fifth lens element 50 has positive refracting power. The object-side surface 51 facing toward the object side 2 has a concave portion 53 in the vicinity of the optical axis and a concave portion 54 in a vicinity of its periphery. The image-side surface 52 facing toward the image side 3 has a convex portion 56 in the vicinity of the optical axis and a convex portion 57 in a vicinity of its periphery. Besides, at least one of the object-side surface 51 and the image-side 52 of the fifth lens element 50 is an aspherical surface.

The sixth lens element 60 has negative refracting power. The object-side surface 61 facing toward the object side 2 has a convex portion 63 in the vicinity of the optical axis and a concave portion 64 in a vicinity of its periphery. The image-side surface 62 facing toward the image side 3 has a concave portion 66 in the vicinity of the optical axis and a convex portion 67 in a vicinity of its periphery. Both the object-side surface 61 and the image-side 62 of the sixth lens element 60 are aspherical surfaces.

The seventh lens element 70 has negative refracting power. The object-side surface 71 facing toward the object side 2 has a concave portion 73 in the vicinity of the optical axis and a convex portion 74 in a vicinity of its periphery. The image-side surface 62 facing toward the image side 3 has a concave portion 76 in the vicinity of the optical axis and a convex portion 77 in a vicinity of its periphery. Both the object-side surface 71 and the image-side 72 of the seventh lens element 70 are aspherical surfaces. The filter 90 is disposed between the image-side 72 of the seventh lens element 70 and the image plane 91.

In the first lens element 10, the second lens element 20, the third lens element 30, the fourth lens element 40, the fifth lens element 50, the sixth lens element 60 and the seventh lens element 70 of the optical imaging lens element 1 of the present invention, there are 14 surfaces, such as the object-side surfaces 11/21/31/41/51/61/71 and the image-side surfaces 12/22/32/42/52/62/72. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_i$ is the aspheric coefficient of the $i^{th}$ order.

The optical data of the first example of the optical imaging lens 1 are shown in FIG. 34 while the aspheric surface data are shown in FIG. 35. In the present examples of the optical imaging lens, the f-number of the entire optical imaging lens element system is Fno, EFL is the effective focal length, HFOV stands for the half field of view which is half of the field of view of the entire optical imaging lens element system, and the unit for the curvature radius, the thickness and the focal length is in millimeters (mm). In this example, TTL=5.289 mm; EFL=4.294 mm; HFOV=40.616 degrees; image height=3.794 mm; Fno=1.65.

In addition, in each example of the present invention, the optical imaging lens 1 satisfies the condition of υ3+υ5≥100.000, therefore, the color difference can be improved, and has good imaging quality.

SECOND EXAMPLE

Figure 8:
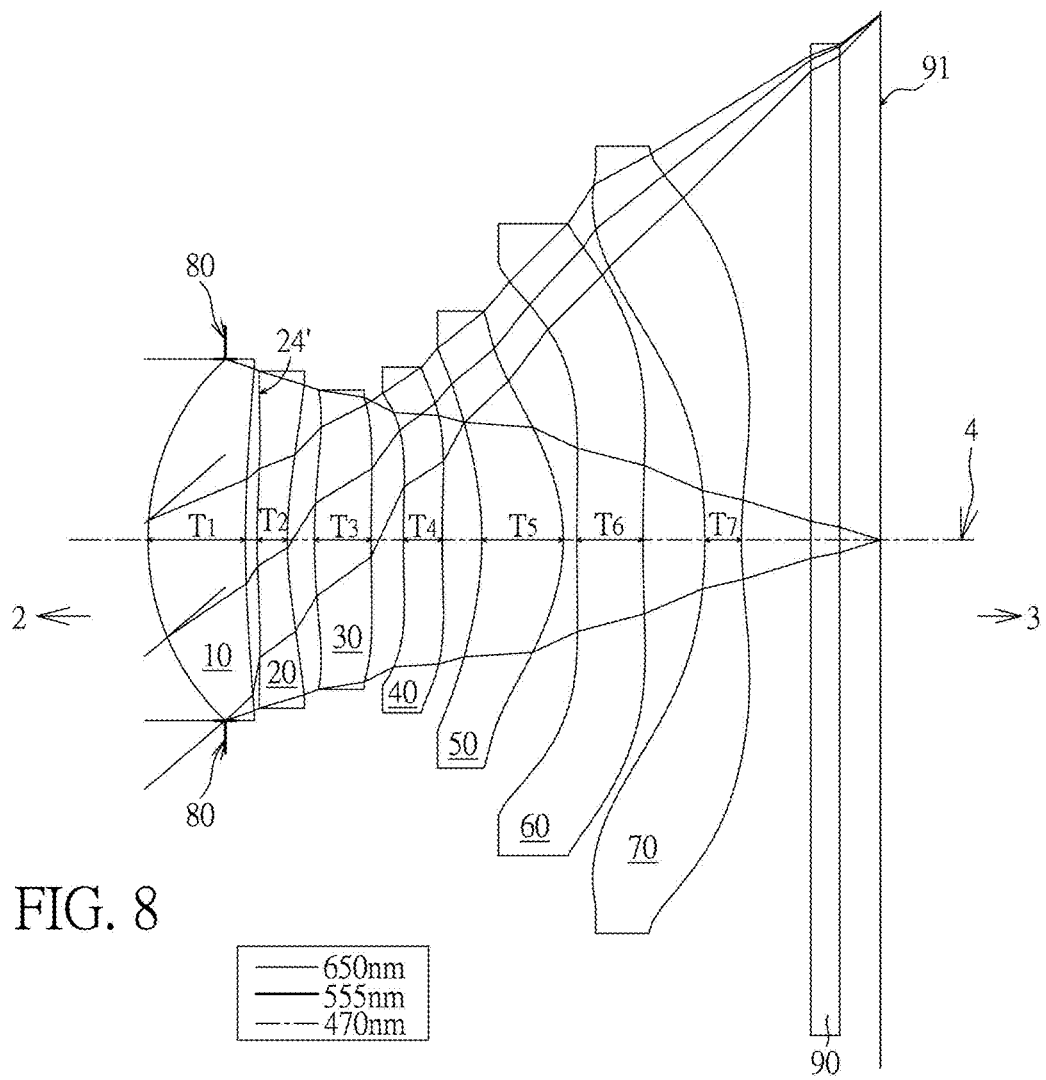
FIG. 8 illustrates a second example of the optical imaging lens of the present invention.
Figure 9A:
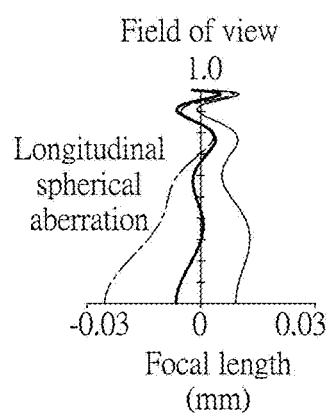
FIG. 9A illustrates the longitudinal spherical aberration on the image plane of the second example.
Figure 9B:
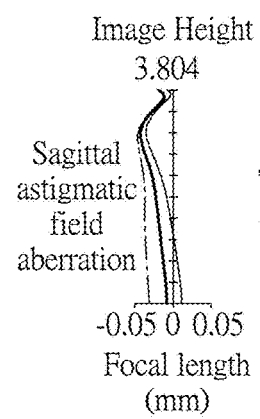
FIG. 9B illustrates the astigmatic aberration on the sagittal direction of the second example.
Figure 9C:
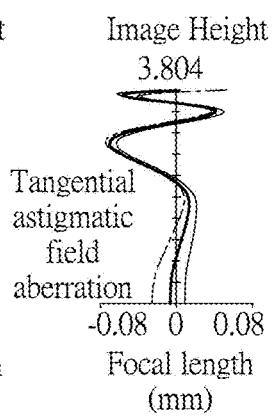
FIG. 9C illustrates the astigmatic aberration on the tangential direction of the second example.
Figure 9D:
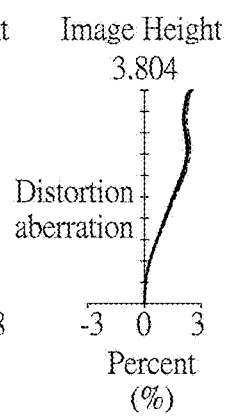
FIG. 9D illustrates the distortion aberration of the second example.

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the portion in a vicinity of the optical axis and the portion in a vicinity of its periphery will be omitted in the following examples. Please refer to FIG. 9A for the longitudinal spherical aberration on the image plane 91 of the second example, please refer to FIG. 9B for the astigmatic aberration on the sagittal direction, please refer to FIG. 9C for the astigmatic aberration on the tangential direction, and please refer to FIG. 9D for the distortion aberration. The components in this example are similar to those in the first example, but the optical data such as the curvature radius, the lens thickness, the aspheric surface or the back focal length in this example are different from the optical data in the first example. Besides, in this example, the object-side surface 21 of the second lens element 20 has a concave portion 24' in a vicinity of its periphery.

The optical data of the second example of the optical imaging lens are shown in FIG. 36 while the aspheric surface data are shown in FIG. 37. In this example, TTL=5.299 mm; EFL=4.318 mm; HFOV=40.616 degrees; image height=3.804 mm; Fno=1.65. In particular, the fabrication of the second example is easier than the first example so the yield is better.

THIRD EXAMPLE

Figure 10:
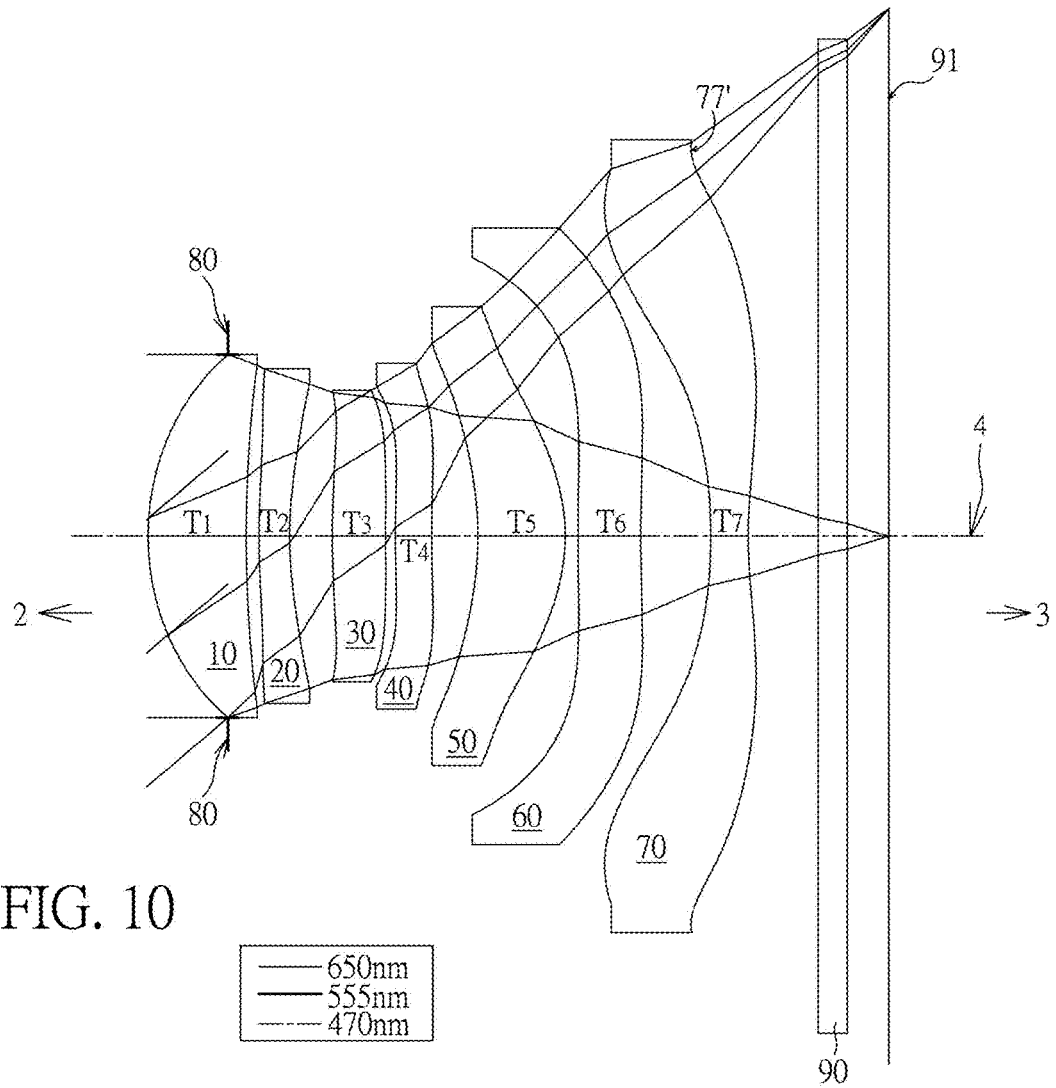
FIG. 10 illustrates a third example of the optical imaging lens of the present invention.
Figures 11A, 11B, 11C, 11D:
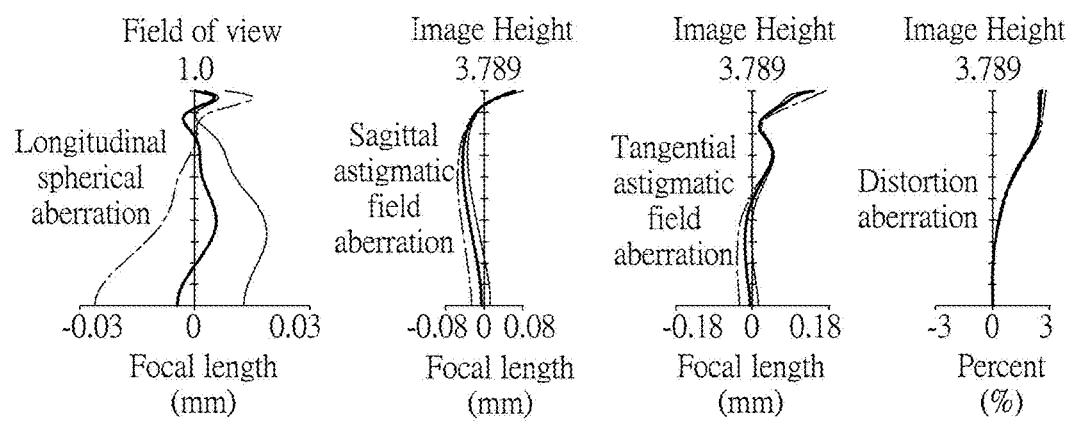
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens 1 of the present invention. Please refer to FIG. 11A for the longitudinal spherical aberration on the image plane 91 of the third example; please refer to FIG. 11B for the astigmatic aberration on the sagittal direction; please refer to FIG. 11C for the astigmatic aberration on the tangential direction; and please refer to FIG. 11D for the distortion aberration. The components in this example are similar to those in the first example, but the optical data such as the curvature radius, the lens thickness, the aspheric surface or the back focal length in this example are different from the optical data in the first example. Besides, in this example, the image-side surface 72 of the seventh lens element 70 has a concave portion 77' in a vicinity of its periphery.

The optical data of the third example of the optical imaging lens are shown in FIG. 38 while the aspheric surface data are shown in FIG. 39. In this example, TTL=5.313 mm; EFL=4.304 mm; HFOV=40.616 degrees; image height=3.789 mm; Fno=1.65. In particular, the fabrication of the third example is easier than the first example so the yield is better.

FOURTH EXAMPLE

Figure 12:
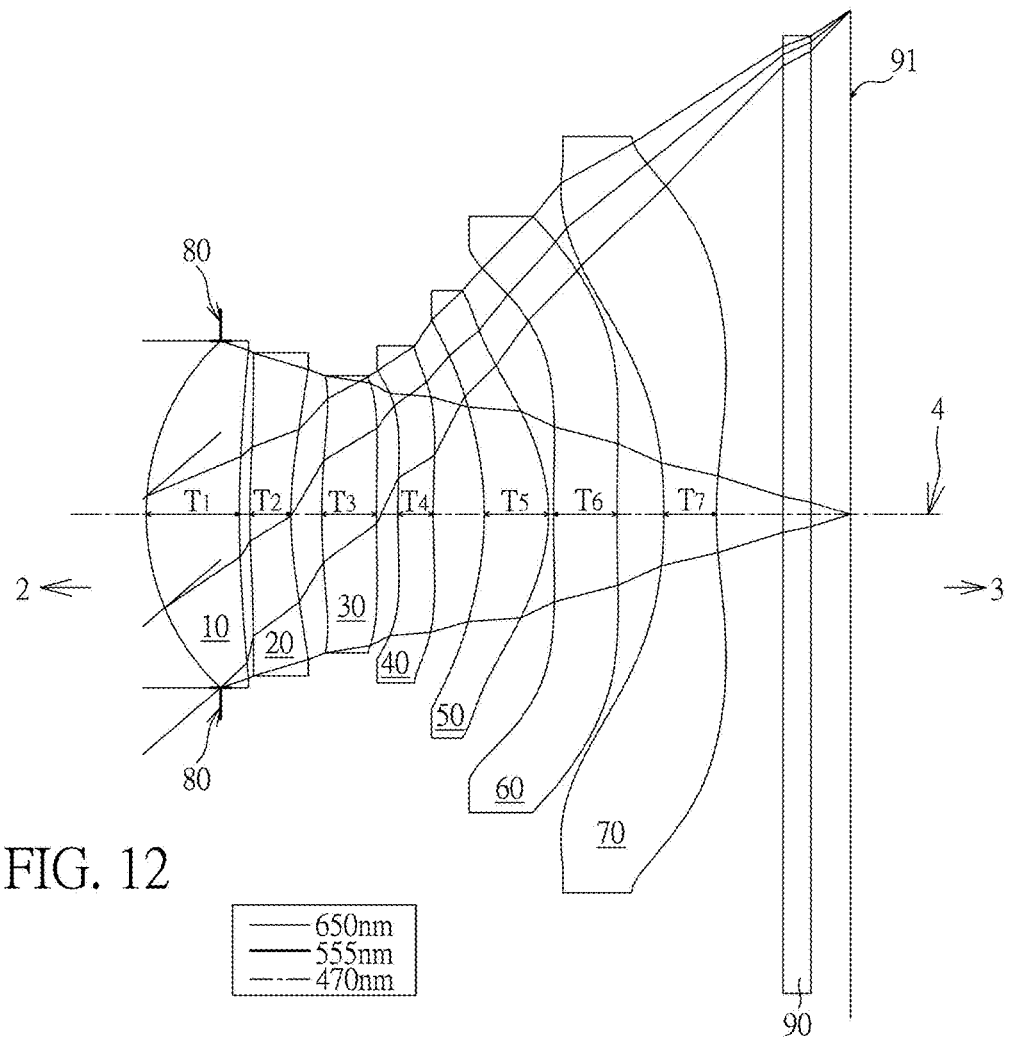
FIG. 12 illustrates a fourth example of the optical imaging lens of the present invention.
Figures 13A, 13B, 13C, 13D:
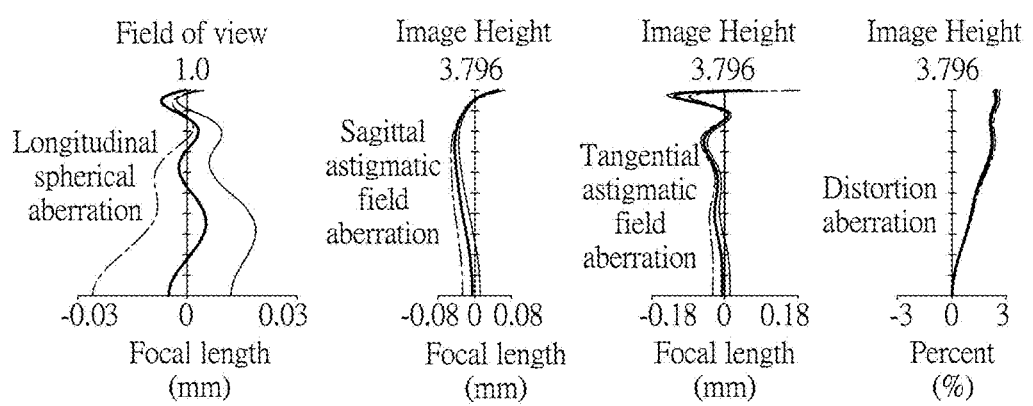
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens 1 of the present invention. Please refer to FIG. 13A for the longitudinal spherical aberration on the image plane 91 of the fourth example; please refer to FIG. 13B for the astigmatic aberration on the sagittal direction; please refer to FIG. 13C for the astigmatic aberration on the tangential direction; and please refer to FIG. 13D for the distortion aberration. The components in this example are similar to those in the first example, but the optical data such as the curvature radius, the lens thickness, the aspheric surface or the back focal length in this example are different from the optical data in the first example.

The optical data of the fourth example of the optical imaging lens are shown in FIG. 40 while the aspheric surface data are shown in FIG. 41. In this example, TTL=5.299 mm; EFL=4.311 mm; HFOV=40.616 degrees; image height=3.796 mm; Fno=1.65. In particular, the fabrication of the fourth example is easier than the first example so the yield is better.

FIFTH EXAMPLE

Figure 14:
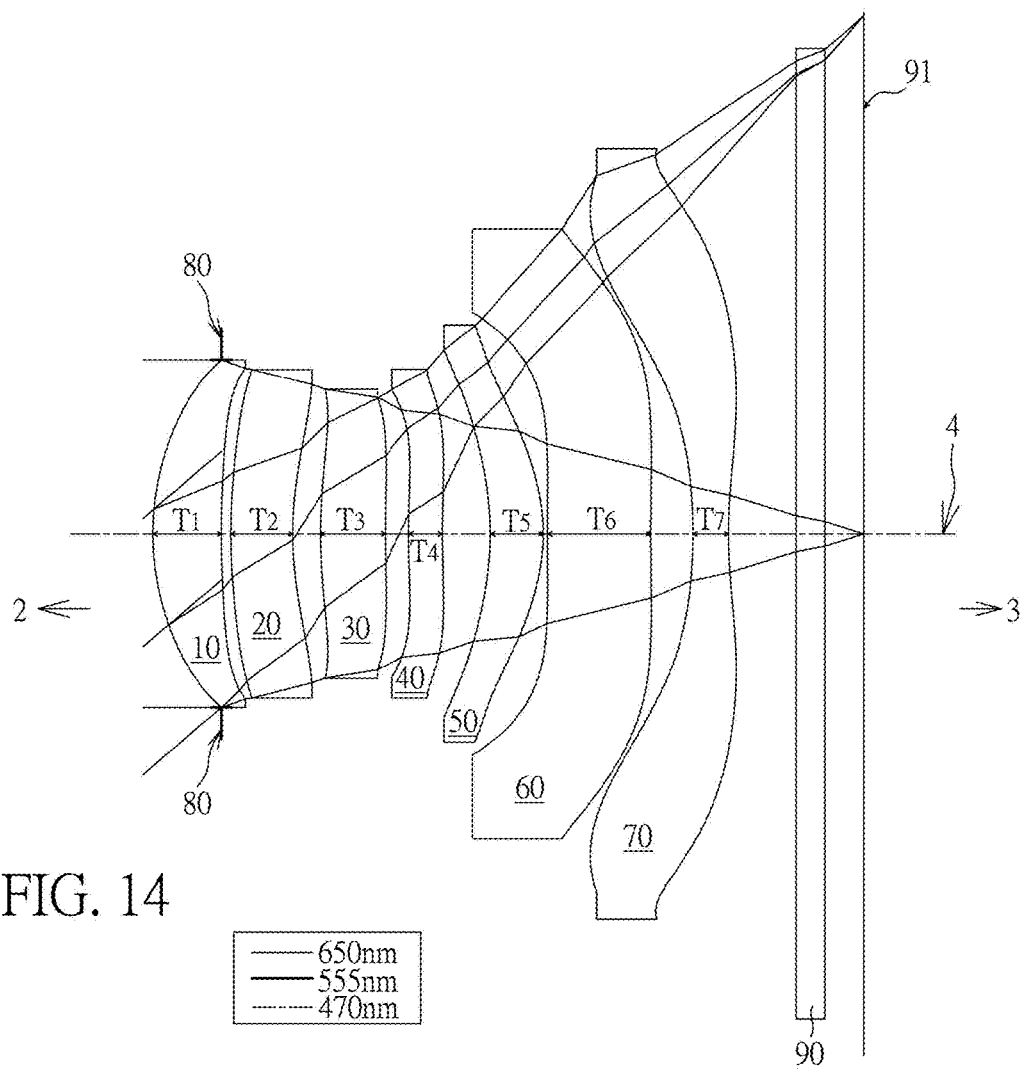
FIG. 14 illustrates a fifth example of the optical imaging lens of the present invention.
Figures 15A, 15B, 15C, 15D:
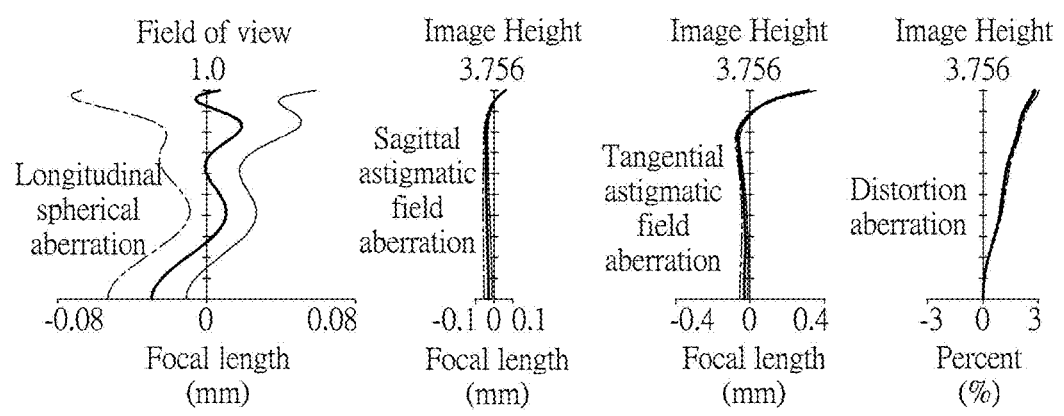
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens 1 of the present invention. Please refer to FIG. 15A for the longitudinal spherical aberration on the image plane 91 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in this example are similar to those in the first example, but the optical data such as the curvature radius, the lens thickness, the aspheric surface or the back focal length in this example are different from the optical data in the first example.

The optical data of the fifth example of the optical imaging lens are shown in FIG. 42 while the aspheric surface data are shown in FIG. 43. In this example, TTL=5.250 mm; EFL=4.252 mm; HFOV=40.616 degrees; image height=3.756 mm; Fno=1.65. In particular, the total length of the fifth example is shorter than the total length of the first example.

SIXTH EXAMPLE

Figure 16:
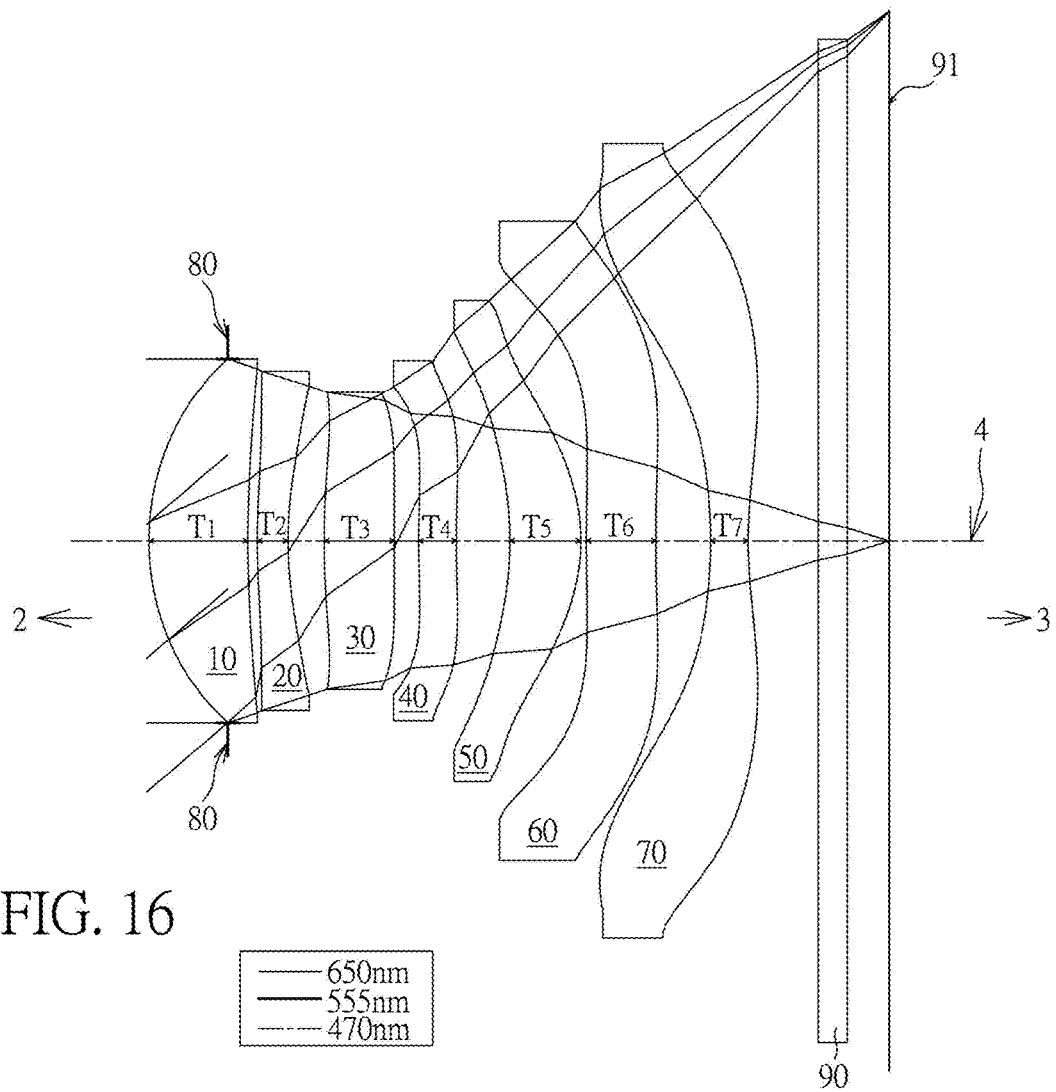
FIG. 16 illustrates a sixth example of the optical imaging lens of the present invention.
Figures 17A, 17B, 17C, 17D:
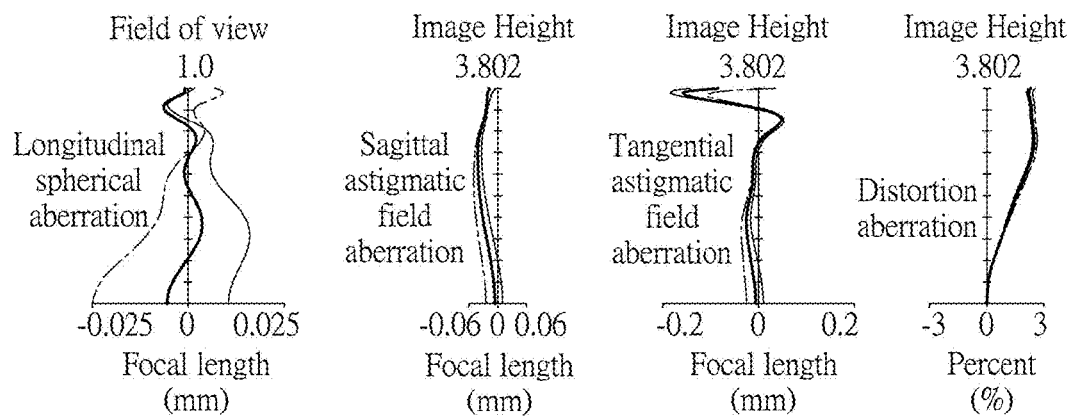
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens 1 of the present invention. Please refer to FIG. 17A for the longitudinal spherical aberration on the image plane 91 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in this example are similar to those in the first example, but the optical data such as the curvature radius, the lens thickness, the aspheric surface or the back focal length in this example are different from the optical data in the first example.

The optical data of the sixth example of the optical imaging lens are shown in FIG. 44 while the aspheric surface data are shown in FIG. 45. In this example, TTL=5.304 mm; EFL=4.317 mm; HFOV=40.616 degrees; image height=3.802 mm; Fno=1.65. In particular, the fabrication of the sixth example is easier than the first example so the yield is better.

SEVENTH EXAMPLE

Figure 18:
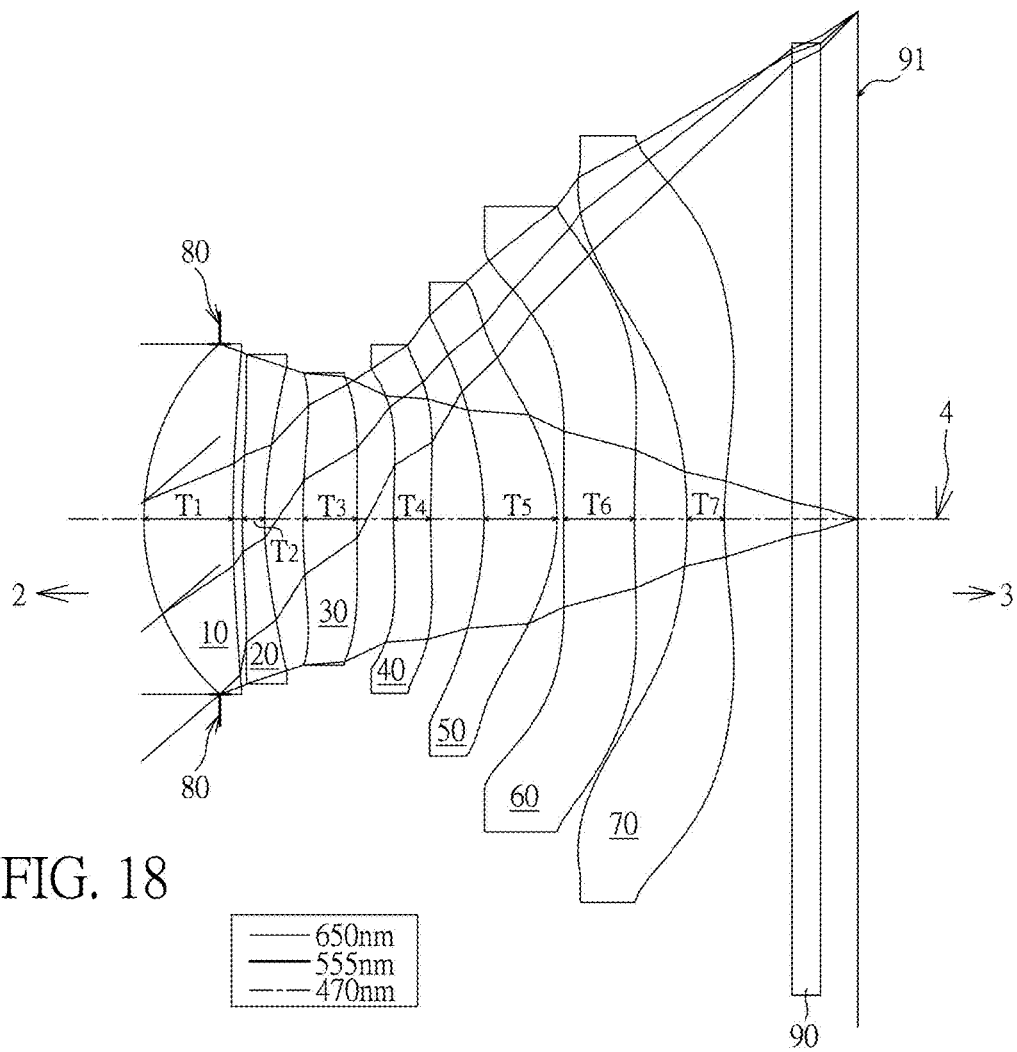
FIG. 18 illustrates a seventh example of the optical imaging lens of the present invention.
Figures 19A, 19B, 19C, 19D:
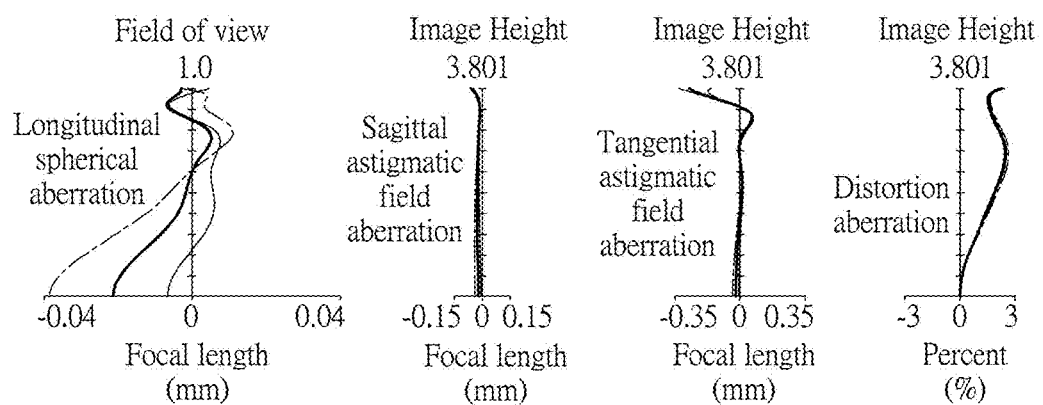
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens 1 of the present invention. Please refer to FIG. 19A for the longitudinal spherical aberration on the image plane 91 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in this example are similar to those in the first example, but the optical data such as the curvature radius, the lens thickness, the aspheric surface or the back focal length in this example are different from the optical data in the first example.

The optical data of the seventh example of the optical imaging lens are shown in FIG. 46 while the aspheric surface data are shown in FIG. 47. In this example, TTL=5.297 mm; EFL=4.291 mm; HFOV=40.616 degrees; image height=3.801 mm; Fno=1.65. In particular, the fabrication of the seventh example is easier than the first example so the yield is better.

EIGHTH EXAMPLE

Figure 20:
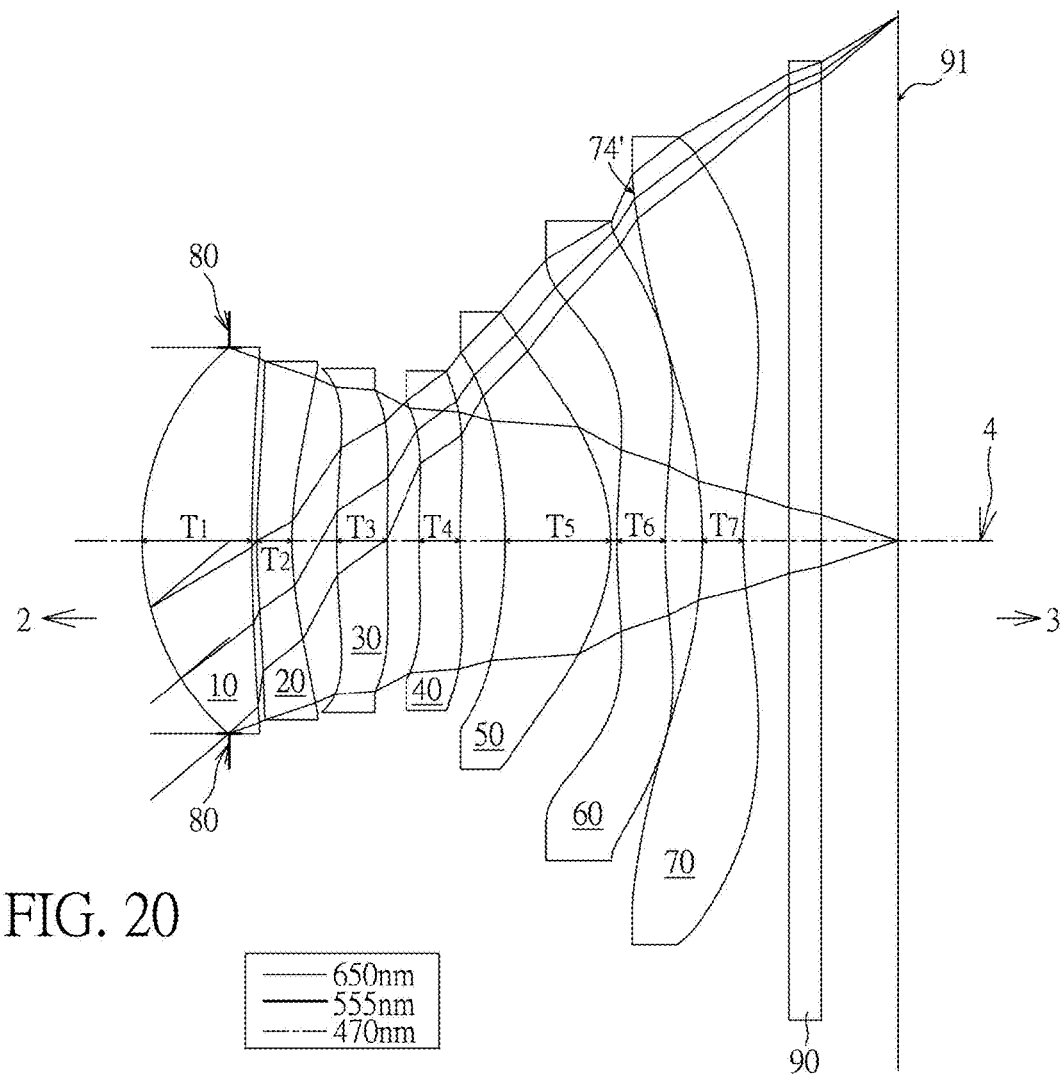
FIG. 20 illustrates an eighth example of the optical imaging lens of the present invention.
Figures 21A, 21B, 21C, 21D:
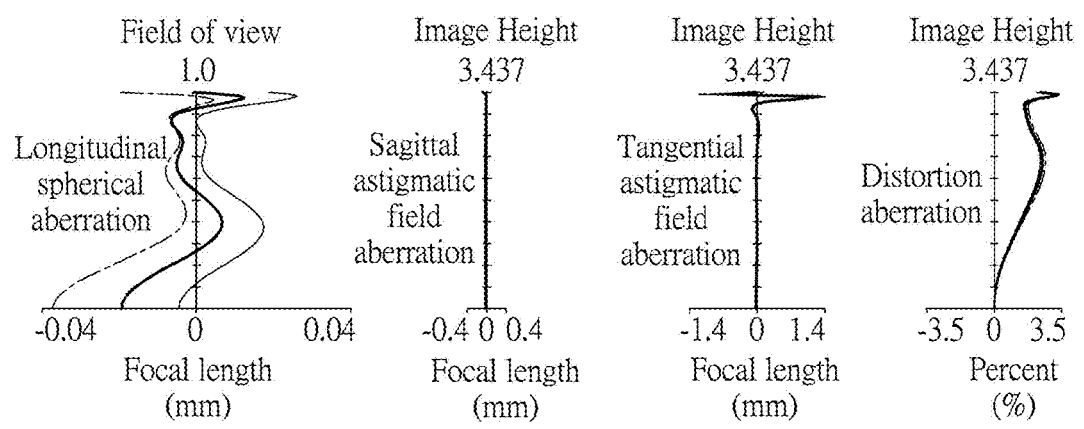
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens 1 of the present invention. Please refer to FIG. 21A for the longitudinal spherical aberration on the image plane 91 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has negative refracting power, the sixth lens element 60 has positive refracting power, the object-side surface 71 of the seventh lens element 70 has a concave portion 74' in a vicinity of its periphery.

The optical data of the eighth example of the optical imaging lens are shown in FIG. 48 while the aspheric surface data are shown in FIG. 49. In this example, TTL=4.952 mm; EFL=3.932 mm; HFOV=40.260 degrees; image height=3.437 mm; Fno=1.55. In particular, the total length of the eighth example is shorter than the total length of the first example, and the aperture of this example is larger than the aperture of the first example.

NINTH EXAMPLE

Figure 22:
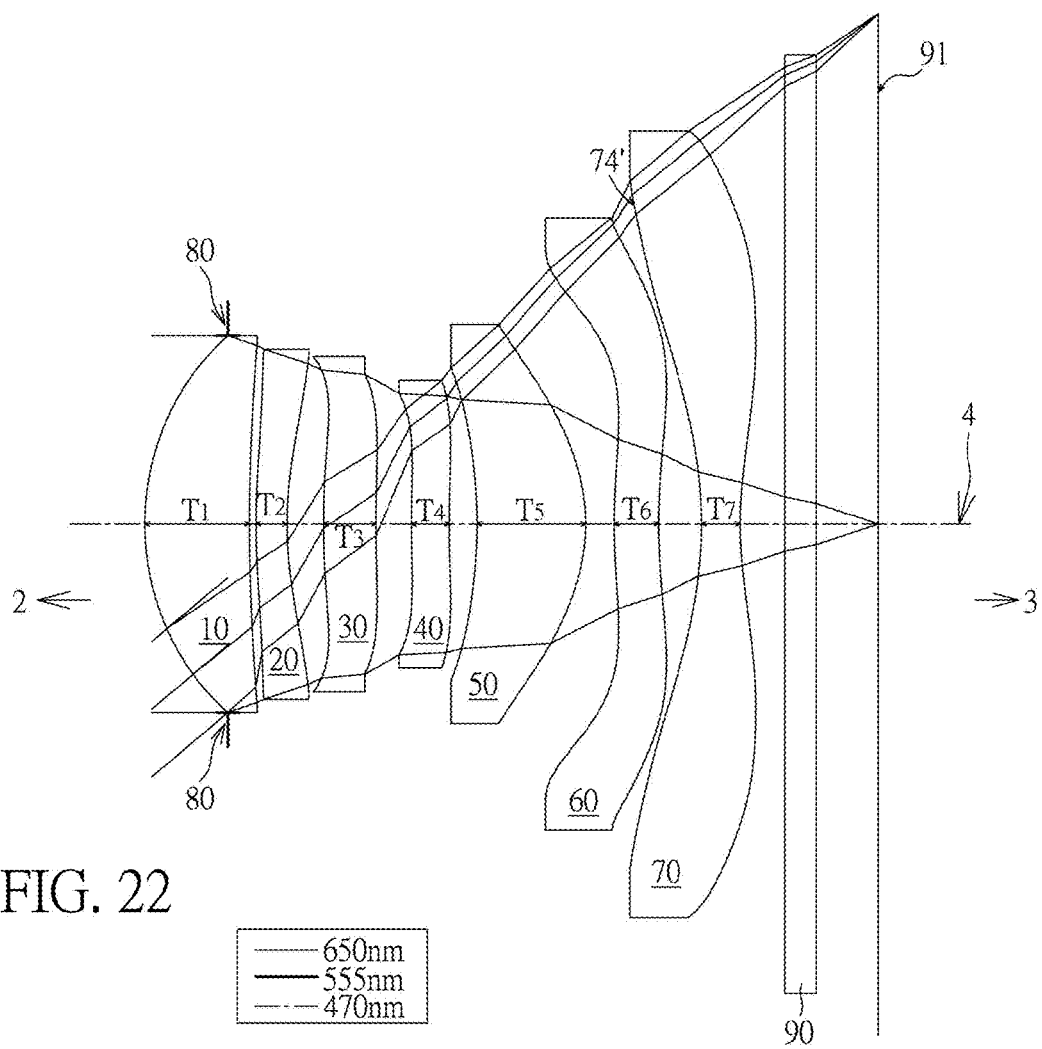
FIG. 22 illustrates a ninth example of the optical imaging lens of the present invention.
Figures 23A, 23B, 23C, 23D:
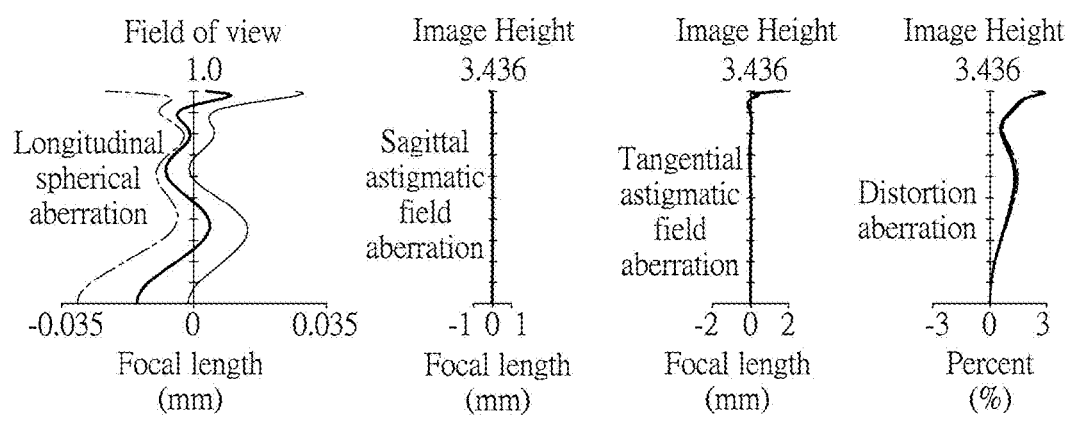
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens 1 of the present invention. Please refer to FIG. 23A for the longitudinal spherical aberration on the image plane 91 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has negative refracting power, the sixth lens element 60 has positive refracting power, the object-side surface 71 of the seventh lens element 70 has a concave portion 74' in a vicinity of its periphery.

The optical data of the ninth example of the optical imaging lens are shown in FIG. 50 while the aspheric surface data are shown in FIG. 51. In this example, TTL=4.932 mm; EFL=3.935 mm; HFOV=40.260 degrees; image height=3.436 mm; Fno=1.55. In particular, the total length of the ninth example is shorter than the total length of the first example, and the aperture of this example is larger than the aperture of the first example.

TENTH EXAMPLE

Figure 24:
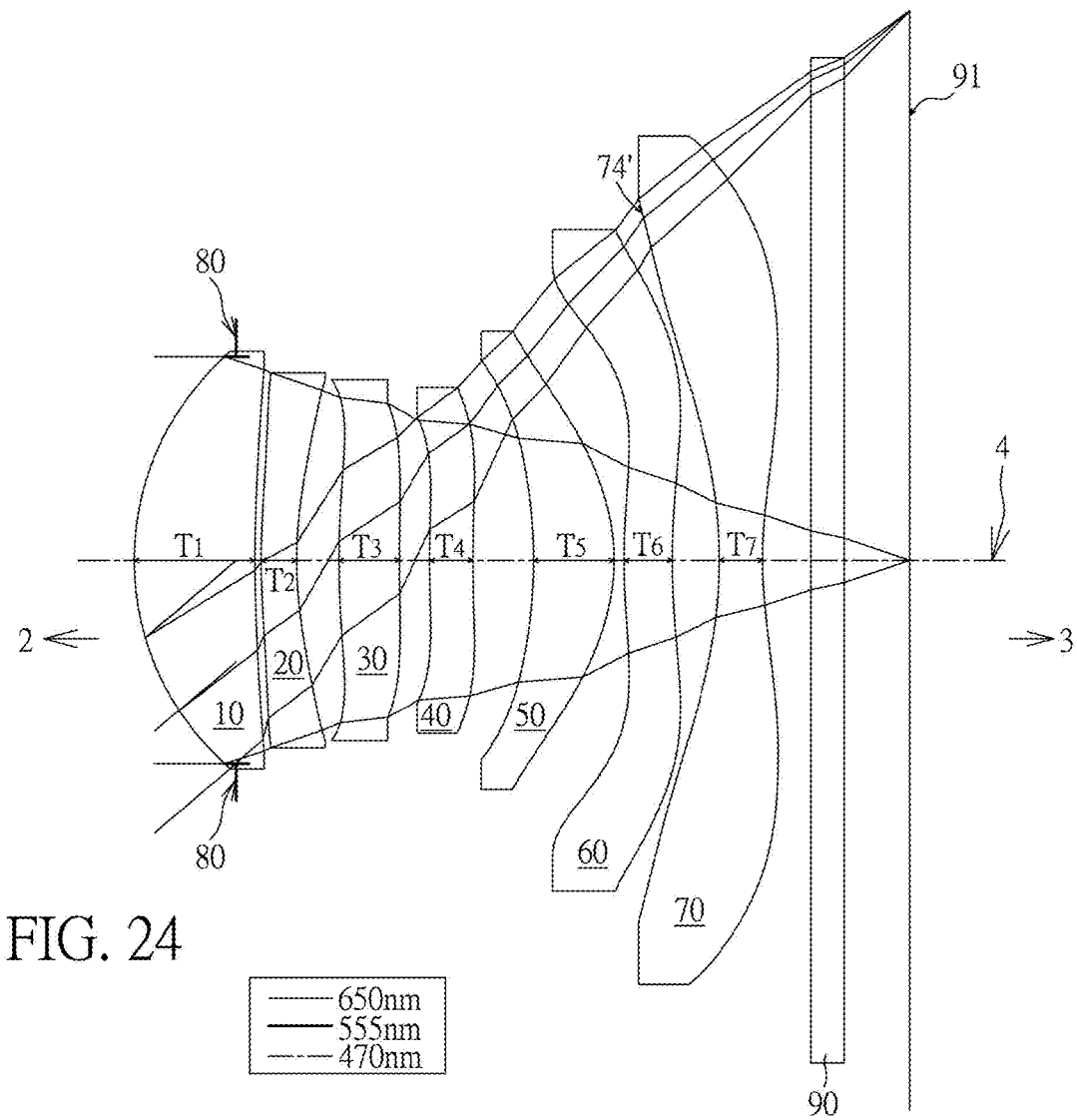
FIG. 24 illustrates a tenth example of the optical imaging lens of the present invention.
Figures 25A, 25B, 25C, 25D:
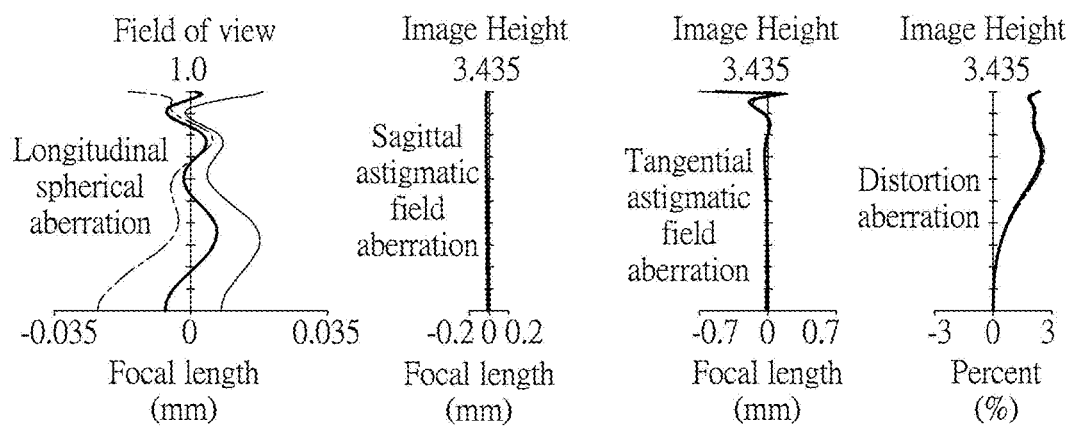
FIG. 25A illustrates the longitudinal spherical aberration on the image plane of the tenth example.
FIG. 25B illustrates the astigmatic aberration on the sagittal direction of the tenth example.
FIG. 25C illustrates the astigmatic aberration on the tangential direction of the tenth example.
FIG. 25D illustrates the distortion aberration of the tenth example.

Please refer to FIG. 24 which illustrates the tenth example of the optical imaging lens 1 of the present invention. Please refer to FIG. 25A for the longitudinal spherical aberration on the image plane 91 of the tenth example; please refer to FIG. 25B for the astigmatic aberration on the sagittal direction; please refer to FIG. 25C for the astigmatic aberration on the tangential direction, and please refer to FIG. 25D for the distortion aberration. The components in this example are similar to those in the first example, but the optical data such as the curvature radius, the lens thickness, the aspheric surface or the back focal length in this example are different from the optical data in the first example. Besides, in this example, the sixth lens element 60 has positive refracting power, the object-side surface 71 of the seventh lens element 70 has a concave portion 74' in a vicinity of its periphery.

The optical data of the tenth example of the optical imaging lens are shown in FIG. 52 while the aspheric surface data are shown in FIG. 53. In this example, TTL=4.839 mm; EFL=3.947 mm; HFOV=40.260 degrees; image height=3.435 mm; Fno=1.55. In particular, the total length of the tenth example is shorter than the total length of the first example, and the aperture of this example is larger than the aperture of the first example.

ELEVENTH EXAMPLE

Figure 26:
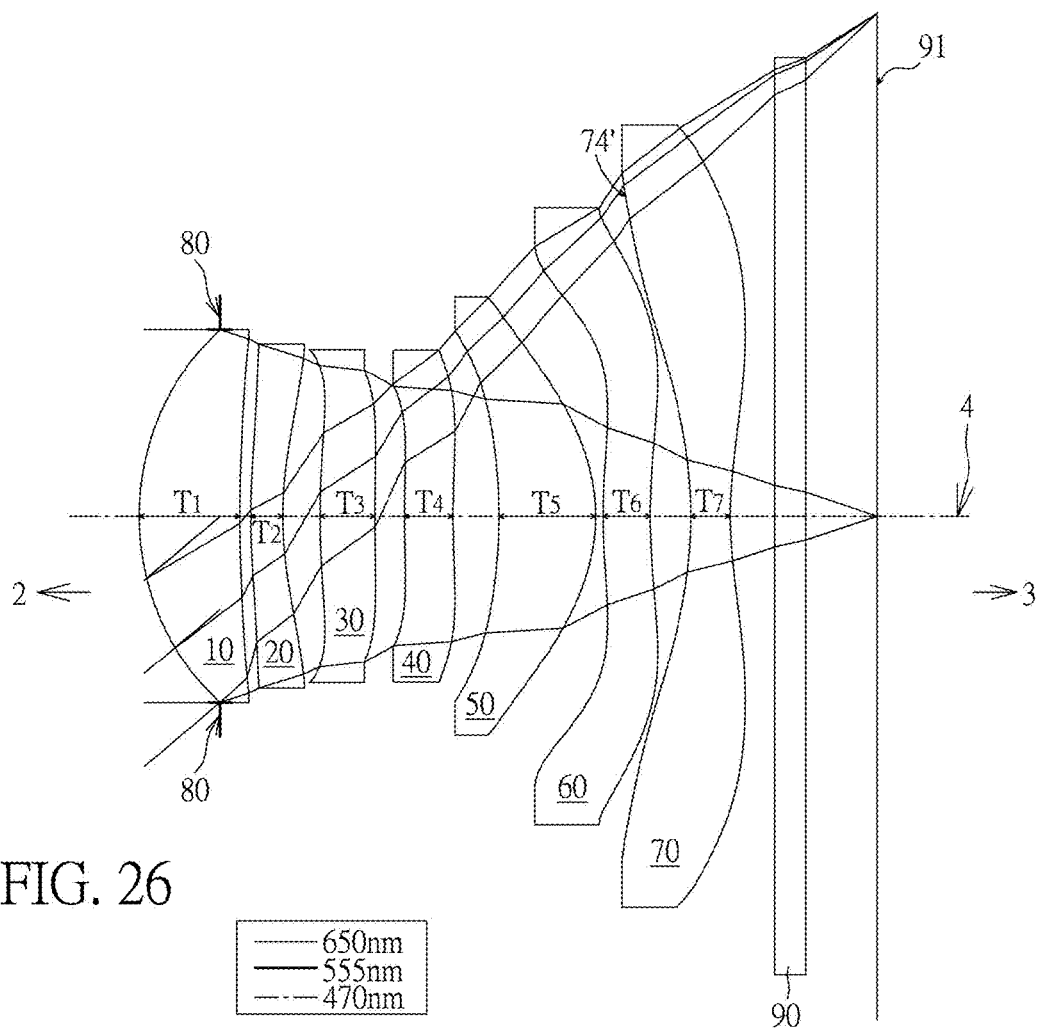
FIG. 26 illustrates an eleventh example of the optical imaging lens of the present invention.
Figures 27A, 27B, 27C, 27D:
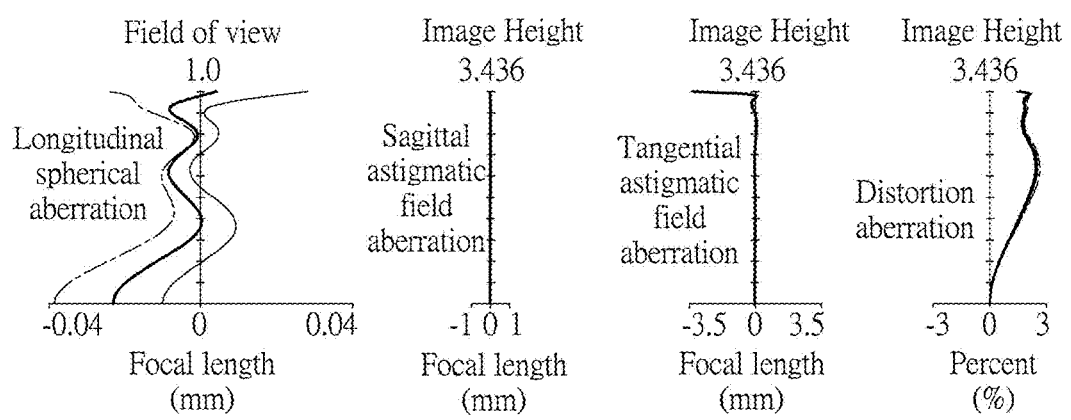
FIG. 27A illustrates the longitudinal spherical aberration on the image plane of the eleventh example.
FIG. 27B illustrates the astigmatic aberration on the sagittal direction of the eleventh example.
FIG. 27C illustrates the astigmatic aberration on the tangential direction of the eleventh example.
FIG. 27D illustrates the distortion aberration of the eleventh example.

Please refer to FIG. 26 which illustrates the eleventh example of the optical imaging lens 1 of the present invention. Please refer to FIG. 27A for the longitudinal spherical aberration on the image plane 91 of the eleventh example; please refer to FIG. 27B for the astigmatic aberration on the sagittal direction; please refer to FIG. 27C for the astigmatic aberration on the tangential direction, and please refer to FIG. 27D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has negative refracting power, the sixth lens element 60 has positive refracting power, the object-side surface 71 of the seventh lens element 70 has a concave portion 74' in a vicinity of its periphery.

The optical data of the eleventh example of the optical imaging lens are shown in FIG. 54 while the aspheric surface data are shown in FIG. 55. In this example, TTL=4.992 mm; EFL=3.925 mm; HFOV=40.260 degrees; image height=3.436 mm; Fno=1.55. In particular, the total length of the eleventh example is shorter than the total length of the first example, and the aperture of this example is larger than the aperture of the first example.

TWELFTH EXAMPLE

Figure 28:
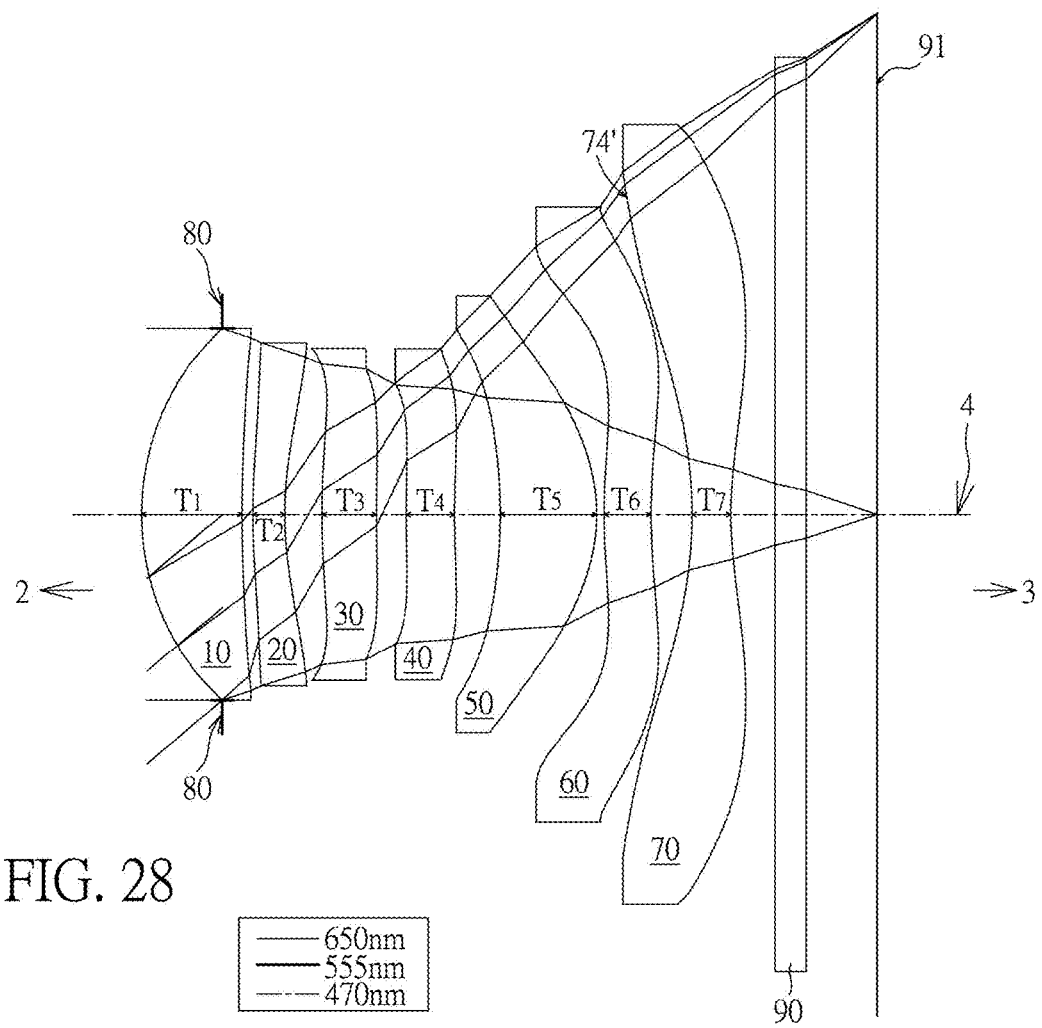
FIG. 28 illustrates a twelfth example of the optical imaging lens of the present invention.
Figures 29A, 29B, 29C, 29D:
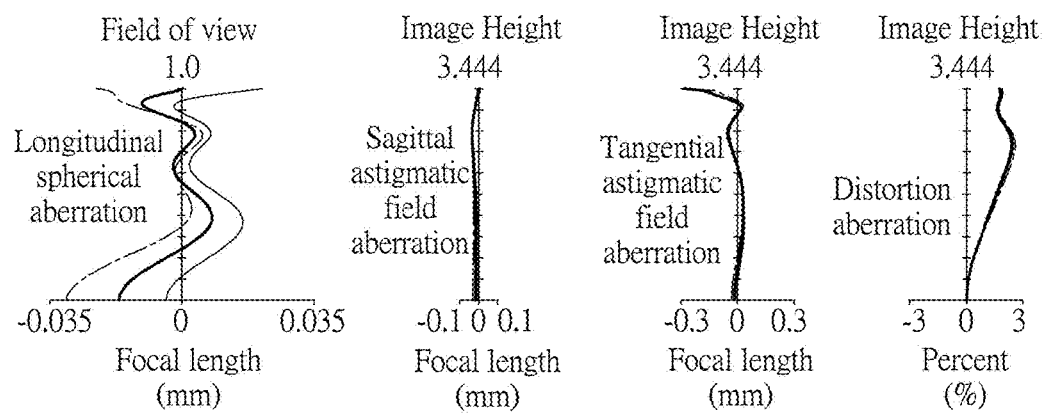
FIG. 29A illustrates the longitudinal spherical aberration on the image plane of the twelfth example.
FIG. 29B illustrates the astigmatic aberration on the sagittal direction of the eleventh example.
FIG. 29C illustrates the astigmatic aberration on the tangential direction of the twelfth example.
FIG. 29D illustrates the distortion aberration of the twelfth example.

Please refer to FIG. 28 which illustrates the twelfth example of the optical imaging lens 1 of the present invention. Please refer to FIG. 29A for the longitudinal spherical aberration on the image plane 91 of the twelfth example; please refer to FIG. 29B for the astigmatic aberration on the sagittal direction; please refer to FIG. 29C for the astigmatic aberration on the tangential direction, and please refer to FIG. 29D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has negative refracting power, the sixth lens element 60 has positive refracting power, the object-side surface 71 of the seventh lens element 70 has a concave portion 74' in a vicinity of its periphery.

The optical data of the twelfth example of the optical imaging lens are shown in FIG. 56 while the aspheric surface data are shown in FIG. 57. In this example, TTL=4.991 mm; EFL=3.946 mm; HFOV=40.260 degrees; image height=3.444 mm; Fno=1.55. In particular, the total length of the twelfth example is shorter than the total length of the first example, and the aperture of this example is larger than the aperture of the first example.

THIRTEENTH EXAMPLE

Figure 30:
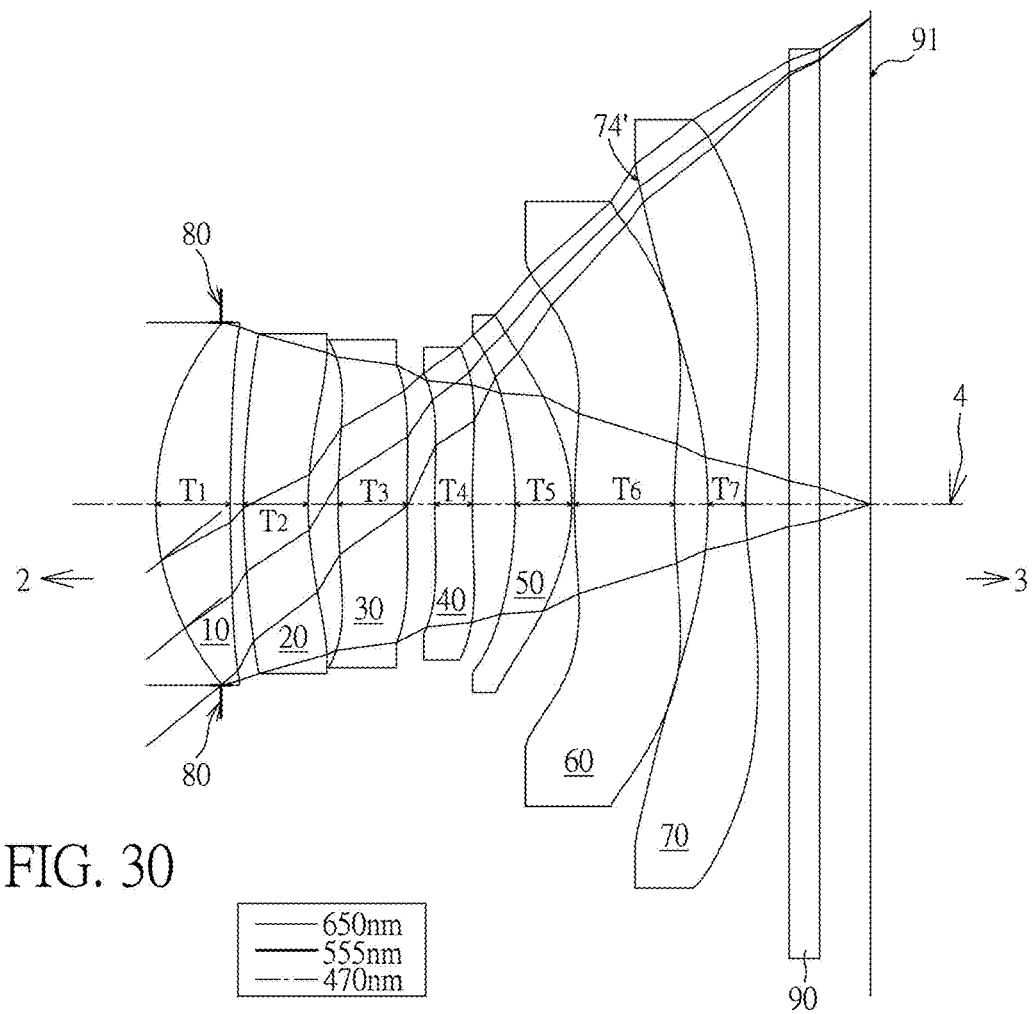
FIG. 30 illustrates a thirteenth example of the optical imaging lens of the present invention.
Figures 31A, 31B, 31C, 31D:
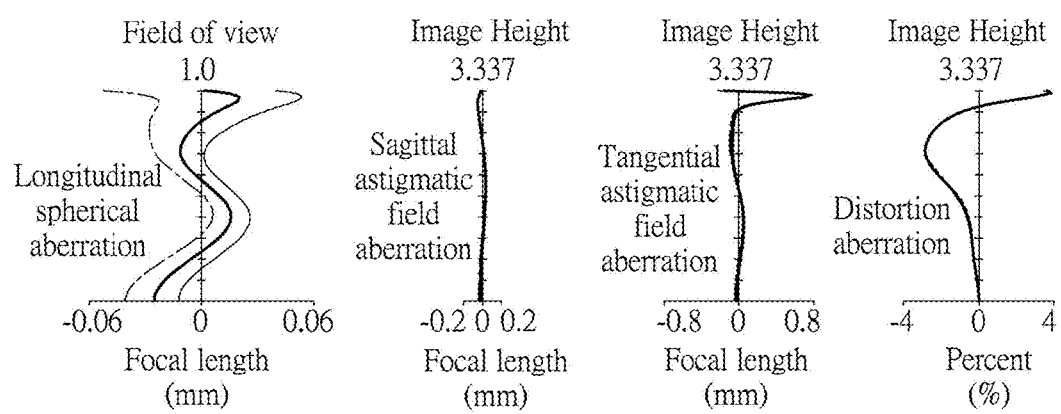
FIG. 31A illustrates the longitudinal spherical aberration on the image plane of the thirteenth example.
FIG. 31B illustrates the astigmatic aberration on the sagittal direction of the thirteenth example.
FIG. 31C illustrates the astigmatic aberration on the tangential direction of the thirteenth example.
FIG. 31D illustrates the distortion aberration of the thirteenth example.

Please refer to FIG. 30 which illustrates the thirteenth example of the optical imaging lens 1 of the present invention. Please refer to FIG. 31A for the longitudinal spherical aberration on the image plane 91 of the thirteenth example;

please refer to FIG. 31B for the astigmatic aberration on the sagittal direction; please refer to FIG. 31C for the astigmatic aberration on the tangential direction, and please refer to FIG. 31D for the distortion aberration. The components in this example are similar to those in the first example, but the optical data such as the curvature radius, the lens thickness, the aspheric surface or the back focal length in this example are different from the optical data in the first example. Besides, in this example, the second lens element 20 has positive refracting power, the fourth lens element 40 has negative refracting power, the sixth lens element 60 has positive refracting power, the object-side surface 71 of the seventh lens element 70 has a concave portion 74' in a vicinity of its periphery.

The optical data of the thirteenth example of the optical imaging lens are shown in FIG. 58 while the aspheric surface data are shown in FIG. 59. In this example, TTL=4.919 mm; EFL=3.875 mm; HFOV=39.500 degrees; image height=3.337 mm; Fno=1.55. In particular, the total length of the thirteenth example is shorter than the total length of the first example, and the aperture of this example is larger than the aperture of the first example.

FOURTEENTH EXAMPLE

Figure 32:
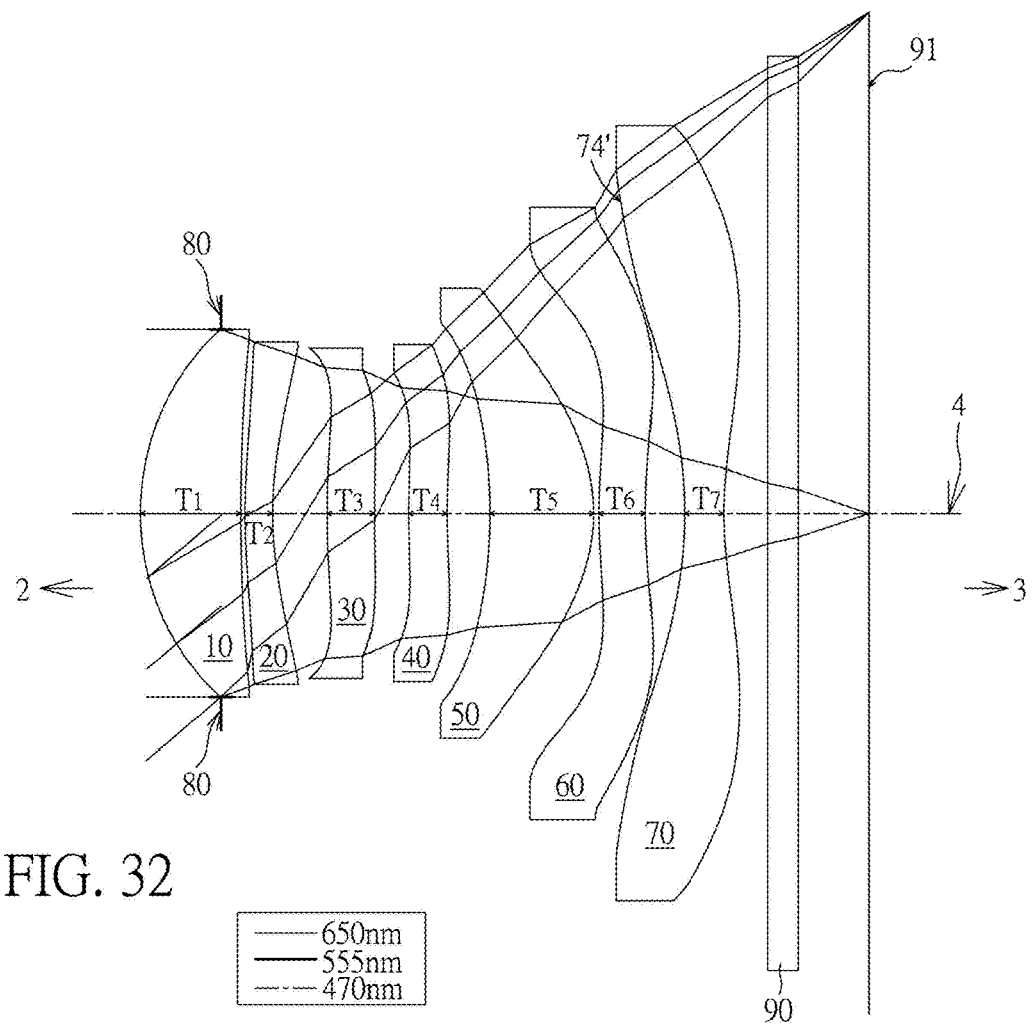
FIG. 32 illustrates a fourteenth example of the optical imaging lens of the present invention.
Figures 33A, 33B, 33C, 33D:
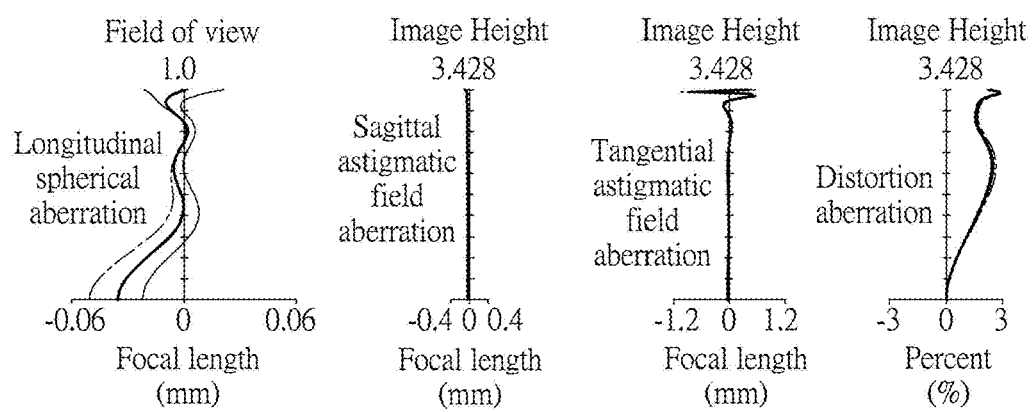
FIG. 33A illustrates the longitudinal spherical aberration on the image plane of the fourteenth example.
FIG. 33B illustrates the astigmatic aberration on the sagittal direction of the fourteenth example.
FIG. 33C illustrates the astigmatic aberration on the tangential direction of the fourteenth example.
FIG. 33D illustrates the distortion aberration of the fourteenth example.

Please refer to FIG. 32 which illustrates the fourteenth example of the optical imaging lens 1 of the present invention. Please refer to FIG. 33A for the longitudinal spherical aberration on the image plane 91 of the fourteenth example; please refer to FIG. 33B for the astigmatic aberration on the sagittal direction; please refer to FIG. 33C for the astigmatic aberration on the tangential direction, and please refer to FIG. 33D for the distortion aberration. The components in this example are similar to those in the first example, but the optical data such as the curvature radius, the lens thickness, the aspheric surface or the back focal length in this example are different from the optical data in the first example. Besides, in this example, the fourth lens element 40 has negative refracting power, the sixth lens element 60 has positive refracting power, the object-side surface 71 of the seventh lens element 70 has a concave portion 74' in a vicinity of its periphery.

The optical data of the fourteenth example of the optical imaging lens are shown in FIG. 60 while the aspheric surface data are shown in FIG. 61. In this example, TTL=4.979 mm; EFL=3.898 mm; HFOV=40.260 degrees; image height=3.428 mm; Fno=1.55. In particular, the total length of the fourteenth example is shorter than the total length of the first example, and the aperture of this example is larger than the aperture of the first example.

Some important ratios in each example are shown in FIG. 62, FIG. 63, FIG. 64 and FIG. 65.

The applicant found that the lens configuration of the present invention has the features with the following design:
1. The first lens element has positive refracting power, which helps to collect the ray and shorten the optical imaging lens length. In addition, with the image-side surface of the first lens element has a concave portion in a vicinity of the optical axis, the image-side surface of the first lens element has a concave portion in a vicinity of a periphery of the first lens element, the object-side surface of the second lens element has a convex portion in a vicinity of the optical axis, the object-side surface of the third lens element has a concave portion in a vicinity of a periphery of the third lens element, the image-side surface of the third lens element has a concave portion in a vicinity of the optical axis, the object-side surface of the fourth lens element has a convex portion in a vicinity of the optical axis, and the object-side surface of the fifth lens element has a concave portion in a vicinity of the optical axis, the aberration can be effectively improved.
2. By adjusting and satisfying the condition of $\upsilon 3+\upsilon 5 \geq 100.000$, to achieve the purpose of correcting the color difference of the entire optical imaging lens. The preferable range is $150.000 \geq \upsilon 3+\upsilon 5 \geq 100.000$.
3. Lens elements in the optical imaging lens are made of plastic material, which helps to reduce total weight and the production costs.

To diminish the total length, the present invention proposes to reduce the lens thickness and air gaps between adjacent lens elements. Taking the assembly fabrication and imaging quality into consideration, the lens thickness and the air gaps should be coordinated with each other, or to adjust the ratio of particular optical parameter to a specific combination of lens groups. The following conditions help the optical imaging lens have better arrangement:

$AAG/(G23+G45) \leq 2.800$, preferably, the range is $1.500 \leq AAG/(G23+G45) \leq 2.800$;

$EFL/(G23+G34+G45) \leq 6.200$, preferably, the range is $4.300 \leq EFL/(G23+G34+G45) \leq 6.200$;

$ALT/(G56+T7) \geq 6.200$, preferably, the range is $6.200 \leq ALT/(G56+T7) \leq 11.000$;

$(T5+T6)/T7 \geq 2.400$, preferably, the range is $2.400 \leq (T5+T6)/T7 \leq 4.500$;

$(T1+T3)/T4 \geq 3.100$, preferably, the range is $3.100 \leq (T1+T3)/T4 \leq 4.500$;

$TL/(T5+T6) \leq 4.900$, preferably, the range is $3.500 \leq TL/(T5+T6) \leq 4.900$;

$(T3+T7)/G23 \leq 3.700$, preferably, the range is $1.500 \leq (T3+T7)/G23 \leq 3.700$;

$T1/T4 \geq 1.900$, preferably, the range is $1.900 \leq T1/T4 \leq 3.000$;

$T5/G23 \geq 1.800$, preferably, the range is $1.800 \leq T5/G23 \leq 3.100$;

$AAG/(G34+G45) \leq 3.500$, preferably, the range is $2.000 \leq AAG/(G34+G45) \leq 3.500$;

$EFL/BFL \geq 3.200$, preferably, the range is $3.200 \leq EFL/BFL \leq 4.800$;

$ALT/(T2+T7) \geq 4.300$, preferably, the range is $4.300 \leq ALT/(T2+T7) \leq 6.500$;

$(T5+T6)/(G56+G67) \geq 1.800$, preferably, the range is $1.800 \leq (T5+T6)/(G56+G67) \leq 4.300$;

$ALT/(T1+T5) \leq 3.500$, preferably, the range is $1.800 \leq ALT/(T1+T5) \leq 3.500$;

$(G23+G45)/T4 \geq 1.700$, preferably, the range is $1.700 \leq (G23+G45)/T4 \leq 2.600$;

$(T1+T6)/T3 \geq 2.400$, preferably, the range is $2.400 \leq (T1+T6)/T3 \leq 3.300$;

$(T1+G12)/T4 \geq 2.200$, preferably, the range is $2.200 \leq (T1+G12)/T4 \leq 3.200$; and $(T1+T2)/(G23+G34) \geq 1.400$, preferably, the range is $1.400 \leq (T1+T2)/(G23+G34) \leq 2.600$.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths (red, green and blue) are pretty close to one another, which means the present invention is able to concentrate light of the three representing different wavelengths so that the aberration is greatly improved. Given the above, the present invention provides outstanding imaging quality.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

In addition to the above ratios, one or more conditional formulae may be optionally combined to be used in the examples of the present invention and the present invention is not limit to this. The curvatures of each lens element or multiple lens elements may be fine-tuned to result in more fine structures to enhance the performance or the resolution. For example, the object-side surface of the first lens element may additionally have a convex portion in the vicinity of the optical axis. The above limitations may be properly combined in the examples without causing inconsistency.

The max values or the min values of optional combinations of the above optical parameters are within the ranges of the present invention for the practice of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element, a sixth lens element and a seventh lens element, wherein the first lens element to the seventh lens element each has an object-side surface facing toward the object side to allow imaging rays to pass through as well as an image-side surface facing toward the image side to allow the imaging rays to pass through, wherein:

the first lens element has positive refracting power, and the image-side surface of the first lens element has a concave portion in a vicinity of a periphery of the first lens element;

the second lens element is made of plastic;

the object-side surface of the third lens element has a concave portion in a vicinity of a periphery of the third lens element, and the image-side surface of the third lens element has a concave portion in a vicinity of the optical axis;

the object-side surface of the fourth lens element has a convex portion in a vicinity of the optical axis;

the object-side surface of the fifth lens element has a concave portion in a vicinity of the optical axis, and the image-side surface of the fifth lens element has a convex portion in a vicinity of a periphery of the fifth lens element;

the sixth lens element and the seventh lens element are made of plastic;

the lens elements having refracting power included by the optical imaging lens are only the seven lens elements described above, wherein, $\upsilon 3$ is an Abbe number of the third lens element, $\upsilon 5$ is an Abbe number of the fifth lens element, and the optical imaging lens satisfies the relationship: $\upsilon 3+\upsilon 5 \geq 100.000$.

2. The optical imaging lens of claim 1, wherein AAG is a sum of six air gaps from the first lens element to the seventh lens element along the optical axis, G23 is an air gap between the second lens element and the third lens element along the optical axis, G45 is an air gap between the fourth lens element and the fifth lens element along the optical axis, and the optical imaging lens satisfies the relationship: AAG/(G23+G45)≤2.800.

3. The optical imaging lens of claim 1, wherein EFL is an effective focal length of the optical imaging lens, G23 is an air gap between the second lens element and the third lens element along the optical axis, G34 is an air gap between the third lens element and the fourth lens element along the optical axis, G45 is an air gap between the fourth lens element and the fifth lens element along the optical axis, and the optical imaging lens satisfies the relationship: EFL/(G23+G34+G45)≤6.200.

4. The optical imaging lens of claim 1, wherein ALT is a sum of thickness of all the seven lens elements along the optical axis, G56 is an air gap between the fifth lens element and the sixth lens element along the optical axis, T7 is a thickness of the seventh lens element along the optical axis, and the optical imaging lens satisfies the relationship: ALT/(G56+T7)≥6.200.

5. The optical imaging lens of claim 1, wherein T5 is a thickness of the fifth lens element along the optical axis, T6 is a thickness of the sixth lens element along the optical axis, T7 is a thickness of the seventh lens element along the optical axis, and the optical imaging lens satisfies the relationship:(T5+T6)/T7≥2.400.

6. The optical imaging lens of claim 1, wherein T1 is a thickness of the first lens element along the optical axis, T3 is a thickness of the third lens element along the optical axis, T4 is a thickness of the fourth lens element along the optical axis, and the optical imaging lens satisfies the relationship: (T1+T3)/T4≥3.100.

7. The optical imaging lens of claim 1, wherein TL is a distance from the object-side surface of the first lens element to the image-side surface of the seventh lens element along the optical axis, T5 is a thickness of the fifth lens element along the optical axis, T6 is a thickness of the sixth lens element along the optical axis, and the optical imaging lens satisfies the relationship: TL/(T5+T6)≤4.900.

8. The optical imaging lens of claim 1, wherein T3 is a thickness of the third lens element along the optical axis, T7 is a thickness of the seventh lens element along the optical axis, G23 is an air gap between the second lens element and the third lens element along the optical axis, and the optical imaging lens satisfies the relationship:(T3+T7)/G23≤3.700.

9. The optical imaging lens of claim 1, wherein T1 is a thickness of the first lens element along the optical axis, T4 is a thickness of the fourth lens element along the optical axis, and the optical imaging lens satisfies the relationship: T1/T4≥1.900.

10. The optical imaging lens of claim 1, wherein T5 is a thickness of the fifth lens element along the optical axis, G23 is an air gap between the second lens element and the third lens element along the optical axis, and the optical imaging lens satisfies the relationship: T5/G23≥1.800.

11. An optical imaging lens, from an object side to an image side in order along an optical axis comprising: a first lens element, a second lens element, a third lens element, a fourth lens element, a fifth lens element, a sixth lens element and a seventh lens element, wherein the first lens element to the seventh lens element each has an object-side surface facing toward the object side to allow imaging rays to pass through as well as an image-side surface facing toward the image side to allow the imaging rays to pass through, wherein:
the image-side surface of the first lens element has a concave portion in a vicinity of the optical axis;
the object-side surface of the second lens element has a convex portion in a vicinity of the optical axis;
the object-side surface of the third lens element has a concave portion in a vicinity of a periphery of the third lens element, and the image-side surface of the third lens element has a concave portion in a vicinity of the optical axis;
the object-side surface of the fourth lens element has a convex portion in a vicinity of the optical axis;
the object-side surface of the fifth lens element has a concave portion in a vicinity of the optical axis, and the image-side surface of the fifth lens element has a convex portion in a vicinity of a periphery of the fifth lens element;
the sixth lens element and the seventh lens element are made of plastic;
the lens elements having refracting power included by the optical imaging lens are only the seven lens elements described above,
wherein, υ3 is an Abbe number of the third lens element, υ5 is an Abbe number of the fifth lens element, and the optical imaging lens satisfies the relationship: υ3+υ5≥100.000.

12. The optical imaging lens of claim 11, wherein AAG is a sum of six air gaps from the first lens element to the seventh lens element along the optical axis, G34 is an air gap between the third lens element and the fourth lens element along the optical axis, G45 is an air gap between the fourth lens element and the fifth lens element along the optical axis, and the optical imaging lens satisfies the relationship: AAG/(G34+G45)≤3.500.

13. The optical imaging lens of claim 11, wherein EFL is an effective focal length of the optical imaging lens, BFL is a distance from the image-side surface of the seventh lens element to an image plane along the optical axis, and the optical imaging lens satisfies the relationship: EFL/BFL≥3.200.

14. The optical imaging lens of claim 11, wherein ALT is a sum of thickness of all the seven lens elements along the optical axis, T2 is a thickness of the second lens element along the optical axis, T7 is a thickness of the seventh lens element along the optical axis, and the optical imaging lens satisfies the relationship: ALT/(T2+T7)≥4.300.

15. The optical imaging lens of claim 11, wherein T5 is a thickness of the fifth lens element along the optical axis, T6 is a thickness of the sixth lens element along the optical axis, G56 is an air gap between the fifth lens element and the sixth lens element along the optical axis, G67 is an air gap between the sixth lens element and the seventh lens element along the optical axis, and the optical imaging lens satisfies the relationship: (T5+T6)/(G56+G67)≥1.800.

16. The optical imaging lens of claim 11, wherein ALT is a sum of thickness of all the seven lens elements along the optical axis, T1 is a thickness of the first lens element along the optical axis, T5 is a thickness of the fifth lens element along the optical axis, and the optical imaging lens satisfies the relationship: ALT/(T1+T5)≤3.500.

17. The optical imaging lens of claim 11, wherein G23 is an air gap between the second lens element and the third lens element along the optical axis, G45 is an air gap between the fourth lens element and the fifth lens element along the optical axis, T4 is a thickness of the fourth lens element along the optical axis, and the optical imaging lens satisfies the relationship: (G23+G45)/T4≥1.700.

18. The optical imaging lens of claim 11, wherein T1 is a thickness of the first lens element along the optical axis, T3 is a thickness of the third lens element along the optical axis, T6 is a thickness of the sixth lens element along the optical axis, and the optical imaging lens satisfies the relationship: (T1+T6)/T3≥2.400.

19. The optical imaging lens of claim 11, wherein T1 is a thickness of the first lens element along the optical axis, T4 is a thickness of the fourth lens element along the optical axis, G12 is an air gap between the first lens element and the second lens element along the optical axis, and the optical imaging lens satisfies the relationship: (T1+G12)/T4≥2.200.

20. The optical imaging lens of claim 11, wherein T1 is a thickness of the first lens element along the optical axis, T2 is a thickness of the second lens element along the optical axis, G23 is an air gap between the second lens element and the third lens element along the optical axis, G34 is an air gap between the third lens element and the fourth lens element along the optical axis, and the optical imaging lens satisfies the relationship: (T1+T2)/ (G23+G34)≥1.400.

* * * * *